S. E. CARLIN.
CALCULATING MACHINE.
APPLICATION FILED JUNE 26, 1909. RENEWED MAY 1, 1919.
1,313,517.
Patented Aug. 19, 1919.
24 SHEETS—SHEET 2.
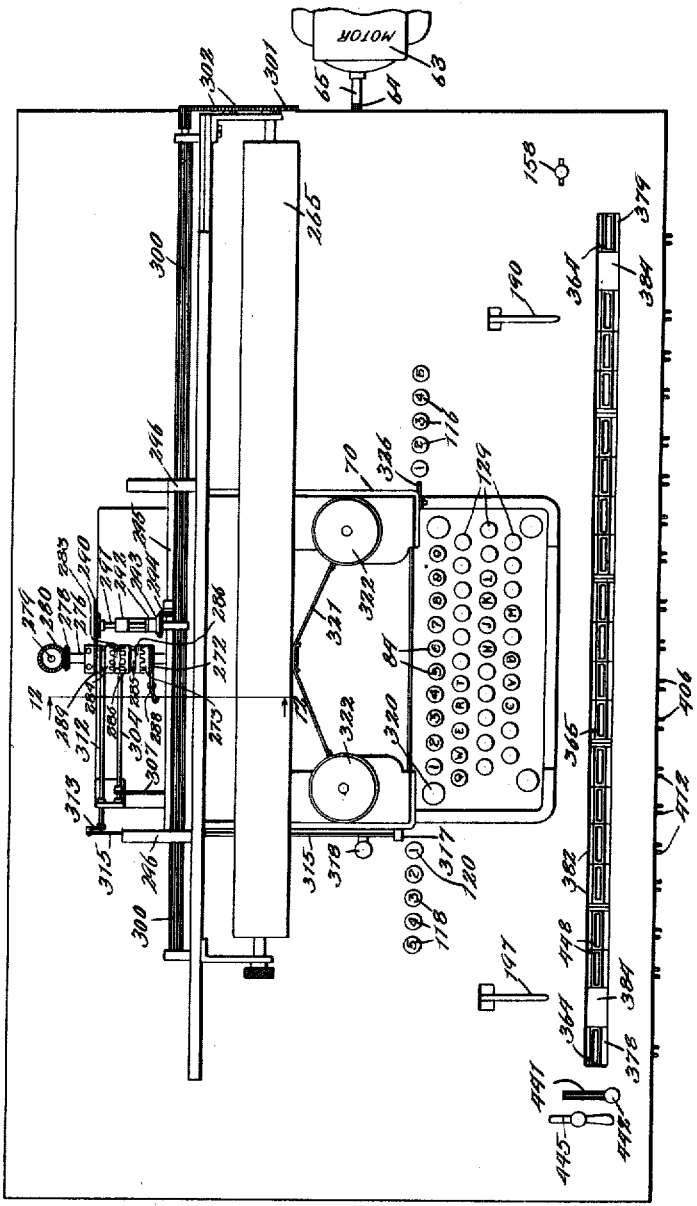

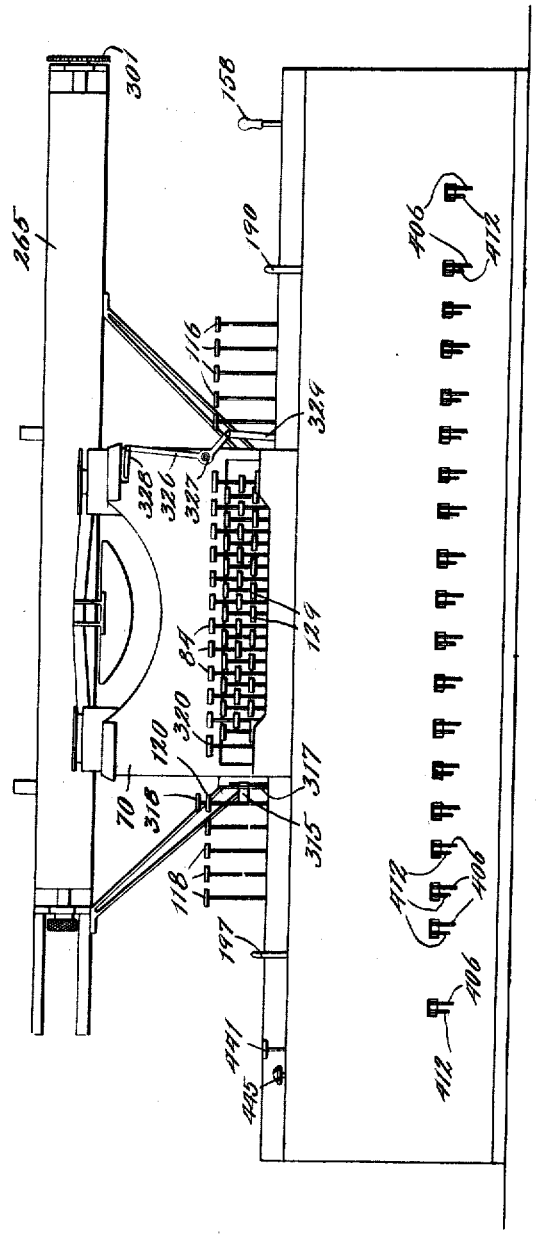

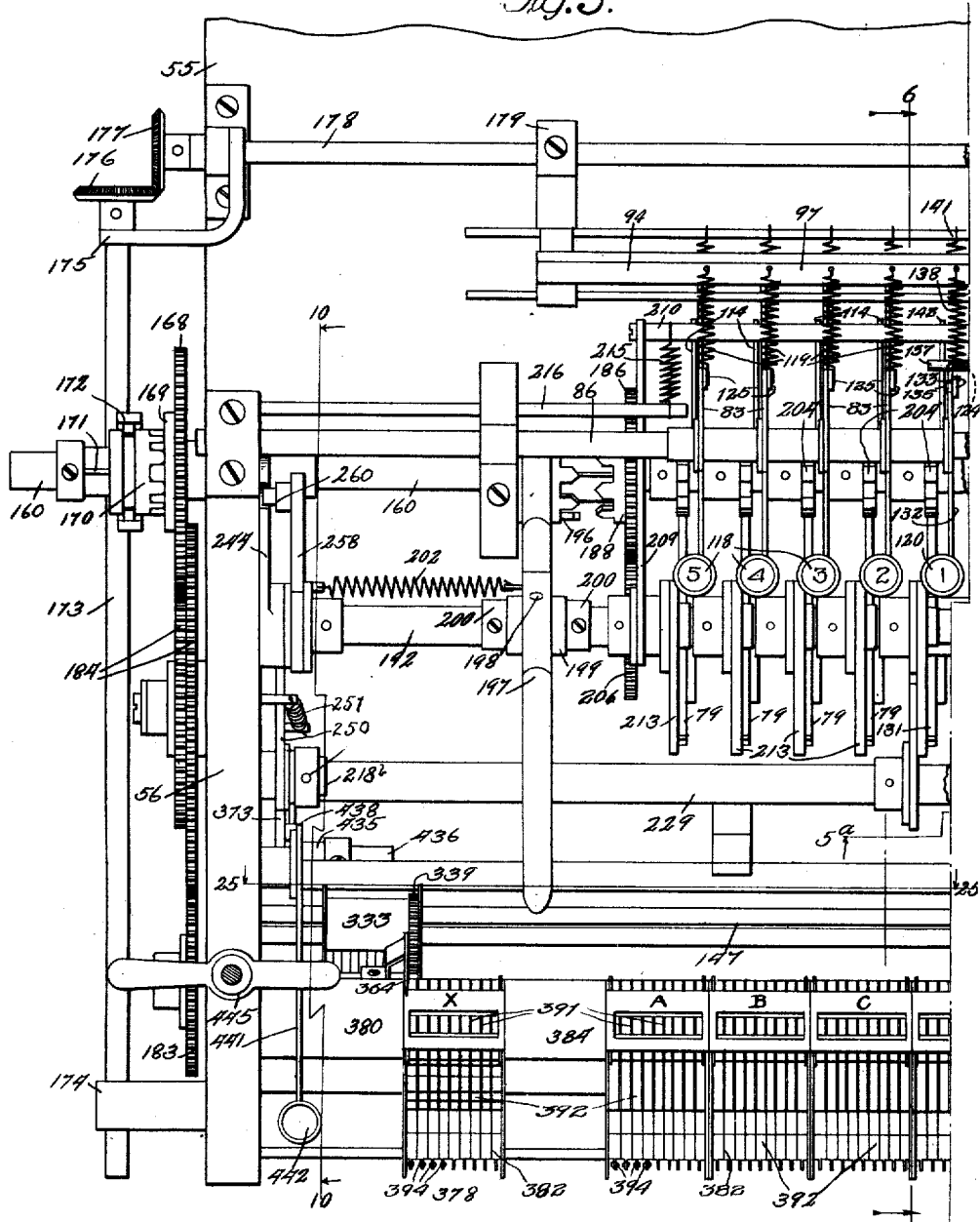

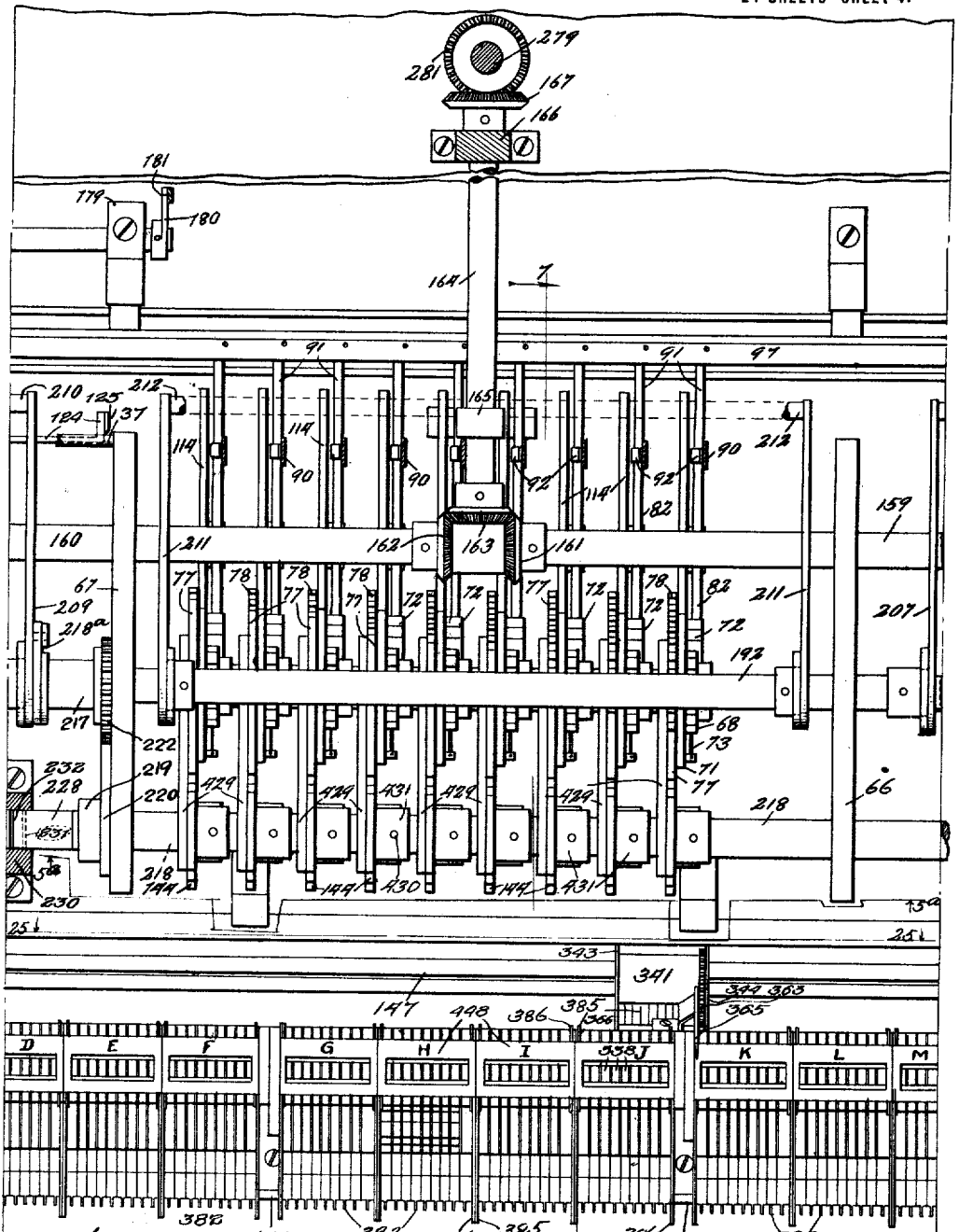
S. E. CARLIN.
CALCULATING MACHINE.
APPLICATION FILED JUNE 26, 1909. RENEWED MAY 1, 1919.
1,313,517.
Patented Aug. 19, 1919.
24 SHEETS—SHEET 4.

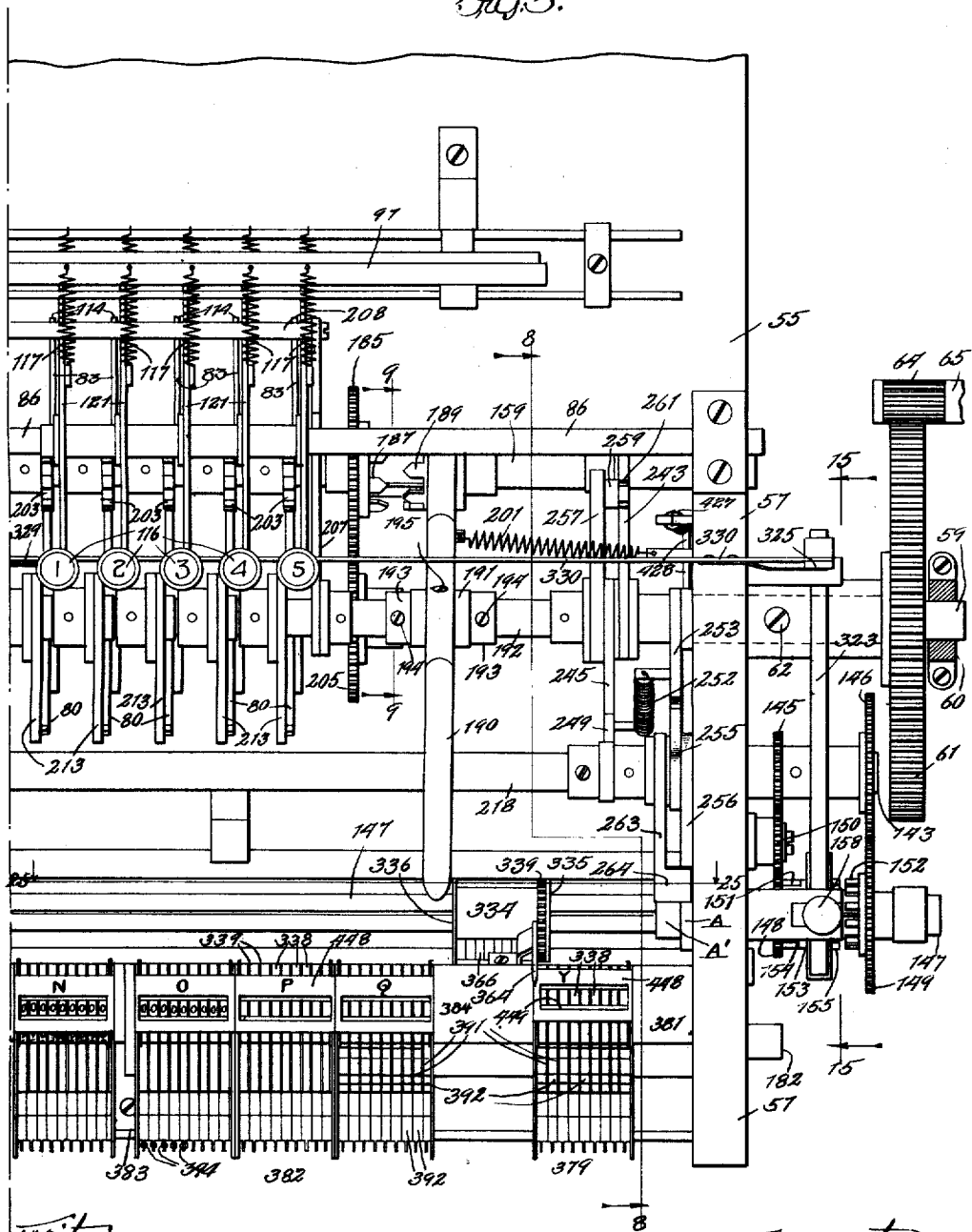

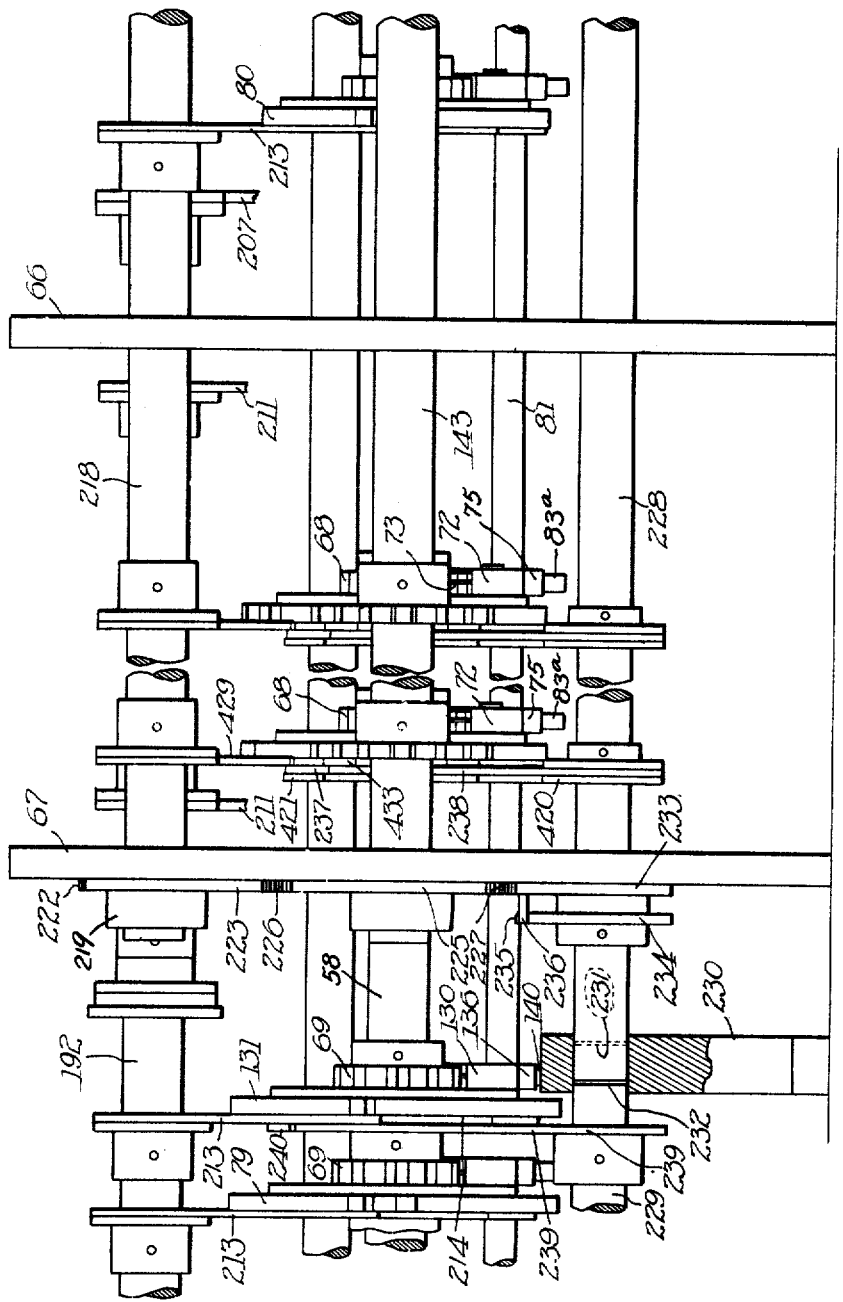

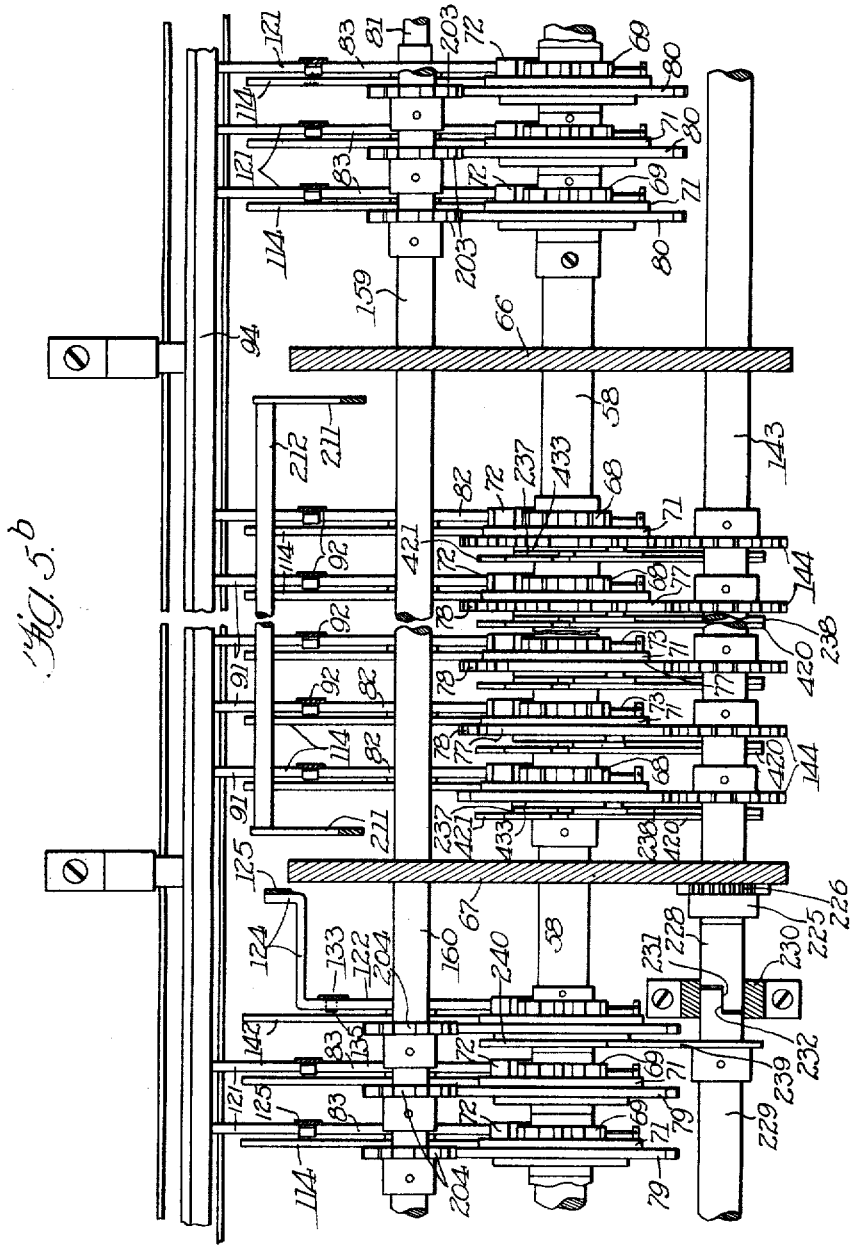

S. E. CARLIN.
CALCULATING MACHINE.
APPLICATION FILED JUNE 26, 1909. RENEWED MAY 1, 1919.

1,313,517.

Patented Aug. 19, 1919.
24 SHEETS—SHEET 6.

Witnesses:
Ira D. Perry
J. H. Jochum Jr.

Inventor:
Samuel E. Carlin
By: Brown & Hopkins
Attys.

S. E. CARLIN.
CALCULATING MACHINE.
APPLICATION FILED JUNE 26, 1909. RENEWED MAY 1, 1919.

1,313,517.

Patented Aug. 19, 1919.
24 SHEETS—SHEET 10.

Witnesses:

Inventor:
Samuel E. Carlin
By Brown & Hopkins
Attys.

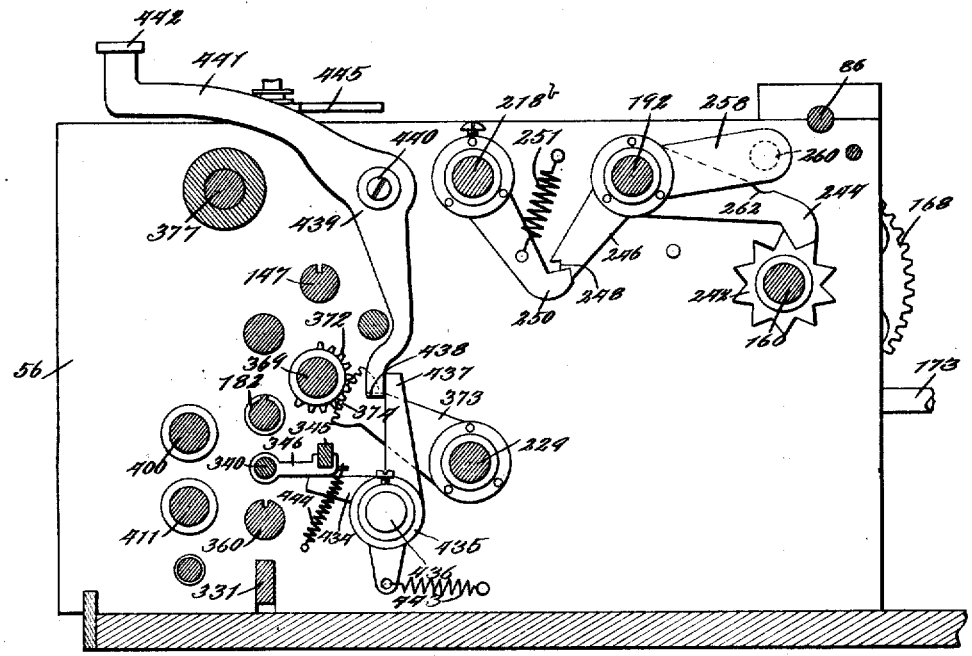

S. E. CARLIN.
CALCULATING MACHINE.
APPLICATION FILED JUNE 26, 1909. RENEWED MAY 1, 1919.
1,313,517.
Patented Aug. 19, 1919.
24 SHEETS—SHEET 12.
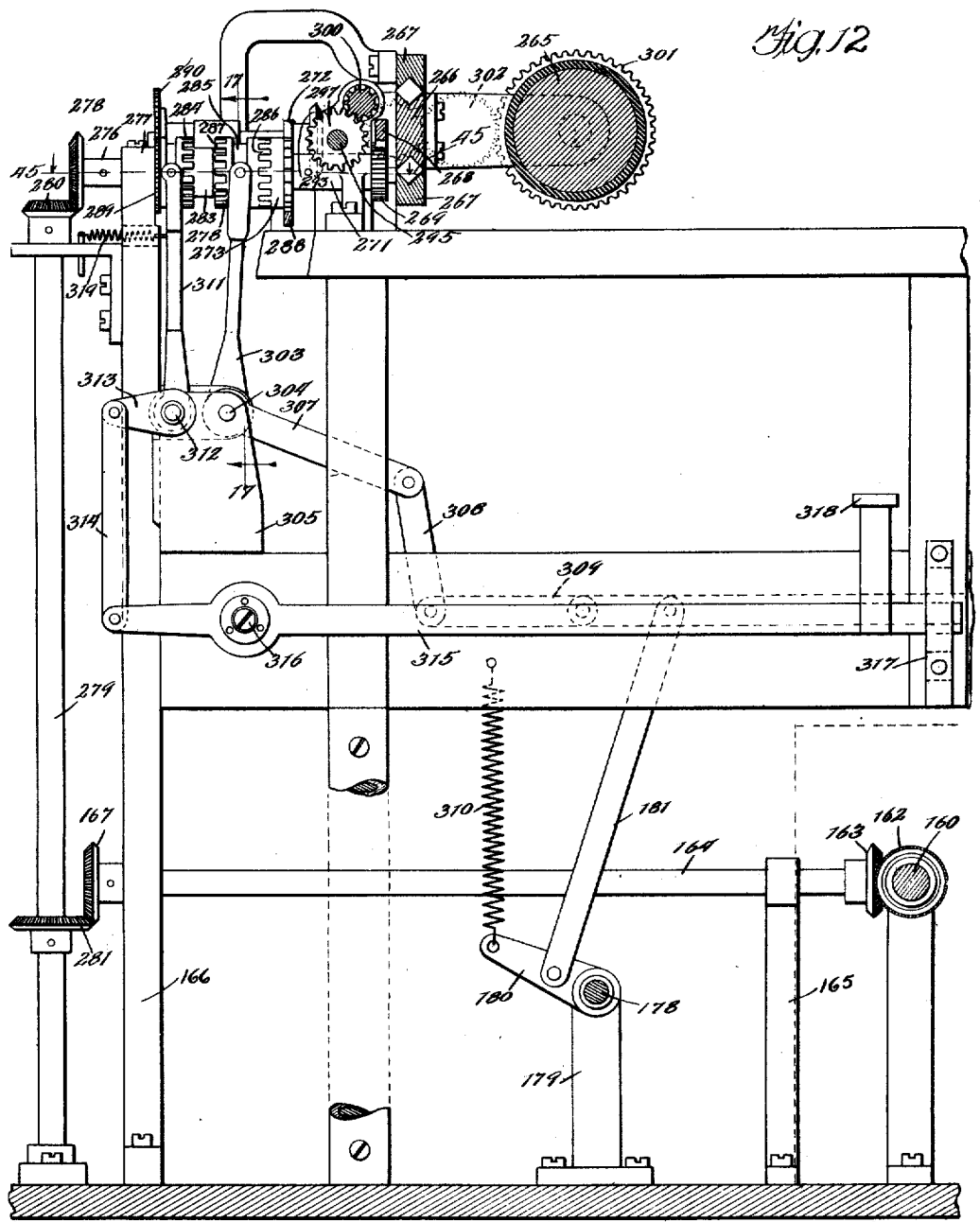

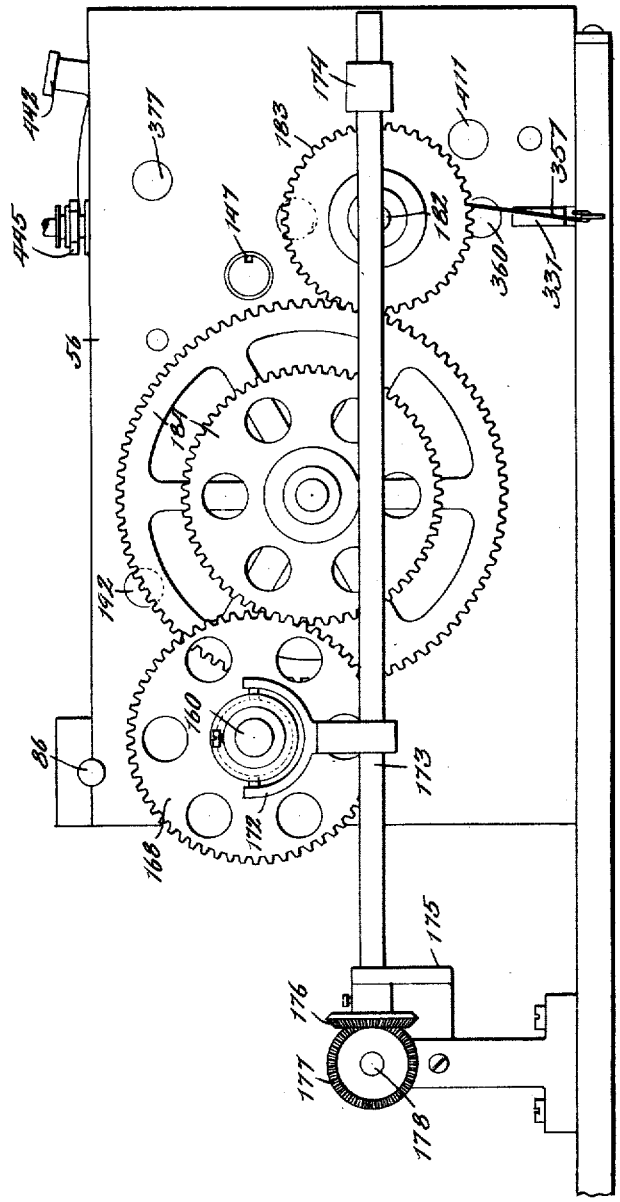

S. E. CARLIN.
CALCULATING MACHINE.
APPLICATION FILED JUNE 26, 1909. RENEWED MAY 1, 1919.
1,313,517. Patented Aug. 19, 1919.
24 SHEETS—SHEET 14.
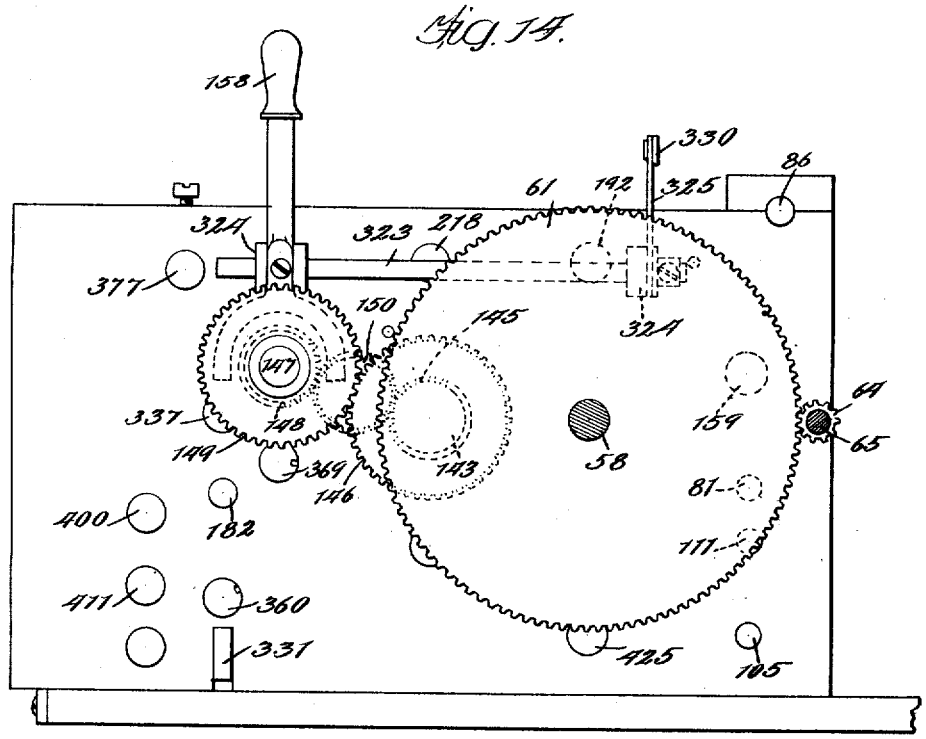
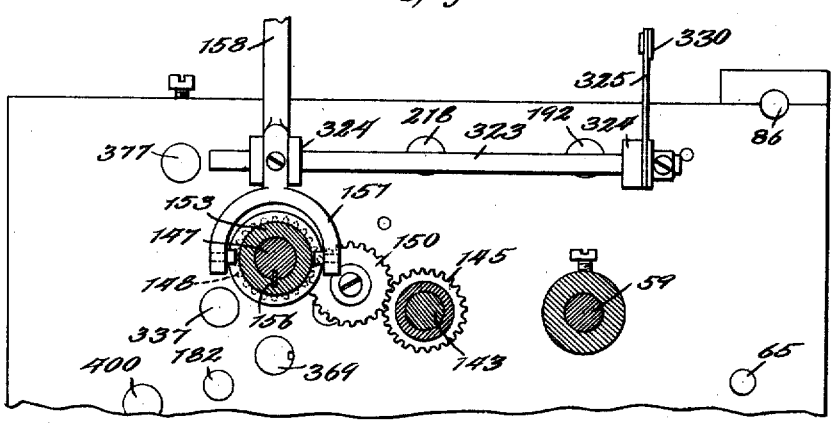

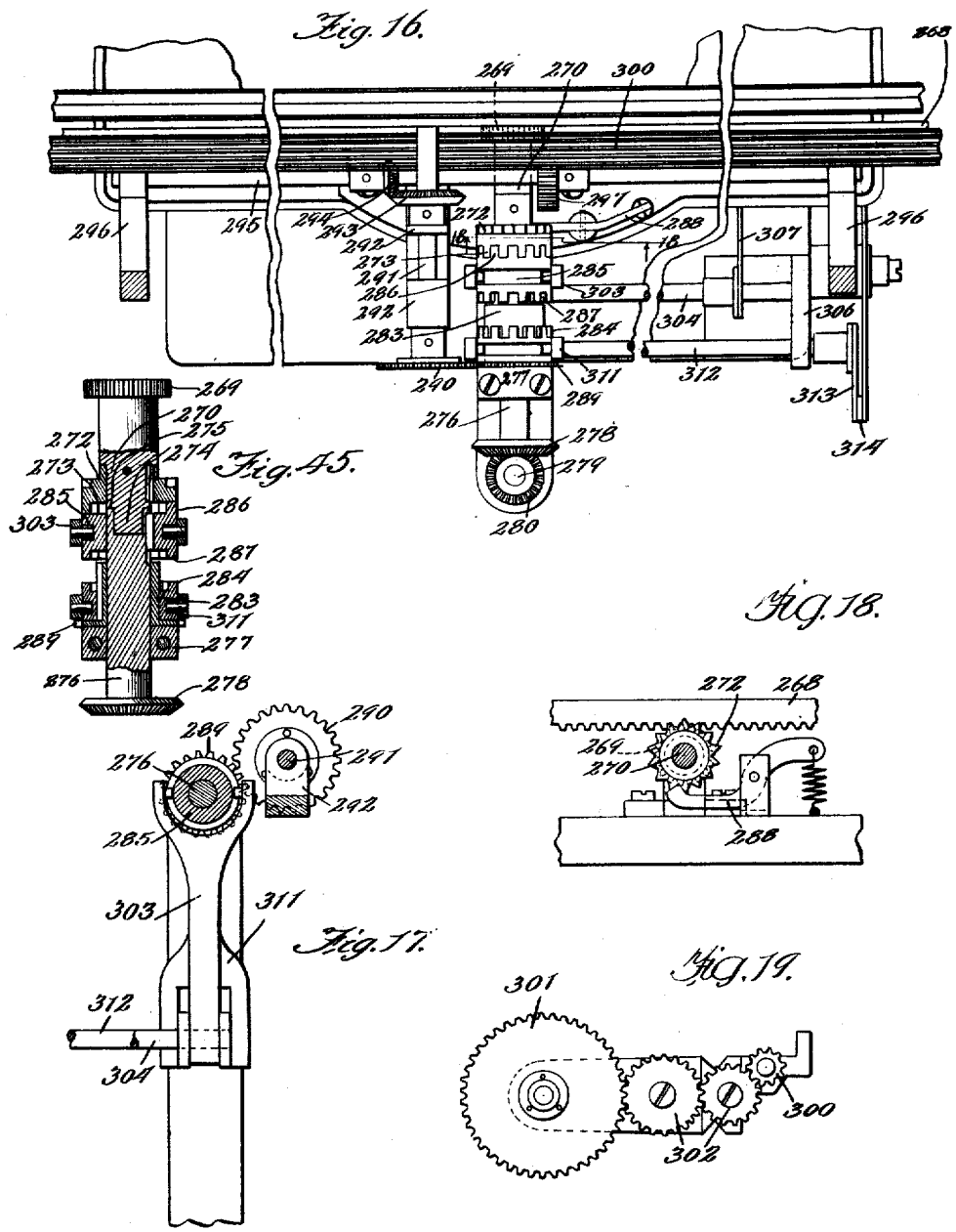

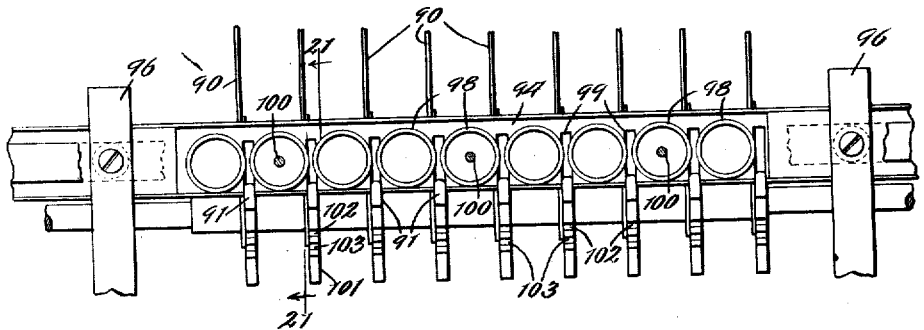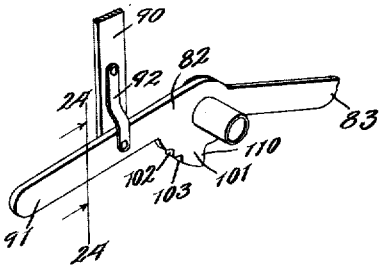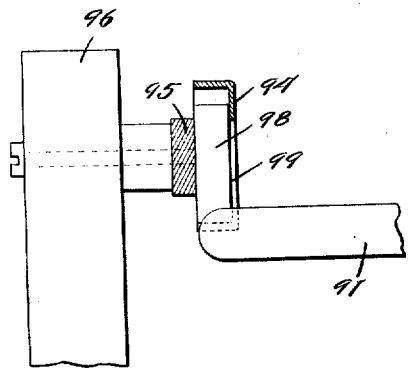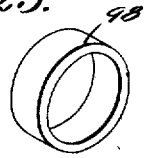

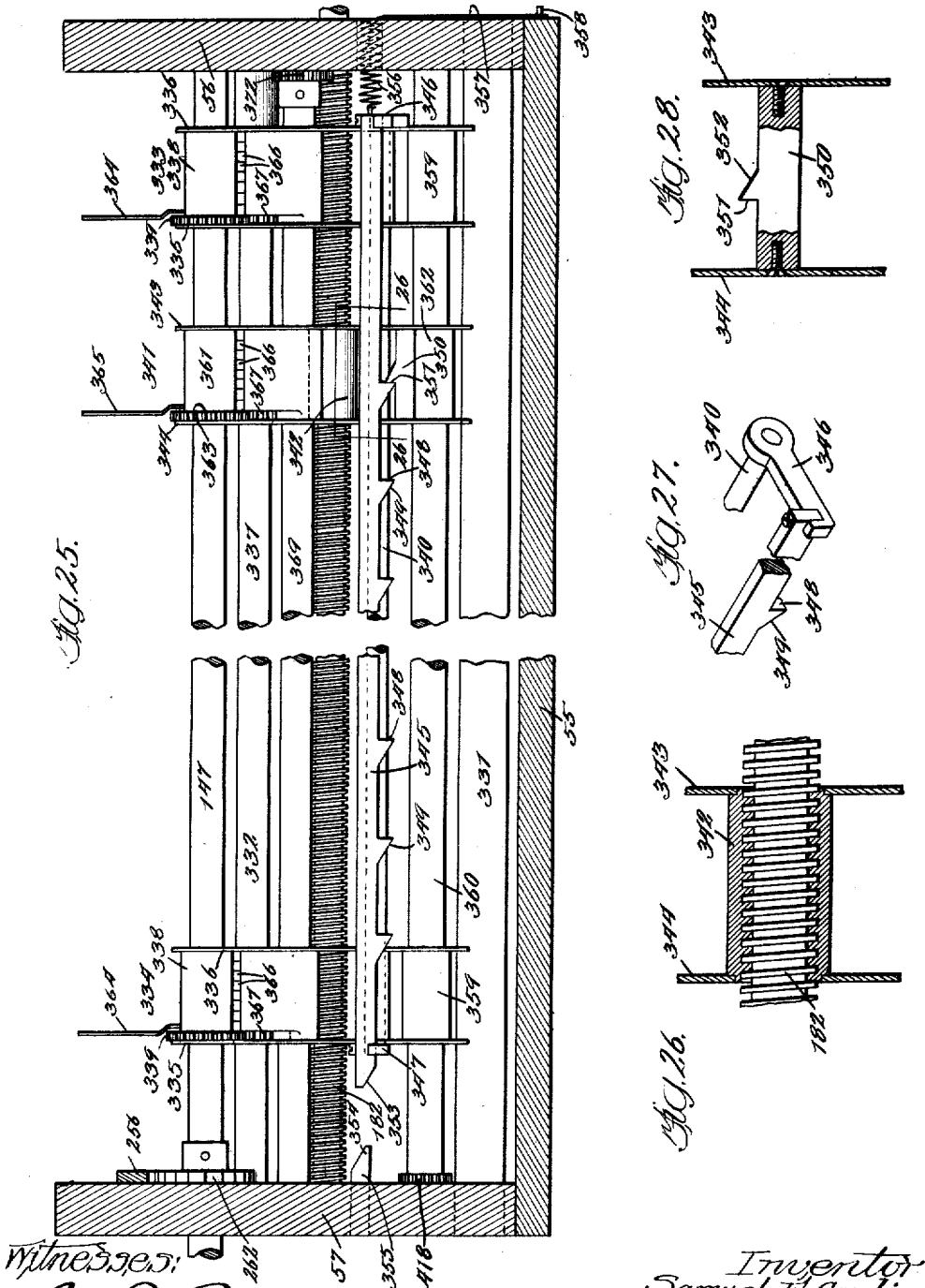

S. E. CARLIN.
CALCULATING MACHINE.
APPLICATION FILED JUNE 26, 1909. RENEWED MAY 1, 1919.
1,313,517.
Patented Aug. 19, 1919.
24 SHEETS—SHEET 18.
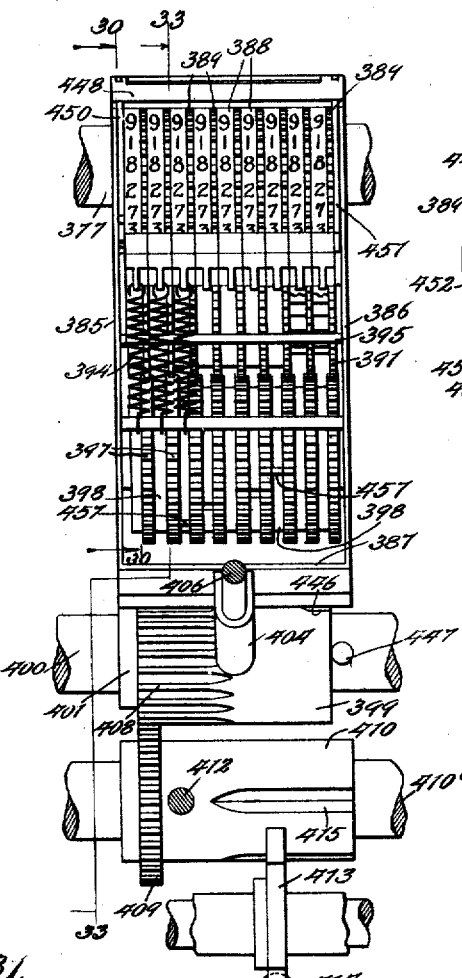
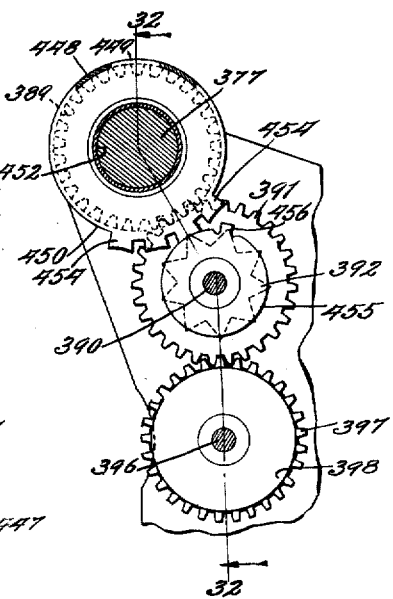
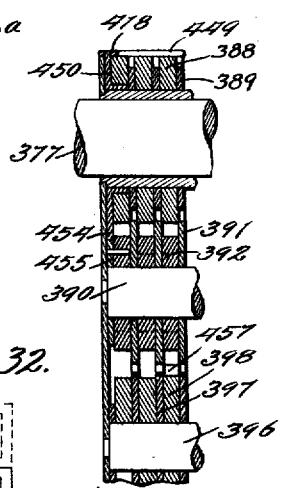
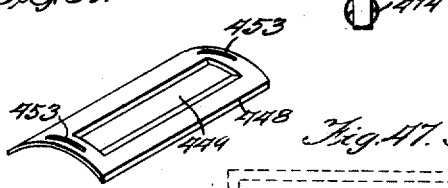
Witnesses:
Inventor:
Samuel E. Carlin
By Brown & Hopkins
Attys.

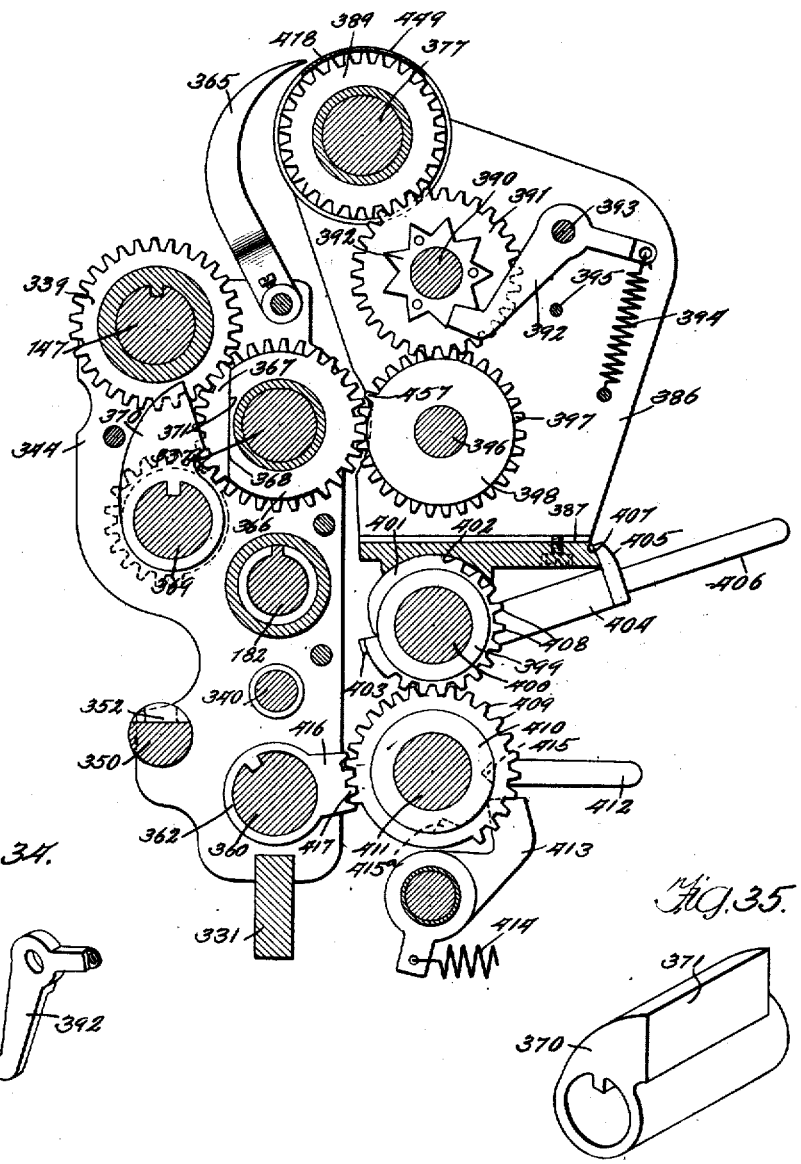

S. E. CARLIN.
CALCULATING MACHINE.
APPLICATION FILED JUNE 26, 1909. RENEWED MAY 1, 1919.

1,313,517.

Patented Aug. 19, 1919.
24 SHEETS—SHEET 20.

Witnesses:

Inventor:
Samuel E. Carlin
By Brown & Hopkins
Attys.

S. E. CARLIN.
CALCULATING MACHINE.
APPLICATION FILED JUNE 26, 1909. RENEWED MAY 1, 1919.

1,313,517.

Patented Aug. 19, 1919.
24 SHEETS—SHEET 21.

Witnesses:

Inventor:
Samuel E. Carlin
By: Brown & Hopkins
Attys.

S. E. CARLIN.
CALCULATING MACHINE.
APPLICATION FILED JUNE 26, 1909. RENEWED MAY 1, 1919.

1,313,517.

Patented Aug. 19, 1919.
24 SHEETS—SHEET 22.

FIG. 48.

WITNESSES:

INVENTOR
Samuel E. Carlin
BY
ATTORNEY

S. E. CARLIN.
CALCULATING MACHINE.
APPLICATION FILED JUNE 26, 1909. RENEWED MAY 1, 1919.

1,313,517.

Patented Aug. 19, 1919.
24 SHEETS—SHEET 23.

FIG. 49.

| | TOTALIZER 378 X. | FOUR TOTALIZERS OF THE SERIES 382. | | | | TOTALIZER 379 Y. |
|---|---|---|---|---|---|---|
| | | G. | H. | I. | J. | |
| 0 | 000 | 000 | 000 | 000 | 000 | 000 |
| 1 | 024 | 024 | 000 | 000 | 000 | 000 |
| 2 | 031 | 024 | 007 | 000 | 000 | 000 |
| 3 | 329 | 024 | 007 | 298 | 000 | 000 |
| 4 | 000 | 024 | 007 | 298 | 329 | 000 |
| 5 | 016 | 040 | 007 | 298 | 329 | 000 |
| 6 | 047 | 040 | 038 | 298 | 329 | 000 |
| 7 | 053 | 040 | 038 | 304 | 329 | 000 |
| 8 | 000 | 040 | 038 | 304 | 382 | 000 |
| 9 | 147 | 187 | 038 | 304 | 382 | 000 |
| 10 | 166 | 187 | 057 | 304 | 382 | 000 |
| 11 | 193 | 187 | 057 | 331 | 382 | 000 |
| 12 | 000 | 187 | 057 | 331 | 575 | 000 |
| 13 | 000 | 000 | 057 | 331 | 575 | 187 |
| 14 | 000 | 000 | 000 | 331 | 575 | 244 |
| 15 | 000 | 000 | 000 | 000 | 575 | 575 |
| 16 | 000 | 000 | 000 | 000 | 000 | 000 |

FIG. 50.

| | g | | h | | i | | j |
|---|---|---|---|---|---|---|---|
| 1 | 24 | 2 | 7 | 3 | 298 | 4 | 329 |
| 5 | 16 | 6 | 31 | 7 | 6 | 8 | 53 |
| 9 | 147 | 10 | 19 | 11 | 27 | 12 | 193 |
| 13 | 187 | 14 | 57 | 15 | 331 | 16 | 575 |

WITNESSES:
Leopold Fittiger
John Waldheim

INVENTOR:
Samuel E. Carlin
BY
B. C. Stickney
ATTORNEY.

S. E. CARLIN.
CALCULATING MACHINE.
APPLICATION FILED JUNE 26, 1909. RENEWED MAY 1, 1919.

1,313,517.  Patented Aug. 19, 1919.
24 SHEETS—SHEET 24.

FIG. 51.

| | TOTALIZER 378 X. | THREE TOTALIZERS OF THE SERIES 382. | | | TOTALIZER 379 Y. |
|---|---|---|---|---|---|
| | | D. | E. | F. | |
| 0 | 000 | 000 | 000 | 000 | 000 |
| 1 | 400 | 400 | 000 | 000 | 000 |
| 2 | 280 | 400 | 120 | 000 | 000 |
| 3 | 000 | 400 | 120 | 280 | 000 |
| 4 | 080 | 480 | 120 | 280 | 000 |
| 5 | 056 | 480 | 144 | 280 | 000 |
| 6 | 000 | 480 | 144 | 336 | 000 |
| 7 | 200 | 680 | 144 | 336 | 000 |
| 8 | 140 | 680 | 204 | 336 | 000 |
| 9 | 000 | 680 | 204 | 476 | 000 |
| 10 | 000 | 000 | 204 | 476 | 680 |
| 11 | 000 | 000 | 000 | 476 | 476 |
| 12 | 000 | 000 | 000 | 000 | 000 |

FIG. 52.

| | d | | e | | f |
|---|---|---|---|---|---|
| 1 | 400 | 2 | 120 | 3 | 280 |
| 4 | 80 | 5 | 24 | 6 | 56 |
| 7 | 200 | 8 | 60 | 9 | 140 |
| 10 | 680 | 11 | 204 | 12 | 476 |

WITNESSES:
Leopold Bittiger
John Waldheim

INVENTOR:
Samuel E Carlin
BY B.C. Stickney
ATTORNEY.

UNITED STATES PATENT OFFICE.

SAMUEL E. CARLIN, OF CHICAGO, ILLINOIS, ASSIGNOR, BY MESNE ASSIGNMENTS, TO UNDERWOOD COMPUTING MACHINE COMPANY, A CORPORATION OF NEW YORK.

CALCULATING-MACHINE.

1,313,517.   Specification of Letters Patent.   Patented Aug. 19, 1919.

Application filed June 26, 1909, Serial No. 504,595. Renewed May 1, 1919. Serial No. 293,991.

*To all whom it may concern:*

Be it known that I, SAMUEL E. CARLIN, a citizen of the United States, residing at Chicago, in the county of Cook and State of Illinois, have invented certain new and useful Improvements in Calculating-Machines, of which the following is a specification.

This invention relates to calculating machines for general purposes and more particularly to machines especially designed for keeping accounts, and more desirably, for use in connection with an ordinary typewriter or a typewriter of any suitable construction, whereby the manipulation of the typewriter keys will also operate the calculating machine and register or indicate the result thereon, while the result is at the same time being printed.

In some calculations it is necessary or desirable to add together a number of amounts or figures in a horizontal line, or "cross foot" so to speak; and also to add together the amounts of figures forming vertical columns, contained in a plurality of such horizontal lines, as well as to add up in a vertical column the various sums of the horizontal cross footings; thus giving subtotals horizontally and vertically, and a grand total at the converging point of the horizontal line of sub-totals and the vertical column of sub-totals, so that if correctly footed the grand total will be the common sum alike of the vertical and horizontal lines of sub-totals. It is also desirable at times to not only add together such figures or amounts in both horizontal and vertical directions but to subtract some of the amounts from the others, and to indicate the result at the end of the column.

To accomplish these results and to provide an improved machine capable of performing a simultaneous vertical and horizontal calculation, and also one which is capable of adding or subtracting amounts to or from the amounts already registered and at the same time that the entries are being recorded is one of the primary objects of the present invention.

A further object is to provide improved means for operating the various totalizers or registers, and improved means for shifting the totalizers or registers into and out of operative position.

A further object is to provide improved means for automatically spacing the typewriter platen in either direction and for any desired number of spaces.

A further object is to provide an improved form of register or totalizer.

A further object is to provide an improved machine of this character which is simple, durable, cheap and compact in construction and effective and efficient in operation and one which may be readily and easily operated.

To the attainment of these ends and the accomplishment of other new and useful objects, as will appear, the invention consists in the features of novelty in the construction, combination and arrangement of the several parts hereinafter more fully described and claimed and shown in the accompanying drawings illustrating an embodiment of the invention, and in which—

Figure 1 is a diagrammatic front elevation of an improved machine of this character constructed in accordance with the principles of this invention.

Fig. 2 is a diagrammatic top plan view.

Figs. 3, 4 and 5 are top plan views, partly in section and with parts broken away, of the operating mechanism with the typewriter proper removed.

Fig. 5$^a$ is a sectional view on line 5$^a$—5$^a$ of Figs. 3 and 4.

Figure 6:
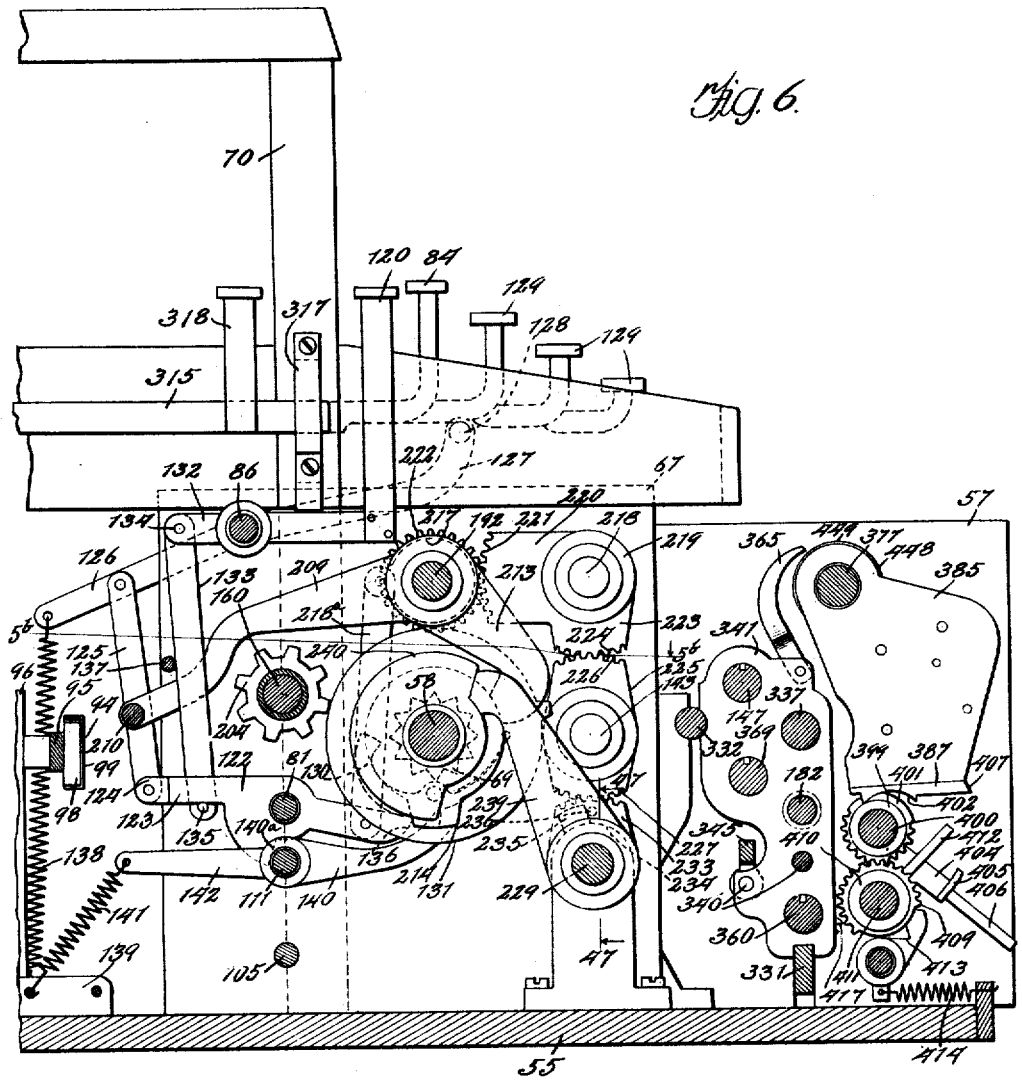

Fig. 5$^b$ is a detail sectional view on line 5$^b$—5$^b$ of Fig. 6.

Fig. 6 is a detail sectional view on line 6—6 of Fig. 3 looking in the direction of the arrows.

Figure 7:
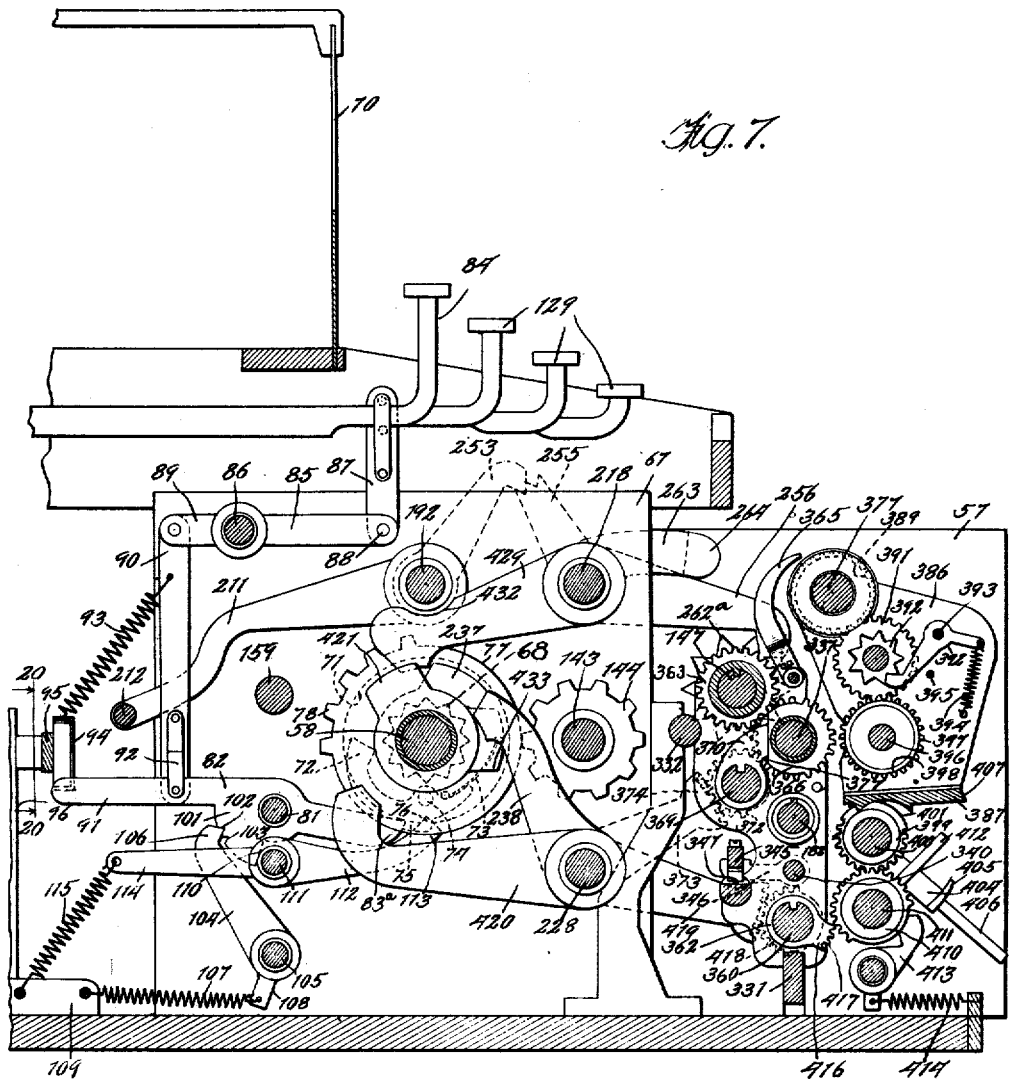

Fig. 7 is a sectional view on line 7—7 of Fig. 4, looking in the direction of the arrows.

Figure 8:
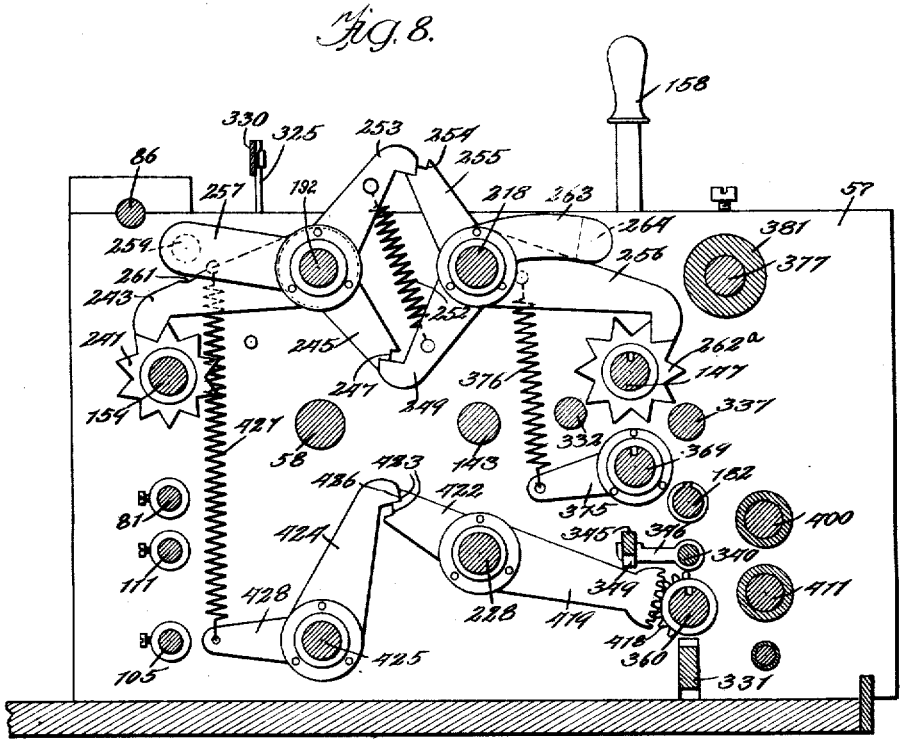

Fig. 8 is a detail sectional view on line 8—8 of Fig. 5.

Figure 9:
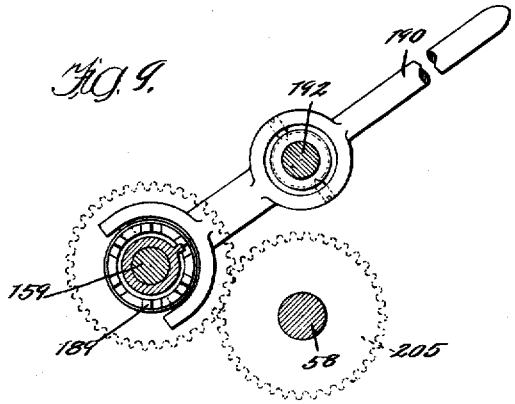

Fig. 9 is a sectional view on line 9—9 of Fig. 5.

Fig. 10 is a sectional view on line 10—10 of Fig. 3.

Fig. 11 is a detail elevation of one of the operating gears showing the trigger or dog for locking the gear for operation with the main power shaft.

Fig. 12 is an enlarged sectional view taken on line 12—12 of Fig. 2, looking in the direction of the arrows.

Fig. 13 is a left hand end elevation of Fig. 3.

Fig. 14 is a right hand end elevation of Fig. 5.

Fig. 15 is a detail sectional view on line 15—15 of Fig. 5.

Fig. 16 is an enlarged detail top plan view of the spacing mechanism of the typewriter carriage and platen.

Fig. 17 is a detail sectional view on line 17—17 of Fig. 12.

Fig. 18 is a detail sectional view on line 18—18 of Fig. 16.

Fig. 19 is an enlarged detail view of the platen-driving gears appearing at the right-hand end of the machine, as shown in Fig. 2.

Fig. 20 is a detail sectional view on line 20—20 of Fig. 7.

Fig. 21 is a sectional view on line 21—21 of Fig. 20.

Fig. 22 is a detail perspective view of one of the releasing triggers or members for locking or unlocking the operating gears to the main power shaft.

Fig. 23 is a detail perspective view of one of the locking members for preventing the operation of one of the keys when another key has already been operated.

Fig. 24 is a detail sectional view on line 24—24 of Fig. 22.

Fig. 25 is a detail sectional view on line 25—25 of Figs. 3, 4 and 5, looking in the direction of the arrows and from behind the totalizers or registers.

Fig. 26 is an enlarged sectional view on line 26—26 of Fig. 25.

Fig. 27 is a detail perspective view of the operating member for the reciprocating totalizer operating carriages.

Fig. 28 is a detail sectional view, partly in elevation, of the member for imparting movement to the operating member of the reciprocating totalizer for operating the carriages in one direction.

Fig. 29 is an enlarged elevation of one of the totalizers or registers as viewed from the front of the machine and showing the mechanism for setting the same to be active or inactive, the mechanism being indicated in the position assumed at the time a digit of a number is being run into a totalizer set to be active.

Fig. 30 is a detail sectional view on line 30—30 of Fig. 29.

Fig. 31 is a detail perspective view of the shield of the totalizer or register.

Fig. 32 is a sectional view on line 32—32 of Fig. 30.

Fig. 33 is an irregular sectional view on line 33—33 of Fig. 29, the parts of the mechanism being indicated in the positions assumed at the time a digit of a number is being run into a totalizer set to be active.

Fig. 34 is a detail perspective view of one of the locking dogs or detents for the number wheels of the totalizers or registers.

Fig. 35 is a detail perspective view of the alining dog or member for the mutilated operating gears on the totalizer operating carriage.

Figure 36:
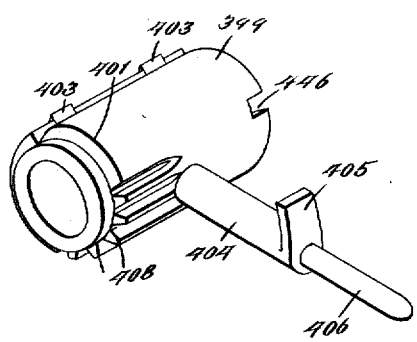

Fig. 36 is a perspective view of one of the shifting members of the totalizers or registers.

Figure 37:
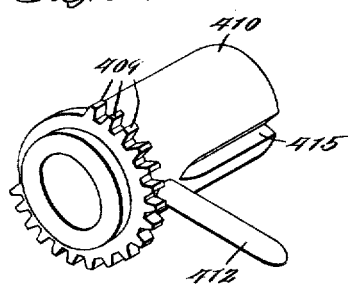

Fig. 37 is a perspective view of the other shifting member for the totalizers or registers.

Figure 38:
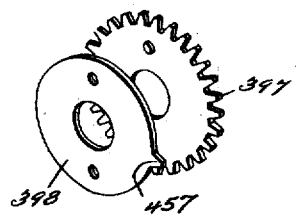

Fig. 38 is a detail perspective view of one of the operating gears for the totalizer or register and the carrying disk or washer showing the two separated.

Figure 39:
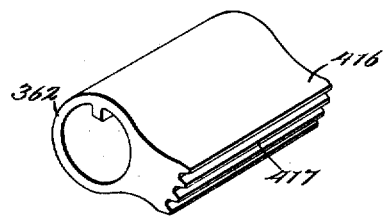

Fig. 39 is a perspective view of the member or sleeve for imparting motion to the mechanism for moving the totalizers or registers into and out of operative position, as each digit of a number is entered.

Figure 40:
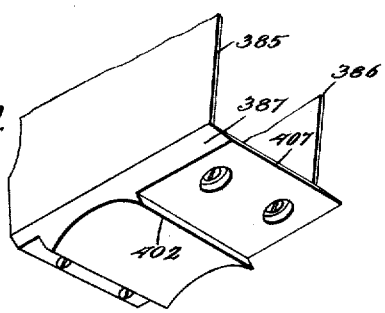
Figure 41:
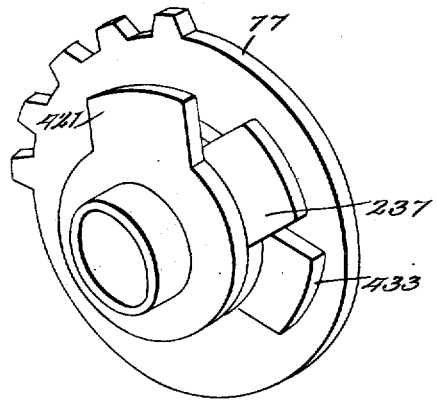
Figure 42:
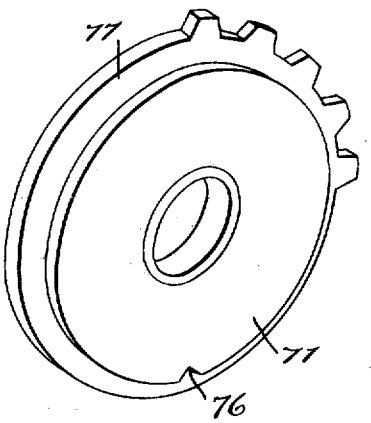
Figure 43:
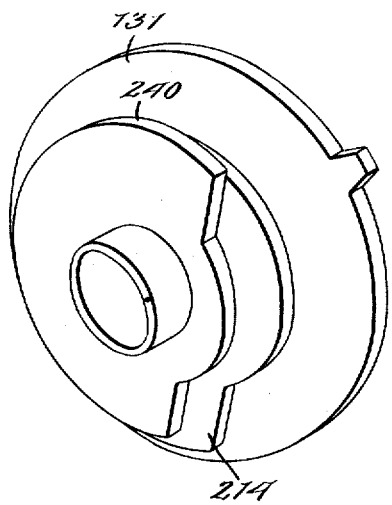
Figure 44:
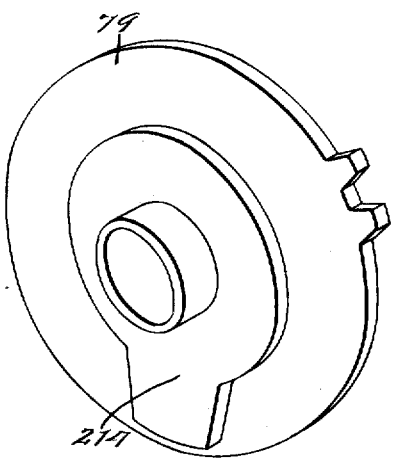

Fig. 40 is a detail perspective view of the lower portion of the totalizer or register frame.

Figs. 41, 42, 43 and 44 are detail perspective views of the operating gears which are adapted to be locked to the main power shaft and their associated operating cams.

Fig. 45 is a detail sectional view on line 45—45 of Fig. 12.

Fig. 46 is a diagrammatic view of the face of one of the number-bearing wheels of the totalizer or register, the alternate numbers being differentiated so as to form two series, as indicated in full and broken lines.

Fig. 47 is a diagrammatic view showing one series of numbers exposed through the shield of the totalizer or register and another set of numbers which would be exposed with the dial wheels in the same relative positions, but with the shield in its shifted position.

Fig. 48 is a fragmentary view in side elevation with parts broken away and in section to show the underlying structure, and showing the printing or type-bar mechanism, which, for the sake of simplicity, has been omitted from the other figures.

Fig. 49 is a diagram illustrating the successive readings of a number of totalizers used to effect a computation involving cross-footing and column-footing of numbers written in different columns on the work-sheet of the typewriter.

Fig. 50 is a diagram representing the numbers which would be typewritten on the work-sheet when effecting such a computation.

Fig. 51 is a diagram representing the successive readings of certain of the totalizers when effecting a computation involving the writing of numbers in different columns, and in which a number written in one column is to be subtracted from a number written in the corresponding line of another column.

Fig. 52 is a diagram illustrating the numbers which would be typewritten on the work-sheet when effecting such a computation.

Referring more particularly to the drawings and in the present exemplification of the invention there is provided a base 55 (Figs. 3 to 5) and spaced upright walls 56, 57, to form a frame or support for the mechanism. The walls are preferably located at the ends of the base and adjacent the front thereof and form supports or bearings for the various shafts. Extending across the base and journaled in the walls 56, 57, is a shaft 58, (Figs. 5$^b$ and 7) one end 59 of which projects beyond one of the walls or supports at the end of the base, preferably at the right hand end thereof and this projecting extremity may be journaled in a suitable bearing 60. (See Fig. 5). A gear wheel 61 is secured to the shaft 58 preferably between the bearing 60 and the wall or support 57 and is secured for rotation with the shaft by means of a suitable fastening device 62, such as a screw or the like. In operation this shaft 58 is continuously rotated in any desired or suitable manner, preferably by means of a motor 63 (Fig. 2) which has an operative connection with the gear 61 through the medium of the gear 64 (Fig. 5) on the motor shaft 65. The shaft 58 also passes through suitable spaced supports 66, 67, which are arranged between the end walls or supports 56, 57, preferably adjacent the longitudinal center of the machine.

In the embodiment used to illustrate this invention, the power-actuated parts to be described hereinafter receive their motion directly or indirectly from the continuously rotating shaft 58; normally, however, none of these parts, except such as are necessary to make the clutching connections with the shaft 58, are connected in driven relation with the shaft until connected by more or less directly manually controlled means.

The more immediate means for connecting the valuating mechanism and the platen spacing mechanism so as to be operated from the continuously rotating shaft 58 will now be described.

Secured to the shaft 58 for rotation therewith are a plurality of toothed or ratchet members 68, 69 (Figs. 3 to 5, 6, 7 and 11), the series 68 (Fig. 4) being spaced from each other longitudinally of the shaft and arranged preferably between the supports 66, 67. This series 68 is preferably comprised of nine of such members or one member for each of the number keys of a typewriter designated generally by the reference numeral 70 (Figs. 1 and 2), from 1 to 9. Two series of the members 69 (Fig. 5$^b$) are ranged on the shaft 58, one series being arranged outside of and adjacent each of the respective supports 66, 67. These series 69, which form a part of the control for the spacing of the platen predetermined amounts both longitudinally to the right and left and rotatably up and down, preferably each comprise five members, which are spaced from each other longitudinally of the shaft.

Associated with each of the toothed or ratchet members 68, 69, is a disk 71 (see Fig. 11) which disks are mounted loosely upon the shaft 58. Supported by each of the disks is a clutching or locking dog 72 which is adapted to engage between the teeth of the respective toothed or ratchet members for locking the disks for rotation with the shaft 58. These dogs 72 are normally held out of engagement with the ratchet members in a manner to be set forth and a spring 73 is provided, which is secured to the disk 71 and engages the dog on one side of the pivot point 74 thereof so as to move the dog into engagement with the ratchet members when the dog is released. These dogs are each provided with a projecting portion 75 to form a shoulder to be engaged by another member to be described, to disconnect the dogs from and hold them out of engagement with the clutch ratchets 68, 69. The disks 71 are each provided with a locking notch 76 (Figs. 11 and 42) in the periphery thereof to be engaged so as to hold the disks in their initial positions. Loosely mounted upon the shaft 58 and secured to the respective disks 71 in any desired or suitable manner and for rotation therewith are mutilated gears 77. The gears 77 which are secured to the series of disks 71 between the supports 66, 67, and which gears are controlled by the numeral keys of the typewriter 70, are provided with a different number of peripheral teeth 78 corresponding to the value of the associated numeral key, and the gears are so arranged that the number of teeth progress from 1 to 9 preferably from the left hand side of the machine or adjacent the support 67, that is to say, the gear 77 nearest the support 67 is provided with one tooth while succeeding gears are each provided with one tooth more than the one preceding, as shown more clearly in Figs. 4 and 5$^a$ of the drawings. These gears are controlled and locked for rotation with the shaft 58 by the numeral keys of the typewriter bearing the same number as the number of teeth on the respective gears so that when one of the keys of the typewriter is operated, say, for example, the key 5, the gear 77 containing five peripheral teeth 78, will be locked for rotation with the shaft 58 by the corresponding clutch comprising one of the locking dogs 72 and one of the ratchet wheels 68.

For the spacing mechanism additional series of gears 79, 80 are arranged respectively adjacent each of the supports 66, 67 and on the outside thereof. Each of these latter series preferably comprises five gears constructed in a manner similar to the gears 77, but arranged so that the gear containing one tooth of each series is adjacent each of the respective supports 66, 67, and the remaining gears are so arranged that the number of teeth on the respective gears will progress from 1 to 5 in directions from the respective supports 66, 67 toward the respective ends of the machine. This forms part of the mechanism for letter and line spacing of the platen predetermined amounts from one to five spaces, respectively, to the left or right and forward or backward.

As we have seen above, the springs 73 normally tend to force the clutch members 72 into engagement with the clutching members 68, 69 so as to tend to connect all of the valuating mutilated gears individually with the continuously rotating shaft 58. This action of the springs 73, however, is prevented, as will now be described, until one of the controlling keys has been struck, as for example, one of the numeral keys of the typewriting mechanism 70. Pivotally mounted upon a suitable support 81 (see particularly Figs. 6 and 7) such as a bar or rod which extends through the supports 66, 67, are a plurality of tripping members or triggers 82, 83, 122, one for each of the sets comprising the respective gears 77, 79, 80, disks 71 and dogs 72. These tripping members or triggers 82, 83, 122, are pivotally mounted intermediate their ends. The series of the tripping members or triggers 82 are arranged between the supports 66, 67, and cooperate with the gears therebetween. The extremity 83ª of each of the triggers 82 is arranged in close proximity to the shoulder 75 of the dog 72 and is adapted to move into the path of movement of the shoulder so as to rock the dog about its point of pivotal support to move the same out of engagement with the toothed or ratchet members 68 and against the tension of the spring 73. When the tripping members or triggers 82 are rocked about their points of pivotal support 81 to move the extremity 83ª out of engagement with the shoulder 75 of the dog 72, the latter will move under the influence of the spring 73 into engagement with the toothed or ratchet member 68, and the extremity 83ª will rest against the dog beyond the shoulder until the dog, connected in driving relation with the shaft 58, rotates from under it. The typewriter 70 is supported upon suitable supports so as to extend across the space between the supports 66, 67, and in such a position that each of the number keys 84, with the exception of the zero key, will stand above one of the gears 77 and the respective tripping member or trigger 82. Any suitable connection may be provided between the respective number keys 84 and the triggers 82. Such a connection comprises an arm 85, Fig. 7, which is pivoted intermediate its ends to a suitable support 86, such as a bar or rod or the like which has a bearing in the supports 66, 67, and extends therethrough and also has bearings in the ends or walls 56, 57, of the frame, as shown more clearly in Figs. 3, 4 and 5.

Each of the keys 84 is connected by means of a link 87, Fig. 71, to one extremity of the respective arms 85 through the medium of a pivotal connection 88ª. The other extremities 89 of the arms 85 are connected by means of suitable links 90 to the end 91 of the respective tripping member or trigger 82 by means of a suitable clip or fastening device 92, Figs. 7, 22 and 24, which engages the end 91 of the tripping member or trigger remote from the extremity 83ª thereof, so that when the respective key 84 is depressed, the arm 85 will be rocked about its pivot 86 to raise the link 90 and the extremity 91 of the tripping dog or trigger 82.

Any suitable means may be provided for returning the key 84 after its operation and for moving the extremity 83ª of the tripping member or trigger 82 into the path of movement of the shoulder 75 of the dog 72 so that as the respective gear 77 and disk 71 rotate, the shoulder 75 will engage the extremity 83ª of the tripping member to rock the dog 72 and thereby automatically unlock, unclutch or release the mutilated gear from the shaft 58. A suitable and efficient means for accomplishing this purpose comprises an elastic member 93 such as a coil spring or the like, one extremity of which may be secured to the link 90 and the other extremity to a suitable fixed support.

In order to prevent the operation of more than one of the numeral keys 84 at a time, a suitable key-locking mechanism may be provided, which preferably comprises a frame or housing having spaced front and back walls 94, 95, Figs. 7, 20 and 21, which is held in position by means of suitable supports 96 and extends across the rear of the machine as designated generally by the reference numeral 97 in Figs. 3, 4 and 5. Arranged within the housing thus formed are a plurality of upright members 98, Figs. 20, 21 and 23, which are preferably circular in configuration and are arranged end to end within the housing. The housing is provided with slots 99 which open downwardly through the bottom thereof and the members 98 are arranged within the housing so that the slots will be disposed between the edges of two adjacent members 98. The members 98 are held for a limited longitudinal engagement in the housing by means of suitable members 100, which members 100 permit the members 98 to move within the housing a distance equal to the width of the extremities 91 of the tripping members or triggers 82. The extremities 91 of the tripping members 82 are of a length to terminate in the lower part of one of the slots 91 in the housing, as shown more clearly in Figs. 7, 20, 21, so that when the extremity 91 of one of the tripping members is raised by the depression of the key, said extremity will separate the two adjacent members 98 which will move the remaining members 98 in the housing to such positions as to close the remaining slots 99 and thus obstruct the movement of the extremities 91 of the remaining dogs 92. The members 98 being circular in configuration and being arranged in upright planes, the adjacent curved surfaces will facilitate the entering of the extremities 91 of the tripping members between the said members 98. When one of the extremities 91 of the tripping members 82 has assumed this position, the members 98 will be held against further adjustment and will thereby prevent the operation of another of the tripping members.

The tripping members or triggers 82 are preferably provided with an enlarged portion 101 (Fig. 22) which is provided with spaced notches 102, 103, in the edge thereof and a retaining dog 104 (Fig. 7) is pivotally mounted upon a suitable support 105 and is adapted to coöperate with the notches 102, 103 to hold the tripping member or trigger in an operative position to hold the dog 72 out of engagement with the toothed or ratchet member 68 when the extremity 106 (see Fig. 7) of the dog enters the notch 102. A suitable elastic member 107 is connected by one extremity to a projection 108 on the dog and by its other extremity to a fixed support 109 and this elastic member 107 tends normally to force the extremity 106 into one of the notches 102, 103, according to the position of the tripping member 82. As the extremity 83ᵃ of the tripping member is moved out of engagement with the shoulder 75 of the dog 72, the elastic member 107 will yield to permit the extremity 106 of the dog to pass out of the notch 102 and into the notch 103. When in this position the extremity 83ᵃ will be held out of the path of movement of the shoulder 75. This elastic member 107, however, is of sufficient tension to hold the tripping member only temporarily and for the purpose of insuring the proper operation of the tripping member. The tripping members or triggers may be also provided with a shoulder 110 for limiting the movement thereof under the influence of the elastic member 93 when the key is released and this shoulder 110 coöperates with a suitable stop 111 which latter extends across the machine and is preferably in the form of a bar or rod located in close proximity to the support 81. Pivotally mounted upon this stop 111 are a plurality of retaining dogs 112, the extremity 113 of which coöperates with the notches 76 (Figs. 7 and 42) in the periphery of the respective disk 71 for arresting the movement of the disk and the associated gear 77 when the disk and gear are released or unlocked from the shaft 58 and holding them in a position corresponding to the initial position thereof. Each of the dogs 112 is provided with an extension 114 which preferably extends to the other side of bar or support 111, and a suitable elastic member 115 is secured by one extremity to the portion 114 and by the other extremity to a suitable fixed support such as the support 109 and this elastic member 115 exerts its tension to cause the extremity 113 of the dog to rest against the periphery of the disk as the latter rotates and to cause the extremity to enter the notch 76 when the latter is in position to receive the dog. When a disk 71 is driven again by positive connection with shaft 58, the cam sides of the V-notch 76 will force the yieldingly held dog 112 therefrom, the dog 112 merely acting as a justifier and drag, to determine the home position of the disk when disconnected from shaft 58.

The gears 80 on the right hand side of the typewriter 70 and beyond the partition 66 are controlled by a series of spacing keys 116 (Figs. 1 and 2), one for each of the gears. These keys (similar to key 120, Fig. 6) are pivotally mounted upon the support 86 and are connected to tripping members or triggers 83 (Fig. 5ᵇ) which are similar in construction to the tripping members or triggers 82, and elastic members 117, (Fig. 5) similar to the elastic members 93, are provided for returning the keys 116 to their normal position.

A series of spacing keys 118 (Figs. 1 and 3), similar to the keys 116, are also pivotally mounted upon the support 86 but on the other side of the machine preferably beyond the other support 67, and elastic members 119 similar to the members 117 are provided for returning the keys 118 to their normal position after having been operated. These keys 118 control the gears 79 in a manner similar to the manner in which the gears 77 are controlled. The tripping members or triggers 83 of all of the gears 79 and 80 with the exception of the tripping member which is controlled by the spacing key 120 of the series 118 are provided with extensions 121, similar to the extensions 91 of the tripping member or trigger 82, which extensions are adapted to enter the space between the locking members 98 to lock the remaining keys against operation when one of the keys has been depressed. The tripping member or trigger 122 (Fig. 6) which is controlled by the key 120 of the series 118 is pivotally mounted intermediate its ends to the support 81 in a manner similar to the other tripping members but its extremity 123 is preferably offset or deflected as at 124 (Figs. 3 and 4), which deflected extremity is connected by means of a link 125 (Fig. 6) to the portion 126 of an arm which is pivotally supported intermediate its ends by the support 86. The other portion 127 of the arm extends beyond the opposite side of the support 86 and is connected by means of a universal bar or rod 128 to an arm similar to the portion 127 and this bar 128 extends below the letter keys 129 of the typewriter and acts as a universal bar whereby at the depression of any one of the letter keys 129, the bar 128 will be depressed to rock the arm and shift the tripping member or trigger 122 to release the dog 130 in a manner similar to the manner in which the dogs 72 are released. The release of the dog 130 causes it to complete or make the clutch of which it is a part, so as to connect the one-tooth mutilated gear 131 in driven relation with the shaft 58, so as to cause, in a manner to be described, a letter-space movement of the platen on the typewriter carriage. The supporting portion of the key 120 projects beyond the support 86, as at 132 and a link 133 is pivotally connected by one extremity as at 134 to the portion 132, and depends therefrom and terminates adjacent the tripping member or trigger 122. This link is provided with a laterally projecting lug or extension 135 (see Fig. 6) which extends below the portion 123 of the tripping member or trigger 122 so that when the key 120 is depressed the link 133 will be elevated and will raise the portion 123 of the tripping member or trigger 122 to depress the extremity 136 of the trigger to release the dog 130. If desired, a suitable member 137, such as a stud or projection, may be provided which extends beyond the support 67 adjacent the link 133 to be engaged thereby so that the link will be held in proper position to operate the tripping member or trigger 122.

The tripping member or trigger 122 may be returned to its normal or operative position to lock the dog 130 out of engagement with the toothed or ratchet member 69 by means of a suitable elastic member 138 which may be connected to the portion 126 of the arm and also to a suitable fixed support 139. This tripping member or trigger may also be provided with a shoulder 140ª which coöperates with the support 111 to limit the movement of the releasing member or trigger under the influence of the elastic member 138. A retaining dog 140 similar to the retaining dogs 112 may be provided for controlling the movement of the disk which supports the dog 130, and an elastic member 141 is provided which is connected by one extremity to a projecting portion 142 of the dog 140 and by its other extremity to a suitable fixed support, such as the support 139, and this elastic member 141 acts in a manner similar to the elastic member 115. The function of this dog 140 is to yield when the disk is positively connected to be driven with the shaft 58, and yet positive enough to stop the disk when disconnected at its home position.

We will now consider the gearing connecting the valuating mechanism with the actuating mechanism for the registering mechanism. Arranged adjacent the shaft 58 and parallel thereto is a shaft 143, one end of which has a bearing in the end wall or support 57 and the other end terminates adjacent and has a bearing in the support 67, as shown more clearly in Figs. 5ª, 5ᵇ and 11. Secured to this shaft 143 and for rotation therewith is a series of gears 144, which gears are spaced from each other longitudinally of the shaft and one of the gears is arranged to be engaged by the teeth 78 of each of the gears 77 so that when the respective gears 77 are locked to the shaft 58 for rotation therewith, in the manner above set forth, this gear will engage the respective gear 144 on the shaft 143 and rotate this latter shaft a number of steps of rotation equal to the number of teeth 78 on the gear 77 which is locked for rotation with the shaft 58. The extremity of the shaft 143 is extended beyond the support or wall 57, as shown more clearly in Figs. 5, 14 and 15, and secured to this projecting extremity are spaced gears 145, 146, forming part of a reversing mechanism whereby either addition or subtraction may be performed.

Arranged in front of the shaft 143 and extending entirely across the machine, with its ends journaled in the walls or supports 56, 57, is a master or actuating shaft 147, one extremity of which projects beyond the wall or support 57 and loosely mounted upon the projecting extremity are gears 148, 149. The gear 149 meshes with the gear 146 and the gear 148 meshes with an intermediate gear 150 which latter is journaled upon a stub shaft supported by the wall 57 and in turn meshes with the gear 145. The gears 148, 149 are respectively provided with clutch faces 151, 152, and keyed to the shaft 147 between the gears and their respective clutch faces is a sleeve or collar 153 which is provided on opposite ends with clutch faces 154, 155, adapted to respectively coöperate with the clutch faces 151, 152, of the gears 148, 149. The sleeve or collar 153 is keyed to the shaft 147 by means of a suitable key 156, as shown more clearly in Fig. 15, so that the sleeve or collar may be shifted longitudinally on the shaft into or out of engagement with the respective clutch faces 151, 152, of the gears 148, 149, to cause the shaft 147 to rotate either forwardly or backwardly according to which gear 148 or 149 is secured for rotation with the shaft 147 by means of the sleeve or collar. A yoke 157 is provided for shifting the sleeve or collar 153 and a handle 158, located in a convenient position for the operator, is provided for manipulating the yoke. This then forms a state controlling mechanism whereby the direction of rotation of the actuating or master shaft 147, and the parts operated thereby, can be controlled, and whereby the registering totalizers or computing heads, which will be mentioned hereinafter, can be caused to change their direction of action, and thus the character or state of their action as to adding and subtracting.

We now come to the driving connections between the platen of the typewriting mechanism 70 and the controlling mechanism which determines the extent and direction of spacing of the platen predetermined amounts, in this instance from one to five spaces, and which also controls the direction and extent of movement of certain parts of the master or actuating mechanism for the registering mechanism. Arranged to the rear of the shaft 58 and extending entirely across the machine parallel with this shaft is a sectional shaft comprising the sections 159, 160 which are arranged end to end, as shown more clearly in Figs. 3, 4, 5, 5ª and 5ᵇ. One of the sections 159 is journaled by one end to the wall of support 57 and has a bearing adjacent its other end in the intermediate support 66. The other section 160 has a bearing adjacent its inner end in the support 67 and its other end has a bearing in the wall or support 56 and projects beyond said support for a short distance. Secured respectively to the adjacent ends of the shaft sections 159, 160 are beveled gears 161, 162 (Fig. 4), which are opposed to each other and with which gears an intermediate gear 163 meshes, which latter gear is secured to a shaft 164 (Figs. 4 and 12) arranged at right angles to the shaft sections 159, 160, and is journaled in suitable supports 165, 166, and secured to the extremity of the shaft 164 is a gear 167 which forms part of a train of gearing for moving the platen in either line-feeding or letter-feeding direction, and either forwardly or backwardly.

It is desirable to control the position of the actuating or master mechanism for the registering mechanism to correspond to the writing point of the work sheet on the platen of the typewriting mechanism 70. We will therefore now describe the driving connections between the actuating or master mechanism and one of the driven elements, in this instance the shaft 160, which will be rotated whenever the platen is moved, whereby the above desideratum is attained. Mounted loosely upon the extremity of the shaft section 160 which projects beyond the wall or support 56 is a gear 168 provided with a clutch face 169 (see Figs. 3 and 13), and a clutch member 170 is keyed to the extremity of the shaft as at 171 for rotation with the shaft and for adjustment longitudinally thereof into and out of engagement with the clutch face 169 to lock the gear 168 for rotation with the shaft and a yoke 172 is provided for shifting the clutch member 170. The yoke 172 is adapted to be adjusted by means of a rock shaft 173 to which the yoke is secured and which rock shaft has journals in suitable bearings 174, 175. The shaft 173 is provided with a gear 176 which meshes with a gear 177 on a shaft 178 (Figs. 4 and 12), which latter extends partially across the machine at the rear thereof and is journaled in the bearing 175 and suitable bearings 179. To the free extremity of the shaft 178 is secured an arm 180 which latter is connected by means of a suitable connection 181 to the shift key 320 of the typewriter so that when the shift key is operated the shaft 178 will be rocked in its bearings, which in turn will rock the shaft 173 to shift the clutch member 170 out of clutch, as it is normally held in clutch by a spring 310 secured to the arm 180.

We now come to the specific driving connection between the shaft 160 and the traversing mechanism for the actuating mechanism of the registers. Extending across the front of the machine and below the shaft 147, is a worm or screw shaft 182 (Figs. 25, 26 and 33), the ends of which are journaled in the walls or supports 56, 57. One extremity projects beyond the support 56 and secured thereto is a gear 183 (Figs. 3 and 13) and this gear 183 is driven from the gear 168 on the shaft section 160 through the medium of an intermediate train of gears 184, as shown more clearly in Figs. 3 and 13, so that when the shaft section 160 is rotated a rotary movement will be imparted to the worm or screw shaft 182. The screw shaft 182 can be rotated in one direction or the other according to the direction of rotation of the shaft 160, and thus the direction of movement of the typewriter platen, and by its rotation will determine the corresponding direction of movement of certain parts of the actuating or master mechanism for the registering mechanism.

We will now consider how the platen and thus the register actuating mechanism, moved by the screw shaft, may be given an undetermined movement in either direction by providing a separate driving connection between each of the shafts 159 and 160 and the continuously rotating shaft 58. Mounted loosely and respectively upon the shaft sections 159 and 160, are gears 186, 185 (see Figs. 3 and 5) and these gears are preferably arranged adjacent the ends of the sections which are journaled in the end walls or supports of the machine. The gears are provided with clutch faces 187, 188. Keyed to the shaft section 159 and for adjustment longitudinally thereof is a clutch member 189 which coöperates with the clutch member 187 (Fig. 5) to lock the gear 185 to the shaft section 159 to rotate the latter. This clutch member is adapted to be shifted by means of a suitable operating lever 190 which is pivotally mounted upon a sleeve or collar 191. A rock shaft 192 extends across the machine and is journaled to the end walls or supports 56, 57, and the intermediate supports 66, 67. The sleeve 191 surrounds the rock shaft 192 and is held against longitudinal displacement with respect thereto in any desired or suitable manner, preferably by means of collars 193 which surround the shaft on opposite sides of the sleeve 191 and are themselves locked against longitudinal movement on the shaft in any desired or suitable manner, such as by means of fastening screws 194, so that the lever 190 may be shifted about its point of pivotal support 195 to shift the clutch member 189 and at the same time permit the shaft 192 to be rocked.

Arranged adjacent the clutch face 188 (Fig. 31) of the gear 186 on the corresponding end of the shaft section 160 is a clutch member 196 similar to the clutch member 189 and an operating lever 197 is pivoted as at 198 to a sleeve 199 similar to the sleeve 191 and this latter sleeve is held from displacement longitudinally with respect to the rock shaft 192 by means of collars 200 similar to the collars 193. Elastic members 201, 202 (Figs. 5 and 3 respectively), such as coil springs or the like, are provided respectively for the levers 190, 197. One extremity of each of these elastic members is secured to the respective lever and the other extremities are secured to suitable fixed supports and tend normally to hold the clutch members 189, 196 out of engagement with the clutch faces 187, 188. Secured to the shaft 58 so as to rotate continuously therewith, there are provided a pair of gears 205 and 206, which mesh respectively with the loosely mounted gears 185 and 186, so as to continuously rotate the same. By moving one or the other of the levers 190, 197, it will be apparent that the shaft section 160 may be rotated in a forward or backward direction according to which of the gears 185, 186 is locked to the shaft sections, and thereby control the direction of rotation of the worm or screw shaft 182.

Having omitted for the time being the description of the direct connection between the mutilated gears 79 and 80 of the platen and actuating mechanism controlling mechanisms and the shafts 159 and 160, we will now take up the same. Secured to the shaft section 159 and for rotation therewith (Fig. 5,) is a plurality of toothed or gear wheels 203. (See Figs. 5 and 5ᵇ). One of these toothed or gear wheels 203 is arranged adjacent each of the mutilated gears 80 and with which the teeth on the respective mutilated gears mesh so that when any one of the mutilated gears 80 is locked for rotation with the shaft 58, the shaft section 159 will be rotated and through the medium of the connecting gears 161, 162, 163, motion will be imparted to the shaft section 160 and the shaft 164. The degree or extent of rotation of the shaft section 159, and consequently the shaft section 160 and the shaft 164, will be controlled by the number of teeth on the gear 80 which is locked to the shaft 58.

A similar set of toothed wheels or gears 204 are secured to the shaft section 160 and are arranged adjacent the gears 79, one for each of the latter said gears and respectively in register therewith so that when any one of the gears 79 is locked for rotation with the shaft 58, the shaft section 160 will be directly rotated and the degree or extent of rotation will be governed or controlled by the number of teeth on the gear 79 which is locked to the shaft 58. It will thus be seen that the shaft 164, connected to the carriage and platen-spacing mechanism, and the master mechanism traversing screw shaft 182, can be rotated either an undetermined variable amount, or a determined variable amount, and also either in one direction or the other. That is to say, if it is desired to rotate the shafts 164 and 182 an undetermined amount in one direction, the lever 197 will be manipulated to connect the shaft section 160 in driven relation with the shaft 58, through the intermediary of the gears 186 and 206. If it is desired to rotate the shafts 164 and 182 an undetermined amount in the opposite direction, the lever 190 will be manipulated to connect the shaft 58 in driving relation with the shaft 159 through the intermediary of the gears 185 and 205. If it is desired to rotate the shafts 164 and 182 a predetermined movement from one to five steps in the first direction, one of the keys 120, 118 will be struck, which will momentarily connect the shaft section 160 in driven relation with the constantly rotating shaft 58, a period determined by the number of teeth on the mutilated gear clutched to the shaft 58, and thus depending on the value of the key 120, 118 struck. If a predetermined rotation of the shafts 164, 182 is desired in the opposite direction, amount from one to five steps, one of the keys 116 will be struck, whereby the shaft section 159 will be driven anywhere from one to five steps according to the value of the key struck.

The keys of the typewriter are returned to their normal position after having been operated in the ordinary and usual manner and the keys of the series 116, 118, are respectively returned by means of the springs 117, 119. It sometimes happens that the key returning springs or mechanisms do not act properly so as to return the keys and to force the extensions 91 of the triggers 82, and the extensions 121 of the triggers 83 which pass between the key locking members 98 from between the members. Positive mechanism is therefore provided for performing these operations, so that the extensions of the triggers will be forced from between the locking members. Such a mechanism is provided for each of the series of keys 116, 118, and also for the keys of the typewriter, and comprises a pair of spaced arms 207 (Fig. 5) which are secured at one extremity preferably to the rock shaft 192 and adjacent the series of keys 116. The free extremities of these arms extend toward the projecting extremities of the respective triggers 83 and are connected by means of a cross bar or member 208 which latter is arranged above and extends transversely across the extensions on the respective triggers. A similar pair of spaced arms 209 (Figs. 3 and 6) are secured by one extremity to the rock shaft 192 adjacent the series of keys 118 and the free extremities of these arms 209 are connected by a cross bar or member 210 which extends transversely of the extensions 121 of the triggers and above the same, in a manner similar to the cross bar or member 208.

Spaced arms 211 Figs. 4 and 7 are secured by one extremity to the rock shaft 192 adjacent the triggers or tripping members 82 which are controlled by the numeral keys of the typewriter and are preferably arranged between the supports 66, 67. The free extremities of these arms 211 are connected by a cross bar or member 212 which extends transversely with respect to and across the extensions 91 and above the latter.

All of these releasing mechanisms are operated simultaneously and each time the shaft 192 is rocked, the respective cross bar or connecting members 208, 210, 212 will be moved into engagement with the respective extension 91, or 121, of any of the triggers of the respective series, which have been moved by the controlling key so as to pass between the locking members 98 and force the respective extension from between the locking members and into their normal position.

The shaft 192 is rocked after the actuation of any one of the keys 84, 116 and 118, and such a movement is imparted to the shaft 192 preferably from the shaft 58. Considering first the means for rocking the shaft 192, after an actuation of one of the spacing keys 116 or 118, a plurality of arms or dogs 213 are provided, one arm for each of the keys of the series 116 and 118. These arms are secured by one extremity to the rock shaft 192 (as shown more clearly in Fig. 6) and the free extremities thereof depend from the shaft and project preferably in front of the shaft 58 and terminate in proximity thereto. One of the arms 213 is arranged adjacent each of the gears 79, 80, and to one side thereof. Secured to rotate with each of the gears 79, 80, and to engage and rock the extremity of the respective dog or arm 213 is a cam 214 (as shown more clearly in Figs. 43 and 44). These cams 214 are preferably secured to the respective gears 79, 80, so that when any one of the gears is locked for rotation with the shaft 58, the respective cam 214 will engage one of the arms or dogs 213 to rock the shaft 192. After the shaft 192 has been thus rocked, it may be returned to its normal position in any desired or suitable manner, but preferably by means of an elastic member 215 (see Fig. 3), one extremity of which is secured preferably to the cross bar 210 and the other extremity is anchored to a suitable support 216. When any of the letter keys 129 of the typewriter are actuated, they rock the trigger 122 through the medium of the universal bar 128, permitting the single spacer one toothed gear 131 to rotate with the shaft 58, so that the cam 214 carried thereby will rock the shaft 192 through the medium of its corresponding arm 213. When any of the numeral keys 84 of the typewriter are operated to release the locking mechanisms of the gears 77, the extremities 91 of the respective tripping members or triggers 82 will be moved to their original position by means of the spaced arms 211 and the connecting bar 212 (Figs. 4 and 7) and the shaft 192 will be rocked through the medium of the cam 214 which is secured for rotation with the one-toothed gear 131 (Figs. 3 and 6) in a manner as will now be described. It will be noted in passing that this mechanism, moreover, brings about a delayed spacing movement in the regular letter spacing direction of the platen and a corresponding movement of the master or actuating mechanism for the registering mechanism, by tripping the trigger 122. Loosely mounted upon the rock shaft 192 is a sleeve or collar 217 (see Figs. 4 and 6) and this sleeve or collar is connected by means of a link 218ª to the tripping member or trigger 122 so that when the sleeve or collar is rotated about the shaft 192, the link 218ᵃ will move the extremity 136 of the tripping member out of the path of the shoulder on the dog 130, and will act to release the tripping member or trigger independently of the mechanism through which the latter is tripped from the key 120.

Arranged adjacent the rock shaft 192 and journaled in the end wall or support 57 and the intermediate supports 66, 67, is a rock shaft 218, one extremity of which projects beyond the support 67, and loosely mounted thereon is a bell crank lever 219 (see Figs. 5ᵃ and 6), one arm 220 of which is provided with teeth 221 which mesh with teeth 222 on the sleeve or collar 217. The other arm 223 of the bell crank is provided with teeth 224 meshing with teeth 226 on a member 225 loosely mounted intermediate its ends upon one extremity of the shaft 143, (see Fig. 5ᵃ).

Arranged below the shaft 143 is a shaft comprising two sections 228, 229 arranged end to end and extending across the machine parallel with the shaft 143. The section 228 is journaled in the end wall or support 57 and extends beyond the intermediate support 67 and has a bearing in the support 230. The other section 229 also has a bearing in the support 230 and the other end wall 56. The adjacent extremities of the shaft sections 228, 229, are respectively provided with shoulders 231, 232 by means of which motion may be imparted to one of the sections by the other section and each section is capable of a limited independent movement with respect to the other.

Loosely mounted upon the section 228 and adjacent the support 67 is a toothed segment 233 with which the teeth 227 on the member 225 mesh so that when the segment 233 is rocked the bell crank lever 219 will be rocked through the medium of the member 225 to shift the tripping member or trigger 122 to lock the cam of the one-toothed gear 131 to the shaft 58. The segment 233 is rocked by means of the shaft section 228 through the medium of a sleeve or collar 234 which is secured for rotation with the shaft 228 and is provided with a projection 235 which is adapted to engage a pin or extension 236 (Figs. 5ᵃ and 6) on the segment 233, which pin or projection stands within the path of movement in one direction of the projection 235.

The shaft section 228 receives its rocking movement from the shaft 58 through the medium of a series of cams 237 (Figs. 5ᵃ, 5ᵇ and 7) which are secured to and for rotation with the series of gears 77, and which cams are preferably similar to the cams 214. These cams 237 are each adapted to engage an arm 238, which arms are secured by one extremity to the shaft section 228 so that when one of the gears 77 is locked for rotation with the shaft 58, its cam 237 will move the respective arm 238 to rock the shaft section 228 the moment the gear starts to rotate with the shaft 58, as the position of these cams 237 is normally against the end of the respective arm 238.

As the shaft section 228 is thus rocked, the shoulder 231 thereon will engage the shoulder 232 on the shaft section 229 to rock the latter section, for a purpose to be hereinafter set forth, and in order that certain parts of the mechanism, to be described, may perform their proper operations, it is necessary to hold the section 229 against return movement with the section 228. In order to prevent such return movement of the section 229 an arm 239 is provided which is similar to the arms 238 and is secured by one extremity of the shaft section 229, as shown more clearly in Figs. 5ᵃ, 5ᵇ and 6. The free extremity of this arm 239 stands adjacent and coöperates with a cam 240 which is secured to and for rotation with the one-toothed gear 131 so that each time the gear 131 is rotated, after the arm 239 has been rocked by the shaft section 229, the high portion of the cam will move into engagement with the end of the arm and prevent the shaft section 229 from returning until the proper time to permit the shaft section 229 to return, at which time the low portion of the cam will arrive adjacent the end of the arm to permit the latter to move to its normal position.

In order to lock the shaft sections 159, 160 (Figs. 3 to 5) against overthrow, each of the sections is provided respectively with a ratchet or toothed wheel 241, 242 (Figs. 8 and 10), and locking dogs or arms 243, 244 are pivotally mounted by one extremity upon the rock shaft 192 and for independent movement with respect to the shaft, (see Figs. 3, 5, 8 and 10). These locking dogs are respectively provided with projecting portions 245, 246, the free extremities of which are provided with teeth 247, 248, with which locking dogs 249, 250 coöperate, and these dogs are pivotally supported respectively by the shaft 218 and by stub shaft 218ᵇ substantially in alinement with the shaft 218. An elastic member 251 (Fig. 10) such as a coil spring or the like, is anchored by one extremity to a fixed support and is connected by its other extremity to the dog 250 and tends to normally hold the latter in engagement with the teeth 248 of the respective projection 246. A similar elastic member 252 (Fig. 8) is secured by one extremity to the dog 249 to hold the latter in engagement with the teeth 247 of the projection 245 and the other extremity is secured to a dog 253 similar to the dog 249 and which dog 253 coöperates with the toothed extremity 254 of a projection 255 of a dog 256, which latter is provided for a purpose to be hereinafter set forth. Normally the dogs 243, 244 are yieldingly held in engagement with the respective toothed wheels 241, 242, on the shaft sections 159, 160, so as to permit the shaft sections to rotate in the manner already set forth. As the teeth pass under the respective dogs, the retaining dogs 249, 250 will yield and will pass from the space between two of the teeth 247, 248, on the projections 245, 246, into another space to lock the dogs against gravitating movement.

The dogs 243, 244, are held out of engagement with the toothed or ratchet wheels while the shaft sections 159, 160, are being rotated and after the shaft sections have completed their revolution, the dogs are thrown into engagement with the respective toothed wheels, to prevent overthrow of the shaft, by means of arms or projections 257, 258, which latter are secured by one extremity to the rock shaft 192 and for movement therewith. The arms are respectively provided with lateral projections 259, 260, which extend over the respective dogs 243, 244 and are normally held out of engagement with the dogs. When the shaft 192 is rocked in the manner already set forth, the projections 259, 260 on the arms 257, 258 are brought into engagement with the respective dogs 243, 244 and the latter are lowered into engagement with the ratchet or toothed wheels, the dogs 249, 250 yielding to permit such movement of the dogs 243, 244. If desired, the upper faces of the dogs 243, 244 may be provided with recesses 261, 262, to permit the dogs to move a sufficient distance so as not to be engaged by the teeth of the ratchet wheels when the latter rotate.

The master wheel or actuating shaft 147 is also locked against overthrow in a similar manner and for this purpose there is provided a toothed or ratchet wheel 262ª (see Figs. 5 and 8) which is secured to the shaft at one end thereof, preferably adjacent the support or wall 57, which toothed or ratchet wheel is adapted to be engaged by the dog 256, the latter being loosely mounted upon the shaft 218.

As the shaft 147 is rotated through the medium of the gear 148 or 149 and the clutch sleeve 153, the dog 253 will yield to permit the dog 256 to be moved out of engagement with the teeth of the ratchet and the dog 253 will pass from one of the notches or recesses 254 to another notch to lock the dog out of engagement with the ratchet. After the shaft 147 has completed its revolution, the dog 256 will be moved into engagement with the ratchet 262ª by means of an arm 263 which is secured to and for movement with the rock shaft 218 and which arm is preferably provided with a lateral projection 264 which extends over the dog 256 and engages the latter to move the same into engagement with the ratchet wheel, the dog 253 yielding to permit such movement.

The numeral keys 84 (Fig. 48) and the letter keys 129 actuate their key levers to which they are secured, which in turn pull down on links 600 so as to rock bell cranks 601, which are connected to type bars 602, through the medium of links 603, in such a manner as to swing the type bars rearwardly against the front side of a platen 265 of the typewriting mechanism 70. This mechanism may be termed the "printing mechanism" and is merely intended to represent any kind of typewriting printing mechanism actuated in any well known manner by the numeral and letter keys.

We will now consider how the platen 265 obtains its movement from the shafts 159 and 160 under the control of the keys 84, 129, 116 and 118 and the levers 190 and 197. The platen 265 (Figs. 2, 12 and 48) of the typewriter is mounted upon the carriage 266 and this carriage moves between two guides 267 (see Fig. 12). A rack 268 is supported by the carriage and a pinion 269 is provided which engages the rack for intermittently moving the carriage and platen longitudinally in either direction according to the direction of rotation of the pinion 269. This pinion is secured to and for rotation with a shaft section 270 (Figs. 16, 18 and 45) which is journaled in a suitable bearing 271, and a ratchet 272 is also secured to the shaft section 270 preferably on the side of the bearing opposite on which the gear 269 is arranged. This ratchet 272 is provided with a clutch face 273 (Figs. 16 and 45) and the free extremity of the shaft section 270 is preferably reduced as at 274 to form a shoulder 275. One end of another shaft section 276 is arranged adjacent the reduced extremity 274 of the shaft section 270 and this reduced extremity extends into the shaft section 276 so that the shoulder 275 will abut the end of the section 276 to hold the shaft sections in alinement and to prevent longitudinal displacement thereof, also to serve as a support and bearing for the adjacent extremity of the shaft section 276. The free end of the section 276 is supported in a suitable bearing 277 and a gear 278 is secured to and for rotation with the section 276 beyond the bearing. Motion is imparted to the shaft section 276 through the medium of a shaft 279 which is provided with a gear 280 (Figs. 16 and 12) meshing with the gear 278 and a gear 281 meshing with the gear 167 on the shaft 164 so that when the shaft 164 is rotated in either direction, the shaft section 276 will be correspondingly rotated.

When the shaft 164 is rotated either forwardly or backwardly, the gearing is capable of traversing the platen longitudinally in either a letter-spacing direction or in a return direction, or is capable of rotating the platen either forwardly or backwardly. That is to say, the drive of the shaft 164 may be used either to traverse the carriage and thus the platen, or else to rotate the platen. To accomplish this, a shifting clutch mechanism is provided for determining what shall be driven by the shaft 164. This mechanism will now be described.

A sleeve 283 (Figs. 16 and 45) is mounted loosely upon the shaft section 276 and is spaced from the ratchet 272, and keyed upon the sleeve 283 for rotation therewith, and for adjustment longitudinally on the sleeve is a clutch member 284. Arranged between the clutch members 273 and 284 and keyed for rotation with and adjusted longitudinally with respect to one of the shaft sections, preferably the shaft section 276, is a clutch member 285 provided with clutch faces 286, 287, which are respectively disposed toward the clutch faces 273, 284. The clutch faces 273, 284 are spaced from each other a distance slightly greater than the width of the clutch member 285 so that said clutch member may be moved out of engagement with the clutch face 273 without being brought into engagement with the clutch face 284, but the clutch member 284 is adapted to be shifted longitudinally on the sleeve 283 so as to be moved into engagement with the clutch face 287 while the clutch face 286 is in engagement with the clutch face 273, for both rotating the platen and moving it longitudinally.

A dog or pawl 288 (Figs. 16 and 18) is provided which engages the ratchet 272 and is adapted to yield with respect to the ratchet to permit the shaft section 270 to be rotated in either direction. The sleeve 283 is provided with a gear 289 (see Figs. 12 and 16) which engages and meshes with a gear 290 secured to a shaft 291, which latter is journaled in suitable bearings 292 and the shaft 291 is preferably arranged adjacent and is parallel with the shaft sections 276, 270. Secured to the free end of the shaft 291 is a bevel gear 293 which meshes with a bevel gear 294 secured to and for rotation with a shaft 295, which latter is journaled in suitable bearings 296 on the frame work of the machine and this shaft is arranged parallel with the platen 265 of the typewriter carriage. Secured also to the shaft 295 and for rotation therewith is a gear 297 which meshes with an elongated or barrel pinion 300 supported by the carriage and movable with the platen 265 so that the typewriter carriage and platen may be moved longitudinally any desired distance and at the same time the pinion 297 will remain in mesh with the elongated or barrel pinion 300. A gear 301 is secured to the platen 265 and is connected to the elongated pinion 300 for rotation thereby through the medium of a train of gears 302 in the ordinary and well known manner (see Figs. 2, 12 and 19) so that when the elongated pinion 300 is rotated by the pinion 297, an axial rotation will be imparted to the platen 265 in either direction according to the direction of rotation of the pinion 297.

The clutch member 285 may be shifted longitudinally upon the supporting shaft sections 276, 270, to bring the clutch faces 273 and 286 into and out of engagement respectively, in any desired or suitable manner, preferably by means of a yoke 303 (see Figs. 12 and 17) which is pivotally supported by one extremity as at 304 on a suitable support 305 and the free extremity of the yoke engages in a suitable circumferential groove or recess to permit rotation of the clutch member 285, after being shifted. The pivot 304 of the yoke 303 is preferably in the form of a rock shaft (shown more clearly in Fig. 16), the free extremity of which is journaled in a suitable bearing 306 and connected to the rock shaft is an arm 307, which in turn is connected by means of a suitable link 308 with the arm 309 of the typewriter shift key 320 and to which arm 309 the connection 181 which is secured to the arm 180 of the shaft 178 is also connected, so that when the shift key is operated to rock the arm 309 thereof to throw the clutch member 170 (see Fig. 3) out of engagement with the coöperating clutch member 169 on the gear 168, as already described, the yoke 303 will also be rocked to shift the clutch member 285 from the position shown in Figs. 12 and 16, so that the clutch face 286 thereof will be moved out of engagement with the clutch face 273, so as to disconnect the same from the shaft section 276. Any suitable means may be provided for normally holding the clutch member 285 in engagement with the clutch member 273 and for this purpose there may be provided an elastic member 310, one extremity of which is connected to the arm 180 of the shaft 178 and the other extremity is anchored to a suitable support, so that when the shift key is depressed by the operator, a tension will be exerted upon the elastic member 310, which tension serves to move the clutch member 285 into engagement with the clutch member 273 when the operator releases the shift key. When the clutch member 285 is in this position, (Fig. 12) the operation of the shaft 279 will impart a longitudinal adjustment to the platen in either direction according to the direction of rotation of the shaft 164.

In order to shift the clutch member 284 on the sleeve 283 so as to be engaged by the face 287 of the clutch member 285, a yoke 311 is provided, which is connected at one extremity to the member 284 so that the latter may be rotated by the shaft section 276 with respect to the yoke. The other extremity of the yoke is connected to a rock shaft 312 (Fig. 12), which latter is journaled adjacent one extremity in the support 305 and the other end is journaled in the support or bearing 306 (Fig. 16). Connected to the free extremity of the shaft 312 (Fig. 12) is an arm 313, which arm is connected by means of a suitable link 314, to one extremity of an operating lever 315, which latter is pivotally supported intermediate its ends as at 316 and extends toward the front of the machine and adjacent one side of the typewriter supporting frame. The free end of the lever 315 adjacent the front of the machine moves in a suitable guide 317 (see Figs. 2 and 12) and connected to this extremity is a key 318, which is arranged preferably adjacent and to the rear of the series of keys 118. A suitable elastic member 319 (see Fig. 12) is provided which tends normally to move the clutch member 284 away from the clutch member 285, on the sleeve 283 and toward the gear 289. One extremity of this elastic member is anchored to a suitable fixed support and the other extremity is connected to the yoke 311. When the key 318 is depressed to move the clutch member 284 into a position to be engaged by the clutch member 285, tension will be created upon the elastic member 319, so that when the key 318 is released by the operator, the elastic member 319 will return the clutch member 284 to its normal position.

The clutch member 284 is provided for imparting an axial rotation or adjustment to the platen 301 in either direction according to the direction of rotation of the shaft section 276, and in order to produce this axial rotation, without at the same time producing a longitudinal movement, it is necessary to shift the clutch member 285 out of engagement with the clutch member 273. The clutch member 285 is of too short a length to bring it into engagement with the clutch member 284 when it is brought out of engagement with the clutch member 273 by the sole movement of the shift key 320. It is often necessary, however, to have the clutch members 284 and 285 in engagement with each other under these conditions, to cause a rotary movement of the platen without a longitudinal movement thereof. To accomplish this it is necessary to depress both the shift key 320 of the typewriter (see Fig. 2) at the same time the key 318 is depressed. These keys, being located on the same side of the machine, can be readily operated simultaneously and when so operated the proper adjustment of the clutch members will be accomplished and the parts locked for imparting axial rotation to the platen. When the keys are released, the clutch members will move away from each other and will return to the normal positions shown in Figs. 12 and 16.

The ribbon 321 (Figs. 1 and 2) which is bicolored, red and black is fed from one of the spools 322 to the other and is supported adjacent the platen 265 in the ordinary manner and is adapted to be shifted simultaneously with the shifting of the clutch member 155 (Fig. 5) when the latter is shifted to change the direction of rotation of the shaft 147 so as to print one color for one rotation and another color for the opposite rotation. For this purpose the shifting mechanism of the ribbon may be connected to the shifting lever 158 (see Figs. 5, 14 and 15) through the medium of a rock shaft 323 which is journaled in suitable bearings 324. One end of the rock shaft is connected in any suitable manner to the shift lever 158 and secured to the other extremity of the rock shaft is an arm 325. A shift lever 326 is pivoted intermediate its ends as at 327 to the typewriter frame. (See Fig. 1). One extremity of the lever is connected as at 328 in any desired or suitable manner to the shifting mechanism for the ribbon. The other extremity 329 of the lever is connected by means of a suitable link 330 (Figs. 14 and 15) to the arm 325 so that when the shift lever 158 is operated, the shaft 323 will be rocked, which in turn will rock the arm 325 to impart a rocking movement to the lever 326 through the medium of the connecting link 330.

We will now describe the actuating or master mechanism for operating the registering mechanism. Arranged at the front of the machine and in advance of the shaft 143 and extending there-across are guides 331, 332 (Fig. 25), which are supported by the end walls 56, 57, and movable upon these guides are carriages designated generally by the reference numerals 333, 334. Each of these carriages comprises two spaced plates 335, 336, which are notched to receive the guides 331, 332 and have sliding movement thereon. A third guide 337 extends across the frame parallel with the guides 331, 332 and is supported by the end walls 56, 67. This guide 337 passes loosely through each of the carriages 333, 334, so as not to interfere with the movement of the carriage upon the guides 331, 332. The members 335, 336 of the carriages are spaced from each other by means of a sleeve 338, which is provided with a gear 339 at one end, of a larger diameter than the diameter of the sleeve. The sleeves 338 are splined on the shaft 147, (Figs. 3, 4, 5 and 25) which latter passes through the sleeves to rotate the sleeves and the gears 339 when the shaft is rotated. The sleeves are thus connected to the shaft 147 for longitudinal adjustment with respect thereto so that the carriages may be moved longitudinally on their guides and also with respect to the shaft and at the same time the gears 339 will be rotated by the shaft.

The carriages 333, 334 are arranged adjacent the walls 56, 57, and are connected to move in unison by means of a connecting bar or member 340.

A carriage 341 similar to the carriages 333, 334, is supported in a similar manner and is adapted to move substantially the entire length of the machine and between the carriages 333, 334. This carriage 341 is adapted to be moved by means of the screw shaft 182 which latter passes through a nut 342 (Figs. 25 and 26) supported between the spaced members 343, 344. When the screw shaft 182 is rotated in one direction the carriage 341 will continue to move in a corresponding direction between the carriages 333, 334, until the shaft 182 is reversed and will then move in the opposite direction.

The carriages 333, 334 are adapted to be reciprocated on their supporting guides and are moved positively in one direction by means of the carriage 341. For this purpose there is provided a bar or member 345 (see Figs. 25 and 27) which is spaced from the carriages 333, 334, and is connected for pivotal movement with the carriages by means of arms 346, 347, one of which is secured to each extremity of the bar 345 and is connected to each of the carriages 333, 334. The bar 345 is provided with a plurality of depending teeth 348, each of which is provided with an inclined portion 349 and any number of these teeth or projections 348 may be provided according to the distance of travel of the carriage 341.

Supported between the spaced members 343, 344 of the carriage 341 and below the bar or member 345 is a member 350 (Figs. 25 and 28) which is provided with an upwardly projecting tooth or extension 351 having an inclined face 352. The bar or member 345 is adapted to assume a position such that the depending projections 348 thereon will stand within the path of movement of the projection 351 on the member 350 of the carriage 341 so that when the carriage 341 is moved toward the left, as shown in the rear view at Fig. 25, the projection 351 on the member 350 will engage one of the depending projections 349 on the bar or member 345 and move the member 345 carrying with it the carriages 333, 334. One extremity of the bar or member 345 projects beyond one of the carriages, preferably the carriage 334, and this projecting extremity is provided with an inclined or beveled face 353 which is adapted to engage a beveled face or extremity 354 of a projection 355 so that when the bar or member 345 is carried by the carriage 341 a sufficient distance to cause the inclined or beveled extremity 353 to engage the face 354 of the projection 355, the bar or member 345 will be raised about its pivot and out of engagement with the projection 351 on the member 350, which will permit the carriage 341 to advance to such a position that when the bar 345 is lowered, the projection 351 on the member 350 will have passed beyond the respective depending projection 349.

The bar or member 345 and the carriages 333, 334, are moved in the opposite direction in any desired or suitable manner, preferably by means of an elastic member 356, such as a coil spring or the like, one end of which is secured to one of the carriages, preferably the carriage 333 and the other extremity is secured to one of the walls or supports, preferably the wall 56, by passing the extremity 357 of the spring through a suitable aperture in the wall and anchoring the same by means of a suitable fastening device 358 whereby access may be had to the extremity of the spring to vary the tension thereof.

After the carriage 341 has reached the limit of its movement toward the left at Fig. 25, and the bar or member 345 has assumed its normal position, and the shaft 182 is reversed to move the carriage 341 in the opposite direction, the inclined face 352 of the projection 351 on the member 350 will successively engage the inclined faces 349 of the depending projections 348 of the member 345 to raise the bar or member 345 to permit the projection 351 to pass.

An additional sleeve 359 (Fig. 25) is provided between the side members 335, 336, of the carriages 333, 334, whereby they are guided upon a rock shaft 360, although said carriages are not operated by said shaft 360. Spacing sleeves 361, 362 are also provided for the side members 343, 344, of the carriage 341 and the sleeve 361 is provided with a gear 363 similar to the gears 339. The carriages 333, 334 are provided with upwardly extending arms or pointers 364 and the carriage 341 is provided with a similar upwardly projecting arm or pointer 365 for purposes to be hereinafter set forth.

Each of the carriages 333, 334 and 341 is provided with a series of gears designated generally by the reference numerals 366, 367 (Figs. 25 and 33), which are loosely mounted for rotation upon the guide or support 337 and are arranged between and held from displacement with respect to each other by means of the side members of the respective carriages. There is preferably provided nine of these gears on each of the carriages. The gear 367, which is the master wheel or gear is a complete gear and meshes with and is driven by the gear 339 of the respective carriages 333, 334 and the gear 363 of the carriage 341. The remaining gears 366 of each series which are the tens carrying gears are mutilated, as shown more clearly in Fig. 33 and are each provided with a flat face 368.

A rock shaft 369 is supported adjacent the support 337 and extends across the machine parallel with the support 337. This shaft 369 is preferably journaled by its extremities in the end walls or supports 56, 57 and passes through the side members of the carriages. Secured to the shaft 369 for oscillation therewith and for longitudinal adjustment with respect to the shaft as by being splined thereon are a plurality of alining dogs or members 370, one of which is provided for each of the carriages and is of a length that the active face 371 thereof will engage all of the flat faces 368 of the respective series of gears 366. These dogs or members are preferably secured to the shaft 369 for longitudinal adjustment with respect thereto by means of a tongue and groove connection and are arranged between the side members of the respective carriages, the body portions of the dogs or members being of a length to fill the space between one of the side members and the gear 367 so that when the carriages are adjusted in the manner already set forth, the dogs or retaining members will be moved longitudinally of the shaft 369.

Any suitable means may be provided for rocking the dogs or members into or out of engagement with the gears 366 and for this purpose the shaft 369 is provided with a gear 372, Fig. 7. An arm or segment 373 is secured to the shaft section 229 (see Figs. 3, 7 and 10), and is provided with teeth 374 which mesh with the gear 372, so that when the shaft section 229 is rocked to move the arm or segment 373 in a downward direction, the shaft 369 will be rocked in a direction to move the alining dogs or members out of engagement with the faces 368 of the gears 366, as shown in Fig. 33 and when the shaft section 229 is moved in the opposite direction to raise the arm or segment 373, the shaft 369 will be rocked in the opposite direction to move the faces 371 of the alining dogs or members 370 into engagement with the faces 368 of the gears 366 to aline the latter, as shown in Fig. 7.

If desired, suitable means may be provided which tends normally to move the shaft 369 in a direction to move the alining dogs or members into their normal alining positions. A simple and efficient means for accomplishing this purpose comprises an arm 375 which is secured to the shaft 369, preferably at the end opposite to the end to which the gear 372 is secured (see Fig. 8), and an elastic member 376, such as a coil spring, is secured by one extremity to the arm 375 and its other extremity is anchored to a suitable stationary support in such a manner as to normally exert its tension upon the arm to move the shaft 369, in the proper direction. This elastic member 376 coöperates with the arm or segment 373 and the gear 372 to move the retaining dogs or members in the proper direction and when the shaft 369 is rocked in the opposite direction to move the retaining dogs or members out of active position, a tension will be exerted upon the elastic member 376.

When the shaft section 229 has been rocked in the manner heretofore set forth, the extremity of the arm 239 thereon will be moved out of engagement with the shoulder of the cam 240, as heretofore described, and as the cam 240 which is secured to the shaft 58 rotates, the extremity of the arm 239 will engage and rest upon the high portion of the cam, and while the arm is in engagement with this portion of the cam 240, the shaft section 229 will be held against return movement, which will prevent the alining dogs or members 370 from returning to aline the tens-carrying gears 366 until the shaft 58 about completes one cycle of movement. The shouldered connection between the shaft sections 228 and 229 will permit this operation and will also permit the parts which are operatively related to the shaft section 228 to perform their functions before the shaft section 229 is released.

We now come to the registering mechanism operated by the master or actuating mechanism, which latter is embodied in the carriages 333, 334 and 341. Arranged at the front of the machine and in advance of the shaft 147, preferably slightly above the latter, is a support 377 (Figs. 7 and 33) upon which are supported a pair of totalizers designated generally by the reference numerals 378, 379, in Figs. 3 and 5, and these totalizers are arranged respectively adjacent the supports 56, 57 in which the support 377 has its bearings, and the totalizers are spaced from the supports 56, 57, by means of spacing sleeves 380, 381.

A series of totalizers 382 (see Figs. 3 to 5) are arranged intermediate the totalizers 378, 379 and are also supported by the support 377. The support 377 may be provided with intermediate bearings 383 (Figs. 4 and 5) and the end totalizers of the series 382 are spaced respectively from the totalizers 378, 379 by means of sleeves 384. Each of the totalizers is mounted for pivotal movement upon the support 377 and as the construction of all of these totalizers is the same, the specific description of one will apply equally as well to them all.

Reference being had particularly to Figs. 7 and 29 to 40, the totalizers comprise a frame having side members 385, 386, and a base 387, which connects the side members. This frame is mounted for pivotal movement and suspended from the support 377 by means of the latter passing through the upper and rear extremity of the sides 385, 386, and is supported in such a manner that the base 387 thereof will be located in a plane below the support 337.

Loosely mounted upon the support 377 and within the totalizer frame are a plurality of number or dial wheels 388 which are spaced from each other by intermediate gears 389, one of the gears 389 being secured to and for rotation with each of the number wheels 388. One of the end wheels of the series is spaced from the adjacent side wall of the frame by means of a similar gear.

Loosely mounted in the frame on a support 390 and below the gears 389 is a series of gears 391, one of which meshes with each of the gears 389, and the gears 391 are spaced from each other by means of ratchet or star wheels 392 arranged between the gears and one of which is secured to and for rotation with each of the gears 391 about the support 390. A series of retaining dogs 392 (Figs. 33 and 34) are pivotally mounted upon a support 393 and one of these dogs is provided for each of the ratchet or star wheels 392. An elastic member 394, such as a coil spring or the like, is provided for each of the dogs 392 and tend normally to hold the extremity of the respective dogs in engagement with the star or ratchet wheels 392 and between two teeth of the latter so as to lock the gears 391 against accidental displacement, the spacing of the teeth of each of the star wheels being such that its dog 392 may enter between two of said teeth after each unit's advancement of the corresponding dial wheel 388, that is, in the form shown, after each tenth of a revolution of said dial wheel in either direction. The dogs 392 engage the star or ratchet wheels with sufficient tension to hold the gears against rotation under normal conditions but will yield when force is applied to the respective gears to permit the gears to rotate. A stop 395 may be provided to limit the outward movement or the movement of the dogs away from the ratchet wheels.

Mounted for free rotation upon a support 396, below the support 390, is a series of gears 397, one meshing with each of the gears 391, and these gears 397 are spaced from each other by means of disks or washers 398 (see Figs. 29 and 38), each of which is provided with a single tens-carrying tooth 457, one of these disks or washers 398 being secured to and for rotation with each of the gears 397.

Means, hereinafter to be described, is provided whereby either of the totalizers 378 or 379, or any one or more of the totalizers 382, may be set so as to be either effective or ineffective at the election of the operative. When set to be ineffective, the wheels of a totalizer will not be engaged and rotated by the master wheel even though the master-wheel carriage be advanced to bring the master wheel opposite the gears 397 of the totalizer and the master wheel then rotated. Figs. 7, 29 and 33 illustrate a totalizer which is set to be active, Fig. 7 representing the totalizer mechanism in its normal position, and Figs. 29 and 33 representing the parts of the totalizer in relative positions assumed during an intermediate stage in the operation of the mechanism after a numeral key has been depressed for the purpose of running a digit of a number into the wheels of the totalizer.

When the master-wheel carriage has been advanced, so as to bring the master wheel 367 opposite the gear 397 corresponding to the dial or numeral wheel 388 representing the first denominational order of number to be added, and the number key, corresponding to the digit of that denominational order of said number, is depressed, the totalizer will, by means hereinafter to be described, first be rocked about the support 377, from the position shown in Fig. 7, to bring said gear 397 into meshing relation with the master wheel 367, as indicated in Fig. 33. The alining dog 370 will then be moved away from the tens-carrying gears 366 to the position indicated in Fig. 33, after which the master wheel will be rotated to run the digit corresponding to the depressed number key into the wheels of the totalizer. The totalizer frame will then be rocked about the support 377 in the opposite direction to separate the gear 397 from the master wheel 367. The master-wheel carriage will then be advanced one space to bring the master wheel opposite the gear 397 of next lower denominational order, and the alining dog 370 will be moved back to its normal position, as indicated in Fig. 7, to realine any of the tens-carrying wheels 366 which may have been displaced by a carry when said digit was entered. This cycle of operations will be repeated as each digit of the number is run into the totalizer, the master wheel being stepped along one space after each digit is entered.

As the master wheel 367 is thus successively stepped into coöperative relation with gears 397 representing different denominational orders of the totalizer, a sufficient number of the tens-carrying wheels 366 will be brought into engaging relation with the gears 397 and carrying teeth 457, representative of higher denominational orders, to effect a carry from the gear directly operated by the master wheel to the gears of highest denominational order of the totalizer. The combined width of each of the disks 398 and the gear 397 of next higher denominational order, to which said disk is not secured, is substantially equal to that of one of the mutilated tens-carrying gears 366, so that when brought into engaging relation at each rocking movement of the totalizer, in readiness to run a digit of a number into the wheels thereof, each tens-carrying tooth 457, of a denominational order higher than that of the wheel in cooperative relation with the master wheel, may effect a carry to the gear 397 of next higher denominational order, through the intermediary of one of said tens-carrying gears 366. The means for effecting the above-described cycle of operations of the totalizer, as each digit of a number is entered, will now be described.

To rock the totalizer frame 386 about the support 377, there is provided a sleeve 399 mounted for rotation about the support 400 (see Figs. 7 and 33), which may extend from one to the other of the supports 56, 57. The sleeve 399 is provided with a curved portion 401, which, on counterclockwise rotation (Fig. 7) of the sleeve, will engage with a recess 402 (Fig. 40) in the lower surface of the base 387 of the totalizer frame and rock the totalizer from its normal position, as indicated in Fig. 7, to the position indicated in Fig. 33. At the end of this movement, a lug 405, carried by a radial arm 404 projecting from the sleeve 399, is brought into engagement with the forward edge 407 of the totalizer base 387, so as to maintain the totalizer firmly in the position shown in Fig. 33 while a digit of a number is being run into the computing wheels. The radial arm 404 terminates in a handle 406, the purpose of which will be hereinafter explained.

When the sleeve 399 is rotated in a clockwise direction (Fig. 33), after each digit of a number is entered, a projecting member 403 will be brought into engagement with a shoulder at the rear of the base 387 and cause the totalizer frame to be rocked about its support 377 in the opposite direction, thus separating the wheels of the totalizer from the master wheel and tens-carrying wheels, the curved portion 401 of the sleeve 399 being cut away at a point adjacent the projecting member 403, so as to permit this movement to take place (see Figs. 7 and 36).

As a means for rotating the sleeve 399, as above described, there is provided a sleeve 410 mounted for rotation about a support 411 just below and parallel to the support 400. This support may also be carried by and extend from one to the other of the end supports 56 and 57. The sleeve 410 is provided with a mutilated gear comprising teeth 409 normally in meshing relation with teeth 408 carried by the sleeve 399 (see Figs. 33, 36 and 37), so that a rotation of the sleeve 410 in one direction will effect a rotation in the opposite direction of the sleeve 399. The sleeve 410 may be yieldingly maintained in its normal position, as indicated in Fig. 7, by means of a dog 413 which engages in a notch 415ª (see Fig. 33) in the surface of said sleeve. Said dog 413 is normally held in yielding engagement with said notch by means of a spring 414, but will be forced out of said notch when force is applied to said sleeve to rotate the same as each digit of a number is being entered, as indicated in Fig. 33. The sleeve 410 is provided with a second notch 415 and a handle 412, the purpose of which will hereinafter be set forth.

The sleeve 410 is caused to be rotated in a clockwise direction, from the position indicated in Fig. 7, to that indicated in Fig. 33, by means of a member 416 having a toothed face 417. If the totalizer is set to be active this toothed face 417 will be brought into engaging relation with the teeth 409 of said sleeve by a counterclockwise rotation of the member 416, which takes place just before each digit of a number is run into the wheels of the totalizer. After each digit has been entered, the member 416 will be caused to rotate from the position indicated in Fig. 33 back to the position indicated in Fig. 7. The means for effecting such intermittent movement of the member 416 will now be described.

The sleeves 359, 362, of the carriages 333, 334, 341, through which the rock shaft 360 passes are keyed to the shaft for rocking movement with the shaft but are adapted to be moved longitudinally on the shaft as the carriages are moved in either direction, (shown more clearly in Figs. 7, 33 and 39) and each of the sleeves is provided with a projecting portion 416, hereinbefore mentioned having a rack or toothed face 417, as previously described, which face is of a length to substantially fill the space between the side members of the respective carriages. Since the toothed faces 417 of the members 416 are of much greater width (see Figs. 29, 37 and 39) than the teeth 409 of the sleeves 410, said toothed faces of sleeves 359, forming part of the master-wheel mechanism for the totalizers 378 and 379, will remain in position to be brought into engagement with the teeth 409 of said totalizers, throughout the whole range of travel of the corresponding master-wheel carriages 333 and 334.

The toothed faces 417, carried by the sleeve 362 of the master-wheel carriage 341, will be brought successively, as said carriage is advanced by the screw shaft 182, into position for coöperation with the teeth 409 of the sleeves 410 of the different totalizers of the series 382, and will continue to be in a position to be brought into engagement with the teeth 409 of the sleeve 410 corresponding with any particular one of said totalizers from the time at which the master wheel of the carriage 341 is advanced to a position opposite the gear 397 corresponding to the numeral wheel of the highest denominational order of said totalizer, until said master wheel has been advanced beyond the point opposite the gear 397 corresponding to the number of wheel of lowest denominational order of that totalizer. As the master wheel of said carriage 341 is brought opposite the gear 397 of highest denominational order of the next totalizer of the series 382, the toothed face 417 of the sleeve 362 of the said master-wheel carriage 341 will be advanced into a position to coöperate with the teeth 409 on the sleeve 410 of that totalizer. It will, therefore, be apparent that the toothed face 417 of the member 416 of the master-wheel carriage 341 will always be in position to coöperate with the sleeve 410 of any particular totalizer of the series 382, whenever the master wheel of said carriage is opposite any one of the gears 397 of that totalizer.

Any suitable means may be provided for intermittently rocking the shaft 360 and for this purpose the shaft is provided with a gear 418 (Figs. 7 and 8) adjacent one end thereof and preferably adjacent the support 57 of the machine, and an arm or segment 419 is provided which engages the gear 418 and is secured to the shaft section 228 so that when the shaft section 228 is rocked through the medium of the arms 238 which are engaged by the cams 237, the arm or segment 419 will be moved in a downward direction. This movement of the arm or segment will rock the shaft 360 in a direction to move the sleeves 362, 359, in a direction to raise the faces 417 thereof from the position shown in Fig. 7 which will rotate the sleeves 410, 399, to move the totalizer frames into the position shown in Figs. 29 and 33 in the manner already set forth. The shaft section 228 is moved in the opposite direction, by means of a series of arms 420 secured thereto and projecting under the shaft 58 (see Fig. 7) so as to be engaged and operated by a series of cams 421 which are secured to and for rotation with the respective gears 77.

The shaft section 228 is provided with an arm or extension 422 which projects therefrom as shown more clearly in Fig. 8, and this arm or projection is provided with a plurality of notches 423 in one end thereof. A yielding dog or pawl 424 is pivotally mounted upon a suitable support 425 and the extremity 426 thereof is adapted to enter one or the other of the notches 423 to retain the arm or segment 419 in its adjusted position and this dog or pawl 424 engages the arm 422 with sufficient friction but will yield to permit the shaft section 228 to be rocked in the opposite direction by the cams 421 and arms 420. An elastic member 427, such as a spring or the like, is provided for controlling the dog or pawl 424. One extremity of this spring is secured to an arm or projection 428 of the dog or pawl and the other extremity is anchored to a suitable stationary support, such as the end support 57 of the machine.

As previously stated, either of the totalizers 378, 379, or any one of the totalizers 382, may be rendered either active or inactive at the will of the operative. When the parts of the totalizer are in their normal relative positions, as indicated in Fig. 7, the notch 446 (see Figs. 29 and 36) in the sleeve 399 will be in longitudinal alinement with a pin 447 on the support 400. To render the totalizer inactive, the operative will grasp the handle 406 and, by means of the same, move the sleeve 399 to the right, so as to separate the teeth 408 of the sleeve 399 from the teeth 409 carried by the sleeve 410, the walls of the notch 446 being thereby caused to embrace the pin 447, thus preventing a rotation of the sleeve 399 when thus thrown out of use. By means of the handle 412, the sleeve 410 may also be rotated in a clockwise direction, from the position indicated in Fig. 7, so as to bring the blank space between the teeth 409 of the mutilated gear carried by said sleeve opposite the toothed face 417 of the operating member 416. When moved to this position, the dog 413 will be urged by the spring 414 into the notch 415 (shown in Figs. 33 and 37) to hold said sleeve 410 in its adjusted position. When the parts of the setting mechanism are thus adjusted, the intermittent movement of the members 416 will be ineffective upon the totalizer for the reason that the teeth 417 cannot be brought into engagement with the teeth 409, and also because the teeth 409 are out of engagement with the teeth 408 of the sleeve 399. With the totalizer thus set, therefore, the master wheel 367 may be rotated when opposite the gears 397 of the totalizer, but said gears 397 will not be brought into engaging relation therewith, and the number wheels of the totalizer will therefore be unaffected.

When it is desired to restore the activity of a totalizer which has thus been set to be inactive, the operative will first rotate the sleeve 410 by means of the handle 412 to bring the notch 415ª in register with the teeth of the dog 413, and, then, by means of the handle 406, slide the sleeve 399 to the left to bring the teeth 408 back into meshing relation with the teeth 409. This movement will at the same time remove the walls of the notch 446 from their engaging relation with the pin 447. The parts of the totalizer will then be in the position indicated in Fig. 7, in readiness to be actuated by the member 416, the master wheel 367 and the tens-carrying wheels 366.

In order to rock the shaft 218 (Figs. 4, 5 and 8) to throw the arm or dog 256 into engagement with the star or toothed wheel 262ª to lock the shaft 147 against overthrow, through the medium of the projection 264 (Figs. 5, 7 and 8) on the arm 263 which engages the arm or dog 256, there is provided a series of arms or projections 429 (see Figs. 4 and 7) which are secured by one extremity to the shaft 218 in any desired or suitable manner, preferably by means of fastening pins or devices 430 which pass through sleeves 431 on the arms and into the shaft 218 so as to secure the arms for movement with the shaft. These arms are arranged adjacent the series of gears 77 which are controlled by the keys of the typewriter carriage and there is provided one arm for each gear of the series. These arms extend rearwardly to project between the gears and under the rock shaft 192. In order that the free movement of the arms in one direction may not be interfered with by the rock shaft 192, the arms may be provided with a cut-away portion 432. A cam 433 (shown more clearly in Fig. 41) is secured to each of the mutilated gears 77 and adjacent the cams 237, 421, and these cams 433 are arranged to engage the extremity of the respective arms 429 (Fig. 7) to rock the shaft 218 to move the dog or arm 256 into engagement with the star or toothed wheel 262ª. When the arm or dog 256 is lowered between two of the teeth of the star or toothed wheel, it will be held in this position by the dog 253 entering one of the notches 254 on the arm 255. (See Fig. 8.) When the shaft 147 is rotated, the star or toothed wheel will also be rotated and one of the teeth will engage the arm 256 to move the latter to an inoperative position, and as the arm 256 is thus moved, the dog 253 will yield to permit the arm 255 to be moved and the dog 253 will enter the other notch in the arm 255 to retain the arm 256 in an inoperative position until the projection 264 on the arm 263 engages the arm 256 in the manner already set forth to again depress the arm 256 to lock the shaft 147 against overthrow.

During the operation of the machine, it is sometimes desirable to throw the carriages 333 and 334 out of operation and in order to prevent their reciprocation or advancement under the influence of the carriage 341, it is necessary to elevate or move the bar or member 345 (Fig. 25) so that the depending projections 348 thereon will be moved out of the path of movement of the projection 351 on the member 350 of the carriage 341. A suitable and efficient means for accomplishing this purpose will now be described:

Whenever the carriages 333 and 334 are to be thrown out of operation, they should assume a position at the limit of their movement toward the left of Figs. 3, 4 and 5, that is, so that the carriage 334 will stand adjacent the space formed by the sleeve 384 between the totalizer 379 and the respective end totalizer of the series 382, and the carriage 333 will stand adjacent the space formed between the totalizer 378 and the adjacent end support 56 of the frame by the sleeve 380.

When in this position, the beveled extremity 353 of the bar or member 345 will be moved away from the projection 355 so that a portion of the bar or member will project over an arm 434 (Figs. 3 and 10) on a sleeve 435, which latter is mounted upon a stub shaft 436 supported by the end support 56 of the frame. The sleeve 435 is provided with an arm 437 (see Figs. 3 and 10) which extends upwardly and is adapted to be engaged by the extremity 438 of an operating lever 439 pivoted intermediate its ends as at 440 to the support 56. The other extremity 441 of the operating lever terminates in a key 442, which preferably extends over the support 377 and is spaced therefrom. When the key 442 is depressed to rock the lever 439 about its pivot 440, the extremity 438 of the lever will engage the arm 437 to rock the sleeve 435 and raise the arm 434, against the tension of an elastic member 443. As the arm 434 is raised, the bar or member 345 will be raised against the tension of an elastic member 444. The downward movement of the extremity 441 of the lever 439 is limited by the engagement thereof with the support 377 and as long as the key 42 is held depressed, the bar or member 345 will be held out of position to be engaged by the projection 351 on the carriage 341. If desired, and in order to lock the extremity 441 of the lever 439 depressed, a locking member 445 (Fig. 10) may be pivotally supported by the support 56, intermediate its ends, so that one extremity thereof may be moved from the position shown in Fig. 10 to the position shown in Fig. 3, that is, with one of the extremities projecting across and in engagement with the extremity 441 of the lever 439 to hold the bar or member 345 elevated.

When the key 442 is released, the elastic member 444 will return the bar or member 345 and the elastic member 443 will return the sleeve 435, to their normal positions.

The upwardly projecting finger 365 (Fig. 25) on the carriage 341 extends over the number wheels 388 of the series of totalizers 382 (Figs. 3 and 33) and the upwardly extending fingers 364 (Figs. 3 and 5) of the carriages 333, 334 extend respectively over the number wheels of the totalizers 378, 379 so that as the carriages are advanced successively, the fingers will pass from one of the number wheels to the next adjacent number wheel whether the totalizers are set to be active or to be inactive.

In order that a number, which has been added into any one of the above-mentioned totalizers, as, for example, the totalizer 378, by rotation of the master-wheel driving shaft 147 in one direction, may subsequently be subtracted from that totalizer and, at the same time, added into another totalizer, as for example, one of the totalizers of the series 382, by rotation of said shaft 147 in the opposite direction, each of the number wheels 388 of said totalizers is provided with two sets of characters, each set comprising a zero and nine digits, the characters of one set alternating with those of the other, and those of the different sets being arranged in increasing order of magnitude in opposite directions around the number wheels, as indicated in Fig. 29. If desired, the characters of one set may be differentiated from those of the other, as indicated in Fig. 46, in which the digits represented in full lines may be made black, and those represented in broken lines may be made red. The arrangement of the characters on each of the number wheels, as herein disclosed, is such that the red "0" is adjacent the black "0"; the red "1" is between the black "9" and the black "8"; and the red "2" is between the black "8" and the black "7"; the same arrangement being continued throughout the number wheel. With the characters thus arranged on the number wheels, those represented in black will be used when adding by rotation of the master-wheel driving shaft 147 in one direction, which may be referred to as an advance direction of rotation, and those represented in red will be used when adding by rotation of the same shaft in the opposite, or reverse, direction.

As a means for determining a sight-line, at which a number may be read from the totalizer, there is provided a shield 448 extending across the number wheels 388, as indicated in Figs. 29 to 32. This shield is provided with a slot or sight-opening 449 of such a width as to expose but one character at a time on each number wheel of the totalizer, as indicated in full lines in Fig. 47.

Each totalizer of the machine would normally stand at "0" in readiness to be used to effect a computation in addition, if set to be active, by advance rotation of the master-wheel driving shaft 147. At such times, the shield of each totalizer would expose a row of black 0's at the sight-opening 449. The position of the tens-carrying teeth 457 would be such as to be ineffective during a rotation of any number wheel in the direction of increasing order of magnitude of the black characters from "0" to "9", but on further rotation in the same direction from a black "9" to a black "0", the carrying tooth 457 would be brought into engagement with one of the tens-carrying wheels 366, and, through the intermediary of said tens-carrying wheel, and the gears 397 and 391 of the next higher denominational order, would impart a rotation of one unit's extent, in the same direction, to the number wheel of the next higher denominational order, in the usual manner.

Should it be desired, however, to make use of one of said totalizers to effect a computation in addition by rotation of the master-wheel driving shaft 147 in a reverse direction, it would be necessary to first set said totalizer in readiness for such operation. Assuming the number wheels and the shield of said totalizer to be in their normal relation for addition by advance rotation, as above described, that is, with a row of black 0's exposed at the sight-opening of the shield, this setting would be effected by advancing the master wheel to a point opposite its gear 397 of lowest denominational order. The reversing lever 158 would then be shifted to change the direction of rotation of the shaft 147, after which, with said totalizer set to be effective, the units number key 84 would be depressed. The depression of this key, under the circumstances mentioned, would effect, ignoring the action of the shield, a reverse rotation of the units number wheel from its black "0" position to its black "9" position. This would effect a carry to the wheel of next higher denominational order, which would also be moved in reverse direction from its black "0" position to its black "9" position. A like carry would be effected from order to order of the totalizer to the number wheel of highest denominational order, after which, still ignoring the action of the shield, the totalizer would be caused to expose a series of black 9's. When such a setting action is effected, however, means which will hereinafter be set forth, is provided for imparting to the shield, when the number wheel of highest denominational order is thus moved from its black "0" position to its black "9" position in a reverse direction, a movement corresponding to one-half of a unit's step in the same direction, so as to conceal the row of black 9's, and to expose the adjacent row of red 0's. The totalizer will then be in readiness to add on reverse direction of rotation of the shaft 147 in exactly the same manner as a totalizer normally set to expose a row of black 0's is in condition to add by advance rotation of the shaft 147. The totalizer may, at any time, be re-set for effecting addition by advance rotation of the shaft 147, by again bringing the master wheel to a point opposite the gear 397 of lowest denominational order of the totalizer when the same indicates zero in red, that is, when a series of red 0's are exposed at its shield. By again reversing the subtraction-lever 158, so as to cause advance rotation of the shaft 147, and with the totalizer set to be active, a depression of the "1" key will cause said totalizer to again expose a row of black 0's at the sight-opening, in readiness to add on advance rotation of said shaft.

Either of the totalizers 378, 379, may be set for addition by reverse rotation concomitantly with the setting of any one of the totalizers 382, if set to be active when the setting of said totalizer 382 is effected.

The shields for all totalizers are identical, and a description of one will therefore serve for all. Each of said shields extends across the entire series of number wheels of the totalizer to which it is attached and is supported by end members 450, 451 (see Figs. 29, 30 and 32). These members 450, 451 are preferably in the form of disks which loosely surround a sleeve 452 upon which the number wheels 388 and the gears 389 are mounted and through which the support 377 passes. The ends of the shields rest upon these members 450, 451 and are secured thereto in any desired or suitable manner, preferably by means of an extended portion thereof passing through slots 453 in the ends of the shields and are fastened in any suitable manner.

One of the members, preferably the member 450, is provided with a series of projecting spaced members 454 (Fig. 30) which coöperate with a disk 455 secured to one of the gears 391, preferably the gear which controls the number wheel 388 of the highest denomination, to form a Geneva lock, and the disk 455 is provided with the usual projection 456 which engages between two of the projecting members 454 to oscillate the member 450 to move the shield 448 so that the space 449 therein will be shifted so as to cover one series of figures on the dial or number wheel and expose the next adjacent series, either above or below the originally disclosed series, according to the direction of rotation of the gears 391.

By means of the above-described mechanism it will be apparent that a backward or reverse rotation of the units wheel of a totalizer previously set to expose a row of black 0's will effect a carry through all the wheels of the totalizer, resulting in one step of reverse rotation of the gear wheel 397 of the highest denominational order, which, through the associated gear 391, and the teeth 456 and 454 (Fig. 30), will impart a movement to the shield 448 such as to cause a row of red 0's, instead of a row of black 9's, to be exposed at the sight-opening, as hereinbefore explained. A movement of the number wheel of units order in an advance direction, when a row of red 0's is thus exposed at the sight-opening, will likewise effect a carry through all the wheels of the totalizer, so that the wheels 397 and 391 of highest denominational order, and the teeth 456 and 454, will likewise cause such a movement of the shield 448 as to expose a row of black 0's, instead of a row of red 9's.

In Fig. 47, for example, the row of figures, shown in full line characters, represents a number which would be exposed at the sight-opening of the shield, also shown in full lines, assuming that the dial wheels had been brought to the relative positions indicated by a forward rotation. The position which the shield would assume, and the number which would be exposed at the sight-opening, had the totalizer first been set for addition by reverse rotation and the dial wheels then been brought to the relative positions indicated by reverse rotation, is indicated by the broken line outline of the sight-opening and the broken line characters.

It is thought that the operation of all the mechanism hereinbefore described will be understood from the above description but briefly stated it is as follows:

The shaft 58 is continuously rotated by the motor 63, and all of the power-actuated mechanism receives its motion more or less directly therefrom.

In bringing the work sheet on the platen 265 to a proper position to be written on, this platen can be moved longitudinally to the right or left a definite amount or an indefinite amount. It also can be rotated forwardly or backwardly a definite amount or an indefinite amount. If we desire to either rotate or feed the platen an indefinite amount to the right, it is merely necessary to shift the lever 190 so as to bring the clutch 189 into engagement with the clutch 187, whereby the shaft 159 will be driven directly through the medium of the gears 185 and 205 from the continuously rotating shaft 58. Inasmuch as the clutch 286 is normally held in engagement with the clutch 273, such a movement of the lever 190 will naturally feed the platen to the right.

By observation of the position of the printing point with respect to the platen as the platen travels with its carriage to the right, it can be determined when it is necessary to release the lever 190 to stop the movement of the carriage. If it is desired to move the platen to the left, the lever 197 will be shifted so as to clutch the gear 186 to the shaft 160, thereby rotating the shaft 164 in the opposite direction to that which it was rotated by the shaft 159, whereby the platen will be shifted in the opposite direction, that is to the left.

If, instead of moving the platen longitudinally, it is desired to rotate it about its axis an indefinite amount, it is merely necessary to depress both of the keys 320 and 318, whereby the clutch face 286 will be shifted out of engagement with the clutch face 273, and at the same time the clutch face 284 will be shifted into engagement with the clutch face 287. This will cause a rotary movement of the platen either up or down, according to which of the levers 197 or 190 has been actuated.

If it is desired to shift the platen either longitudinally or rotatably in either direction a definite amount instead of actuating the levers 190 and 198, one of the keys 116 and 118 is actuated according to the direction and extent of movement which is desired of the platen. For example, if the first key 116 is depressed with the parts in the position in Fig. 12, the platen will be moved one letter space to the right. If the key 120 of the series 118 is depressed, the platen would move under the same conditions one letter space to the left. The other keys will give variable movements from two to five spaces to the right and left according to which series is depressed. If a rotary movement is desired of the platen, the keys 318 and 320 will be simultaneously depressed and held in such position during the actuation of one of the keys 116 and 118.

The keys 116 and 118 control the movement of the platen by connecting normally loosely mounted mutilated gears 79 and 80, having from one to five teeth, into driving relation with the shaft 58. These gears mesh with the complete gears 204 and 203 on the shafts 160 and 159, so as to rotate them a definite amount, corresponding to the letter or line-spacing movement of the platen, of from one to five spaces. The shafts 159 and 160 respectively are prevented from being overthrown by the dogs 243 and 244 being thrown into engagement with the ratchet wheels thereon by the rocking of the shaft 192, which is accomplished, at the end of a single rotation of one of the mutilated gears 79 and 80 with the shaft 58, by a cam 214, of which there is one for each mutilated gear corresponding to each of the keys 116 and 118, which engages an arm 213 secured on the shaft 192. This shaft, at the same time, actuates the returning rails 208 and 210 so as to positively remove any one of the triggers 83 which may have been moved between the locking members 98, by the actuation of its corresponding controlling key, into such a position that it will once more disconnect its corresponding mutilated gear from driving relation with the shaft 58.

It may be noted in passing that the movement of the platen in a longitudinal direction is also accompanied by a corresponding movement of the master or actuating carriage 341 in an opposite direction, through the drive of the screw shaft 182 from the shaft 160. When the platen, however, is rotated solely, the actuating carriage 341 will not be manipulated, inasmuch as the actuation of the key 320 will rock the shaft 178 against the tension of the spring 310, so as to rock the shaft 173 and thus disengage the clutch 170 from the engagement with the clutch face 169 on the gear 168.

We will assume that after the work sheet on platen has been adjusted by the movement of the platen and its carriage through the means just described, to the proper position at which it is desired to print, that it is desired to write certain descriptive matter with the letter keys 129, such as the headings and date. When the letter keys 129 are struck, they throw the type bars upwardly and rearwardly so as to strike the front side of the work sheet on the platen 265 and at the same time they depress the universal bar 128 so as to rock the trigger 122 and thus permit the clutching of the mutilated gear 131 to the shaft 58. This gear has a single tooth and will correspond to a single space movement of the carriage and its platen to the left. This tooth is so placed, however, that it will not come in engagement with the gear 204 on the shaft 160 until the type bar has had time to strike the work sheet and start on its return movement. This then enables the descriptive matter to be written with the automatic spacing of the carriage in a letter feeding direction by power. If it should be desired to write numbers in the descriptive matter, at a part of the work-sheet corresponding with a computing zone, without entering the same in the computing mechanism, as, for example, in writing a date, the totalizer corresponding with said zone may be rendered ineffective, during the writing of such descriptive matter, by shifting its sleeve 399 laterally to disengage the teeth 409 from the teeth 408, and by depressing its handle 412, as already described.

After the date and descriptive matter have been written the computation may be carried on by the striking of the numeral keys 84. Prior to this time, however, each of the totalizers, which it is desired to have affected, should be adjusted to its effective position, as shown in Fig. 7, with the teeth on its sleeve 410 in mesh with the teeth on the sleeve 399, and also in position to be engaged by the teeth on the operating member 416.

We will assume that the key 442 has not been depressed so that both of the carriages 333 and 334 are connected to move with the carriage 341. If we strike one of the numeral keys 84, for example, the numeral key corresponding to the printing of the figure "5," the type bar corresponding thereto will be swung up into engagement with the work sheet on the platen. At the same time the trigger 82 corresponding thereto will be rocked about its pivot 81 through the intermediary linkages, so as to swing its tail end 91 up between the locking members 98, which thus prevents any of the other numeral keys from being depressed while this numeral key remains in its operated position. The swinging of the trigger 82 removes its toe 83ᵃ from engagement with the shoulder 75 on the dog 72, so that the latter is free to rock, under the tension of its spring 73, to engage the other member of the clutch, which is the ratchet wheel secured to the shaft 58, so as to clutch the gear 77, having the five teeth thereon, in driving relation with the shaft 58. As this gear rotates, the cam 237 carried thereby will first swing the arm 238 so as to rock the shaft 228, whereby the arm 419 will be swung downwardly so as to rotate the shaft 360, and thus swing upwardly the toothed faces 417, whereby the sleeves 410 of the active totalizers, which happen to be in opposition to the actuating mechanisms embodied in the carriages 333, 334, and 341, will be rotated so as to swing these totalizers inwardly, bringing their gears 397 into mesh with the master gears 367 and the tens carrying gears 366. At the same time that the shaft 228 rocked arm 419, it also rotated the shaft 229 a corresponding amount by means of the shouldered engagement therewith, so that the arm 373 was also rocked to rotate the shaft 369 and thus swing all of the alining dogs 370 out of engagement with the flat sides of the mutilated tens carrying gears 366, permitting them to move freely when subsequently actuated.

The rocking movement of the shaft 228 will bring the lug 235 into engagement with the pin 236 so as to rock the toothed segment 233 which will thus rock the double segment bell crank 220 through the intermediary of the toothed sleeve 225. The bell crank 220 will rotate the gear 217 so as to depress the link 218ᵃ and thus rock the trigger 122 which controls the clutching of the single-space-to-the-left gear 131. This will permit this gear 131 to be clutched to the shaft 58 so as to rotate concomitantly with the rotation of the particular gear 77 which has been connected by the numeral key 84. The rotation of the gear 131 will bring the cam 240, carried thereby, beneath the arm 239 on the shaft 229, so as to prevent the shaft 229 from returning with the shaft 228 until such subsequent time as the cam 240 shall pass from beneath the arm 239.

After this has been accomplished, the five teeth on the gear 77 which has been connected to the shaft 58 will come into engagement with the corresponding gear 144 on the shaft 143 to give it five-tenths of a revolution. The shaft 143 will drive the shaft 147 in one direction or the other according to the position of the clutch 155, so that it will rotate the gears 363 and 339 of the actuating carriages 341, 333, and 334. These gears in turn rotate the master gears 367 which mesh, in the case of each carriage, with one of the gears 397 in each totalizer in opposition to said carriages, if said totalizers have been set to be active. The gears 398 will thus be given a rotation corresponding to the particular numeral key struck, and will transfer this movement, through the intermediary gearing, to the dial or number wheels 388. If one of these number wheels happens to be thrown from "9" to "0" or from "0" to "9," such an action will correspond with a movement of the tens carrying toothed disk 398 corresponding thereto, while its tooth 457 is in mesh with the mutilated tens carrying gear 366, so as to rotate this gear a sufficient amount for it to rotate the gear 397 of next higher denomination with which it also meshes one-tenth of a revolution. This will carry an accumulation of ten units on a lower denomination to an accumulation of one unit on the next higher denomination. If any of the totalizers, on which the number is to be added, stands at zero, and in readiness to effect addition by advance rotation, that is, so as to expose, at the sight-opening of the shield, a row of black zeros, and should it be desired to effect the addition of said number by reverse rotation, the operative will first set the said totalizer in condition to be active by manipulation of the handles 406 and 412, as above described, then throw the subtraction-lever 158 to the position which will cause reverse rotation of the shaft 147, and, after advancing the master wheel to the point opposite the gear 397 of lowest denominational order of said totalizer, will depress the units numeral key. On depression of this key, under such circumstances, the units wheel will be turned back one step from "0" to "9," as measured in black numbers. There will also be effected a carry from the wheels of units denomination to the wheels of tens denomination, the number wheel of which will also be stepped back from "0" to "9," as measured in black numbers. This carry will be extended from order to order throughout all the wheels of the totalizer and, through the intermediary of the tooth 456 and teeth 454, the shield will be advanced a half step in the same direction, as a result of which there will then be exposed at the sight-opening of the shield a row of red zeros and the totalizer will be set in readiness to effect addition by reverse rotation, as heretofore more particularly explained.

At any rate, the number, corresponding to the key struck, will have been accumulated on such of the active totalizers as are in opposition to the carriages 333, 334, 341, either with the black or the red set of figures, according to the direction of rotation of the shaft 147 and the previous condition of the totalizers. The overthrow of the shaft 147 is prevented by the cam 433 which is carried by the gear 77, and will come in engagement with the arm 429 when the last of the teeth 78 has left the gear 144, so as to rock said arm 429 and thus bring the projections 264 on the arm 263 in engagement with the top side of the dog 256 to force the latter between the teeth of the ratchet wheel 262 on the shaft 147. The dog 256 will be locked in this position by the spring detent or dog 253 engaging in one of the notches on the arm 255.

After the last tooth 78 of the connected gear 77 has left the gear 144, so as to complete the extent of actuation of the shaft 147 corresponding to the particular numeral key struck, the cam 421 will come in engagement with the arm 420 to rock the shaft 228 and thus the arm 419, whereby the totalizers, which have received and accumulated the number corresponding to the key struck, will be swung away from the actuating mechanism, that is to say, so that gears 397 will come out of mesh with the gears 366 and 367. Just after this has occurred, the shaft 229, which has been permitted to remain stationary relative to the shaft 228, will be capable of moving back therewith, with the latter part of the movement thereof, to its original position by virtue of the fact that the arm 239 will have slipped off the end of the cam 240. This action will swing up the arm 373 so as to rotate the shaft 369, bringing the alining dogs 370 into engagement with the flat sides of the tens carrying gears 366, so as to bring all of said tens carrying gears back to their normal alined position.

After the digit or number corresponding to the numeral key which has been depressed has been run into the totalizers opposite the master-wheel carriages, and the totalizers have been swung away from the actuating mechanisms, as above set forth, the rotation of the gear 131 which carries the cam 240 will effect a spacing of the platen and of the master-wheel carriages, as a result of the engagement of the single tooth carried by said gear wheel 131 with the teeth of the wheel 204 corresponding thereto on the shaft 160. The shaft 160 will rotate, through the intermediate gearing, the shaft 276, and inasmuch as the clutch face 286 is normally in engagement with the clutch face 273, the platen carriage will be spaced one letter space to the left, that is to say, in a normal letter feeding direction. The movement of the shaft 160 will also rotate the screw shaft 182 through the connecting gearing which is normally in operation, so that the carriage 341 will move a space corresponding to a letter space movement of the carriage and also corresponding with the transference of its master wheel 363 from engagement with a gear controlling a numeral wheel of one denomination to the one of the next lower denomination, that is to say, the carriage 341 will move normally from left to right. The carriage 341 likewise carries, through the connecting mechanism, the supplementary carriages 333 and 334.

When the gear 131 nears the completion of its rotation, the cam 214 carried thereby will engage the arm 213, so as to rock the shaft 192. This shaft will swing down the returning rails 208, 210 and 212, so that not only will the trigger 82, corresponding in this instance to the numeral valuating mechanism for the key "5," but also the trigger 122, be rocked about their pivots. The former trigger 82 will be disengaged from the key locking mechanism, and both of these triggers will be swung to a position in which the point or toe will engage the corresponding shoulders 75 on their respective dogs 72 and 130, so as to disconnect their respective mutilated gears from driving relation with the shaft 58. This operation may be repeated until the number which it is desired to compute and imprint on the work sheet has been entirely written.

While the carriage 341 can move continuously from left to right to come in coöperation with each of the totalizers 382, the carriages 333 and 334 will be picked up by the carriage 341 at each new computing zone or column and dropped at the end thereof to permit them to be returned to a point corresponding with the coöperation of the highest denomination of their respective totalizers. This is accomplished by the rod 345 being automatically cammed up after the carriage 341 has traveled the length of one totalizer, so as to disconnect it from the carriage 341. When this happens, the spring 356 will draw both of the carriages 334 and 333 back to their starting position. Of course, if it is desired to operate merely with the carriage 341, the other two may be maintained out of connection continuously, by a depression of the key 442 to raise the bar 345 bodily, which key can be locked in its depressed position by the latch 445. If it is desired to throw out of operation either one of the carriages 333, 334, without the other, it is merely necessary to render the corresponding totalizer ineffective by shifting its sleeve 399 laterally and depressing its handle 412, as above described.

The direction of rotation of the shaft 147 depends on the position of the clutch 155, and this clutch is so connected to the ribbon shift of the typewriting mechanism that when the shaft 147 is rotating in one direction, red numerals will be printed on the work sheet, and when in the other direction, black numerals will be printed on the work sheet. It will be apparent, therefore, that when adding by an advance rotation upon a totalizer which has been set for such purpose, the numbers will be exhibited by the totalizer in black and will also be printed in black upon the work-sheet. When subtracting a number from a larger one thus accumulated on such totalizer, by a reverse rotation, the resultant number which will appear upon said totalizer will also be exhibited in black, but the subtracted number will be printed on the work-sheet in red. Conversely, when adding upon a totalizer by reverse rotation, after said totalizer has been set for such purpose, the numbers will be exhibited by said totalizer in red, and will also be printed on the work-sheet in red. When subtracting a smaller number from a larger one thus accumulated on such totalizer, by advance rotation, the resultant number will be exhibited by the totalizer in red, but the subtracted number will be printed on the work-sheet in black.

The series of totalizers 382 are provided for registering and accumulating the amounts in the various columns when added vertically. As one set of numbers is placed upon the paper, the carriage 341 will be in a position to operate and register upon the respective totalizer of the series 382. When the typewriter carriage is shifted so as to place another set of numbers in another column, the carriage 341 is correspondingly advanced in the manner already set forth so as to place the numbers upon another totalizer of the series 382. After the numbers have been placed in the various columns, the screw shaft 182 is reversed and the carriage 341 is moved in the opposite direction to a position adjacent the totalizer corresponding to the first column. Another series of numbers may be placed in the respective columns in the same manner and the same operation will be repeated until all of the amounts have been recorded or placed in the various columns on the paper. One of the series of totalizers 382 is provided for each of the columns, but any one or more thereof may be rendered inactive in the manner already set forth, so that as the carriage 341 passes the same the operating mechanism supported by said carriage will have no effect thereupon.

The many and varied uses to which the machine is adapted to be applied may best be illustrated by means of one or more simple examples of work which may be performed thereon. With the aid of Figs. 49 and 50, it will first be explained how numbers, typewritten in various columns on a work-sheet, may be both cross-footed and column-footed, the numbers for the respective footings being accumulated by different totalizers as the typewriting is done. It will also be explained how duplicate grand-totals of said numbers may be accumulated on different totalizers, thus affording a check on the work of the individual totalizers, and also how the various totalizers may be reset to zero on writing the totals on the work-sheet.

In Fig. 50, the larger numbers indicate those which would be printed or typewritten upon the work-sheet, whereas, in Fig. 49, each row of characters represents the readings upon the totalizers, involved in the computation, after one of said numbers has been printed. The small inclined numbers, above and to the left of the larger characters in Fig. 50, represent the order in which the numbers are printed or typewritten upon the work-sheet, whereas the readings of the various totalizers after each of said numbers has been printed are indicated in the correspondingly numbered row of characters in Fig. 49. For example, after the number "6" has been printed in the second line of the third column on the work-sheet, as indicated in Fig. 50, the readings of the totalizers, involved in the computation, will be found in the seventh line of characters in Fig. 49, this being indicated by the small inclined "7" above and to the left of said character "6" (see Fig. 50).

In Fig. 50, the large characters indicated in full lines would be printed in black upon the typewritten sheet, whereas those indicated in broken lines, for reasons which will be explained, would be printed in red.

In Fig. 49, the characters indicated in full lines would be exhibited in black at the sight-openings in the shields of the totalizers, whereas those indicated in broken lines would be exhibited in red.

In Fig. 49, the underscored readings of each line represent those of the totalizers, the readings of which were caused to be changed at the writing of the last character on the work-sheet. Of these underscorings, those represented by full lines indicate that the last computation was effected by an advance rotation of the computing wheels, whereas the broken-line underscorings indicate that the last computation was effected by a reverse rotation of the computing wheels.

As a matter of convenience, the totalizers of the series 382 may be designated and referred to as totalizers A to Q, respectively, and the totalizers 378 and 379 may likewise be designated and referred to as totalizers X and Y, respectively. In order to simplify the drawings, and to avoid the writing of numbers of many places, the readings of the totalizers are indicated as of three denominational orders only, but the principle involved is in no manner affected by this abbreviated form of illustration.

The manner of effecting the computation and record indicated in Figs. 49 and 50 may now be explained in detail. The larger numbers indicated in Fig. 50 may be typewritten in columns at any desired location on the work-sheet, as, for example, in columns designated $g$, $h$, $i$ and $j$, corresponding with the positions of the totalizers G, H, I and J, of the series 382.

Before inserting the work-sheet, for reasons which will hereinafter be apparent, the operative should see that the totalizers G, H, I and X have been set at zero in readiness to effect addition by advance rotation, whereas the totalizers J and Y should be set at zero in readiness to effect addition by reverse rotation, after which a row of black zeros will appear at the sight-opening in the shield of each of the totalizers G, H, I and X, and a row of red zeros will appear at the sight-opening in the shield of each of the totalizers J and Y, as indicated in line O of Fig. 49. The manner of effecting these settings has already been described.

The totalizers G, H, I and J and the totalizer X, will then be set to be active, whereas all the other totalizers of the machine will be set to be inactive, in the manner hereinbefore set forth. The work-sheet may then be inserted into the machine, and after advancing the platen and the master-wheel carriages, so as to bring the printing point in position for writing the "2" of the first number to be entered, that is, to the tens place of column $g$ on the work-sheet, and so as to bring the master-wheels of the carriages 341 and 333 opposite the tens orders of the totalizers G and X, respectively, and with the subtraction-lever 158 set to cause advance rotation, the proper numeral keys 84 of the series will be depressed in succession to write the number "24" in black on the work-sheet in the first line of column $g$, and this number will, at the same time, be registered in the totalizers G and X, which will each exhibit the number "24" in black, as indicated in line 1 of Fig. 49. The color of printing and the color exhibited by the totalizer will both be black because effected with the subtraction-lever set for advance rotation.

The platen and the master-wheel carriages will then be advanced so as to write the number "7," in black, in the first line of column $h$ on the work-sheet, which will be registered and exhibited in black by the totalizer H, and at the same time added to the "24" previously registered in totalizer X, the readings of the totalizers being then as indicated in line 2 of Fig. 49.

In like manner, the number "298" will be typewritten in black in the first line of column $i$ on the work-sheet, registered and exhibited in black in totalizer I, and added to the "31" previously accumulated in totalizer X, after which the readings will be as indicated in line 3 of Fig. 49. At this stage in the computation, it may be observed that the numbers "24," "7" and "298," appearing in the first line of the work-sheet, and in columns $g$, $h$ and $i$, respectively, will be exhibited in black by the totalizers G, H and I, respectively, and that their sum, or "329," will be exhibited in black by the totalizer X.

The platen will then be advanced to the proper position to write, in the first line of column $j$ on the work-sheet, the total or cross-footing of the numbers "24," "7" and "298," listed in the first lines of columns $g$, $h$ and $i$. The master-wheel carriages 341 and 333 will, at the same time, properly position their master wheels opposite wheels of the totalizers J and X. Since it is now desired to subtract the cross-footing from the totalizer X, and register the same on the totalizer J, as the same is printed on the work-sheet, the subtraction-lever should be set for reverse rotation, after which the number keys of the series 84, corresponding to the cross-footing exhibited by the totalizer X, will be depressed in succession. In view of the setting of the subtraction-lever for reverse rotation, the cross-footing will be printed in red, as indicated by the broken-line characters in Fig. 50, and said cross-footing will at the same time be subtracted from the totalizer X, the wheels of which will thus be restored to zero. Moreover, since the totalizer J was originally set for addition by reverse rotation, the cross-footing will be added in that totalizer and exhibited thereby in red, as totalizer X is restored to zero. The readings, at this stage of the proceeding, are indicated in line 4 of Fig. 49.

The platen will then be properly positioned for writing the number "16" in the second line of column $g$. Then, with the same totalizers G, H, I, J and X only set for activity, and with the subtraction-lever again set for advance rotation, the numbers "16," "31" and "6" will be typewriten in the second line of columns $g$, $h$ and $i$, underneath the numbers "24," "7" and "298," respectively, of the first line of numbers. These numbers, as typewritten, will be added to those previously registered in the totalizers G, H and I, respectively, and the sum of these numbers will, at the same time, be accumulated by the totalizer X. The readings of the respective totalizers, after the three numbers have been written in the second line of columns $g$, $h$ and $i$, are indicated in line 7 of Fig. 49.

The subtraction-lever should next be set for reverse rotation, and with the platen advanced for writing in the second line of column $j$, the cross-footing "53" may be read from the totalizer X and written on the work-sheet under the number "329," where it will appear in red. The number "53" will, at the same time, be subtracted from the totalizer X and added to the number "329," which was previously registered in the totalizer J. The readings of the totalizers will then be as indicated in line 8 of Fig. 49.

In like manner, the third row of numbers, "147," "19" and "27," will be typewritten in the third line on the work-sheet, in their respective columns, said numbers being added respectively to the numbers previously accumulated in the totalizers G, H and I, and their sum, "193," which would first be accumulated in the totalizer X, (line 11 of Fig. 49), being subsequently subtracted therefrom and added to the number "382," previously accumulated by the totalizer J, as the same is written in column $j$. The readings of the various totalizers will then be as indicated in line 12 of Fig. 49, in which the totalizers G, H and I exhibit the totals of the numbers typewritten in the respective columns $g$, $h$ and $i$, the totalizer X has been restored to zero, and the totalizer J exhibits the grand-total of the cross-totals typewritten in column $j$.

The totalizer Y should next be set to be active, the totalizer X to be inactive, and the subtraction-lever 158 for reverse rotation of the computing wheels, so that the column-footings or sub-totals may be added into the totalizer Y, which was initially set for addition by reverse rotation, as they are written at the foot of their respective columns and subtracted out of the totalizers G, H and I.

It may be observed that since the master wheel of the carriage 341 is brought into position for coöperation with but one of the totalizers G, H, I and J at any one time, these totalizers may be set to be active at the commencement of the computation and permitted to remain so to the finish, because at each step only the totalizer in coöperative relation with said master wheel will be affected. Since, however, the master wheels of carriages 333 and 334 position their master wheels in coöperative relation with the totalizers X and Y, respectively, at each step of the computation, care must be observed to set either or both of said totalizers X and Y to be inactive if it is desired that the same shall not be affected.

With the parts of the mechanism set as last directed, the platen may be properly positioned for writing the sub-total or column-footing of the numbers written in column $g$ at the foot of said column. This may be accomplished by first reading the column-footing, "187," from totalizer G and then depressing the corresponding number keys of the series 84. As this is done with the subtraction-lever set for reverse rotation, the column-footing will be printed in red on the work-sheet, subtracted out of the totalizer G, which will therefore be returned to zero, and registered and exhibited in red on the totalizer Y. In like manner, the sub-totals "57" and "331" of columns $h$ and $i$ may be written in red at the foot of said columns, said totals being at the same time subtracted from their respective totalizers H and I and accumulated upon the totalizer Y. If no mistake has been made, the number "575," which will be exhibited in red by the totalizer Y, and which is the sum of the column-footings or sub-totals of columns $g$, $h$ and $i$, will properly check up with the number "575," exhibited in red by the totalizer J, and which is the sum of the cross-footings, of the numbers printed in the respective horizontal lines. These duplicate representations of the grand-total, being independently accumulated on separate totalizers, afford a test of the accuracy of the computations effected by the individual totalizers. At this stage of the computation, the readings of the totalizers will be as represented in line 15 of Fig. 49, in which the totalizers J and Y are represented as exhibiting the number "575" in red, and the other totalizers are all represented as having been returned to zero.

The platen may next be positioned for writing the grand-total at the right of the series of sub-totals or column-footings and at the foot of the column of cross-footings, and in order that said grand-total may be at the same time subtracted from the totalizers J and Y, so as to return them to zero, the subtraction-lever 158 should first be set for advance rotation of the computing wheels. This will clear the machine, the readings of the various totalizers being as represented in line 16 of Fig. 49.

Although the simple illustration which has been given involved the cross-footing and column-footing of numbers typewritten in but three columns and in but three lines in each column, it will be apparent that the number of columns and the number of lines in each column in which numbers may be typewritten and likewise column-footed and cross-footed, would be limited only by the capacity of the machine.

The various column-footings and cross-footings, and the grand-total, of the numbers printed on the work-sheet in the order illustrated in Fig. 50, may, if desired, be accumulated on the totalizers in a somewhat different manner as follows:

After the first horizontal row of numbers has been printed in columns $g$, $h$ and $i$, registered in the totalizers G, H and I, and accumulated in the totalizer X, in the manner explained above, and with totalizer J set to be inactive, totalizer Y set to be active, and the subtraction-lever set for reverse rotation, the cross-footing of said first horizontal row of numbers, as read from totalizer X, may be printed in column $j$ and, at the same time, registered in totalizer Y as it is subtracted from totalizer X, so as to clear the same. Totalizer Y may then again be set to be inactive and the numbers of the second line printed in columns $g$, $h$ and $i$, added into totalizers G, H and I, and accumulated in totalizer X, as in the previously explained example. With totalizer J inactive, totalizer Y again set to be active, and the subtraction-lever again set for reverse rotation, the cross-footing of the second row may then be printed in column $j$, added to the cross-footing of the first row of numbers previously registered in totalizer Y, and subtracted from totalizer X. This process may be continued until all the numbers to be added have been printed in their respective columns, after which the respective column-footings will be exhibited in black by the totalizers G, H and I, the totalizer X will stand at zero, and the grand-total will be exhibited in red by totalizer Y. With totalizers X and Y both set to be inactive, and the subtraction-lever set for reverse rotation, the column-footings, as read from totalizers G, H and I, may be printed at the foot of columns $g$, $h$ and $i$, respectively, and the corresponding totalizers returned to zero. With totalizer Y then set to be active and the subtraction-lever set for advance rotation the grand-total may be printed under the column of cross-footings and the totalizer Y at the same time returned to zero.

The machine may also be used to write numbers in one column, each of which is to be subtracted from a number written in the same line in another column, the differences between the numbers in each line being accumulated and typewritten as cross-footings, and the numbers written in the various columns being accumulated and written as column-footings. A grand-total may also be accumulated and printed at the right of the column-footings and beneath the column of cross-footings.

An example of work of the last-mentioned character will be explained with the aid of Figs. 51 and 52, in which the distinguishing features of the characters indicated have the same significance as in Figs. 49 and 50.

In Fig. 52, the large characters represent numbers which might be printed on the work-sheet, in three columns, and may be regarded as representing a record of a number of weights, the numbers in the first column representing the gross weight of each of a number of specimens, the corresponding number in the second column representing the tare, or weight of the container, and the corresponding number in the third column representing the net weight.

Before inserting the work-sheet into the machine, any three of the totalizers 382, as, for example, the totalizers D, E and F, may be arbitrarily selected as the ones in which the numbers in the three columns of the work-sheet, correspondingly designated $d$, $e$ and $f$, in Fig. 52, will be accumulated. One or the other of the totalizers 378, 379, as, for example, the totalizer X, will also be selected as the one in which the differences between numbers printed in columns $d$ and $e$ will be accumulated, and the other of the last-mentioned totalizers, Y, will be selected for use in subsequently accumulating a checking grand-total. The totalizers D and X will then be set for addition by advance rotation and the totalizers E, F and Y for addition by reverse rotation. The totalizers D, E, F and X will first be set to be active and all other totalizers, including totalizer Y to be inactive. These various settings will be effected in the manner hereinbefore set forth, after which the readings of the selected totalizers will be as represented in line O of Fig. 51.

With the machine set as directed above, and with the subtraction-lever set for advance rotation, the work-sheet will next be inserted and the platen positioned to write the number "400" in the first line of column $d$ (Fig. 52). As the number is typewritten by depressing the proper number keys 84, the number "400" will be registered in the totalizers D and X, in which they will be exhibited in black. The record on the work-sheet will also appear in black.

Since the number "120", to be typewritten in line 1, of the column $e$, is to be subtracted from the number "400", the subtraction-lever 158 will next be set for reverse rotation, so that when said number is printed upon the work-sheet, it will appear in red and, at the same time, be registered by reverse rotation in the totalizer E, where it will be exhibited in red. The number "120" will also be subtracted from the "400" previously registered in the totalizer X, in which the difference between "400" and "120", or "280", will be exhibited in black. The readings at this stage of the proceeding will be as represented in line 2, of Fig. 51.

The difference between "400" and "120", may next be written in column $f$, on the work-sheet, at the right of the number "120".

By leaving the subtraction-lever set for reverse rotation, this number may at the same time be subtracted from the totalizer X as it is added into the totalizer F, so as to return totalizer X to zero.

The subtraction-lever will then be again set for advance rotation after which the number "80" may be written in black in column $d$, under the number "400", and at the same time added to the "400" previously registered in the totalizer D, the number "80" being also registered in the totalizer X. The number "24" may then be printed in red in column $e$, Fig. 52, under the number "120", the subtraction-lever being first set for reverse rotation, so that said number will be subtracted from the "80" previously registered in the totalizer X at the same time that it is added to the "120" previously registered in the totalizer E.

The difference between the two numbers in the second line, as printed on the work-sheet, that is, "56", may next be written in column $f$, Fig. 52, under the number "280", the same being subtracted from the totalizer X, thus returning the same to zero, and added to the "280" which had previously been registered in totalizer F.

By the same process, the number "60" may be subtracted from the number "200", as the same are typewritten in the third line on the work-sheet, said numbers being added to the numbers "144" and "480", previously accumulated in the column-totalizers E and D, respectively. The difference, "140", between these numbers "200" and "60" will first be accumulated in totalizer X, and then subtracted therefrom and added to the number "336", previously accumulated in the totalizer F, as it is typewritten in red in column $f$. The readings of the various totalizers at this stage of the proceeding will be as represented in line 9 of Fig. 51.

To obtain an independent duplicate of the grand-total, so as to check the work of the various totalizers, the subtraction-lever will be permitted to remain as last set for reverse rotation, and, after setting the totalizer Y to be active, and the totalizer X to be inactive, the number "68", exhibited in black in the totalizer D, will be printed in red at the foot of column $d$, Fig. 52, said number being at the same time subtracted from said totalizer D and added into the totalizer Y, in which it will be exhibited in red. With the reversing lever then set for advance rotation, the number "204", exhibited in red by the totalizer E, may be printed in black at the foot of column $e$, Fig. 52, the sum being subtracted from said totalizer $e$ and likewise subtracted from the "680", previously registered in the totalizer Y, so that the readings of the respective totalizers will be as represented in line 11 of Fig. 51. If the work of the various totalizers, up to this point, has been accurately performed, the grand-total of the various differences, or cross-footings, and the two column-footings will be duplicated, and exhibited in red in totalizers F and Y, since the number exhibited by totalizer Y is the difference between the column-footings of columns $d$ and $e$, whereas the number exhibited by totalizer $f$ is the sum of the differences or cross-footings of column $f$. The two totals thus obtained should evidently be equal. This grand-total may be written in black under the cross-footings of column $f$ and at the same time subtracted from the totalizers F and Y, which will thus be returned to zero, by first setting the subtraction-lever for advance rotation. This will leave all of the totalizers cleared, as indicated in line 12 of Fig. 51.

The machine may also be used to accumulate the totals of a number of items of different classes printed in separate columns on a work-sheet, as, for example, a number of columns of credit items, and a number of columns of debit items. If desired, the debit items may be printed in black, and the credit items may be printed in red. Before inserting the work-sheet into the machine, certain of the totalizers of the series A to Q, corresponding to the columns or zones in which it is desired to print credit items, would be set for addition by reverse rotation, and one or the other of the totalizers X and Y, as, for example, the totalizer Y, would be set for addition by reverse rotation, simultaneously with the setting of one of the item registers, so as to be used for accumulating credit items. The other item totalizers of the series A to Q, and the totalizer X, should be left in condition for addition by advance rotation. The various items should then be printed in the respective credit and debit columns, care being taken to have the subtraction-lever set for advance rotation when entering a debit item, and for reverse rotation when entering a credit item. Care must also be observed to have the totalizer X set to be active, and Y set to be inactive when entering debit items, and the totalizer Y active, and X inactive, when entering credit items. After all the items have been printed in their respective columns, the debits in black, and the credits in red, the sums of the items of each column will be exhibited in corresponding color by the corresponding totalizer of the series A to Q. The total of all the debit items will be exhibited in black by the totalizer X, and the sum of all the credit items will be exhibited in red by the totalizer Y. These various totals may be printed on the work-sheet, and the respective totalizers at the same time returned to zero, if care is observed to set the subtraction-lever for rotation of the proper direction to subtract the number from the totalizers as it is printed.

Although the simple illustrative examples, which have been set forth above, by no means exhaust the capabilities of the machine disclosed, they are deemed sufficient as a demonstration of its usefulness.

Certain features disclosed in this application are also disclosed in somewhat different forms, and broadly claimed, in my prior applications, Serial Nos. 236,498, filed December 12, 1904, and 302,845, filed February 26, 1906. Application Serial No. 236,498 is directed, among other things, to a series of column-totalizers, a cross-totalizer, a grand-totalizer, and actuating mechanism for said totalizers, including reversing mechanism. Application Serial No. 302,845 is directed, among other things, to a somewhat different arrangement of totalizers and actuating mechanism, including reversing mechanism, for effecting column-footing and cross-footing, and for accumulating a grand-total, concomitantly with the writing of a series of numbers in different columns on a work-sheet. In the present application, I do not claim any of the features common thereto and to either of the above-mentioned applications, the claims in this case being restricted to features not disclosed in either of said prior applications.

In order that the invention might be fully understood, the details of the foregoing embodiment thereof have been thus specifically described but what is claimed as new is:—

1. In a calculating machine, the combination with a set of totalizers, of a cross totalizer, a grand totalizer, means to enable the simultaneous operation of said cross totalizer with any one of said set of totalizers, and also the simultaneous operation of said grand totalizer with said cross totalizer, means for reversing the direction of operation of the totalizers at will, and means for rendering said cross totalizer inactive, to permit the operation of subtracting the grand total, when the direction of operation of the grand totalizer is reversed, to be performed without affecting the cross-totalizer.

2. In a calculating machine, the combination with a set of column totalizers, of a cross totalizer, a grand totalizer, means to enable the simultaneous operation of said cross totalizer with any one of said column totalizers, and also to enable the independent or simultaneous operation of said grand totalizer with respect to said cross totalizer, individual silencing means effective for each totalizer independently of the others, and a general means for reversing the direction of operation of said totalizers at will.

3. In a calculating machine, the combination with a set of column totalizers, of a cross totalizer, a grand totalizer, means to enable the simultaneous operation of said cross totalizer with any one of said set of column totalizers, and also the simultaneous operation of said grand totalizer with said cross totalizer, means for reversing the direction of operation of all of said totalizers at will, and means for rendering the column totalizers inactive, to permit independent operation of the grand and cross totalizers, when the direction of operation of either or both of said cross totalizers and said grand totalizer is reversed.

4. In a calculating machine, the combination with a set of totalizers, of a cross totalizer, a grand totalizer, means to enable the simultaneous operation of said cross totalizer with any one of said set of totalizers, and also the simultaneous operation of said grand totalizer with said cross totalizer, means whereby the direction of operation of all of said totalizers may be reversed at will, said first-mentioned means acting to enable the simultaneous operation of said grand totalizer and said cross totalizer when a direction of rotation of said cross totalizer is reversed, means for rendering the totalizer of said set of totalizers inactive when a direction of operation of said cross and said grand totalizers is reversed, and means for rendering said cross totalizer inoperative when the direction of said grand totalizer is reversed.

5. In a calculating machine, the combination with a set of totalizers, of a cross totalizer, a grand totalizer, means to enable the simultaneous operation of said cross totalizer with any one of said set of totalizers, and also the simultaneous operation of said grand totalizer with said cross totalizer, means whereby the direction of operation of all of said totalizers may be reversed at will, said first-mentioned means acting to enable the simultaneous operation of said grand totalizer and said cross totalizer when a direction of rotation of said cross totalizer is reversed, means for rendering the totalizer of said set of totalizers inactive when a direction of operation of said cross and said grand totalizers is reversed, and means for rendering said cross totalizer inoperative when the direction of said grand totalizer is reversed; said last-mentioned means acting to enable the rendering of said cross totalizer and said grand totalizer inactive when the direction of operation of the totalizer of said set of totalizers is reversed.

6. In a calculating machine, the combination of a series of totalizers, means for operating said totalizers, said operating means being common to all of said totalizers, means for moving said operating means to the totalizers of the set successively, a cross totalizer, a cross totalizer operating means, a grand totalizer adapted to receive the amount from the cross totalizer, a grand totalizer operating means, and means operatively related to the first said totalizer operating means for simultaneously and intermittently advancing the cross and grand totalizer operating means.

7. In a calculating machine, the combination of a series of totalizers, means for operating said totalizers, said operating means being common to all of said totalizers, means for moving said operating means to the totalizers of said series successively, a cross totalizer, a cross totalizer operating means, a grand totalizer adapted to receive the amount from the cross totalizer, a grand totalizer operating means, means operatively related to the first said totalizer operating means for simultaneously and intermittently advancing the cross and grand totalizer operating means in one direction, and means for moving the cross and grand totalizers in the opposite direction.

8. In a calculating machine, the combination of a series of totalizers, means for operating said totalizers, said operating means being common to all of said totalizers, means for moving said operating means successively to the totalizers of said series, a cross totalizer, a cross totalizer operating means, a grand totalizer adapted to receive the amount from the cross totalizer, a grand totalizer operating means, means connecting the cross and grand totalizers operating means for simultaneous and intermittent advancing movement, an operative connection between the first said operating means and the operating means for the cross and grand totalizers for moving the latter in one direction, means for automatically disconnecting the first said operating means and the cross and grand totalizers operating means, and means for returning the latter when released.

9. In a calculating machine, the combination of a series of totalizers, means for operating said totalizers, said operating means being common to all of said totalizers, means for moving said operating means successively to the totalizers of said series, a cross totalizer, a cross totalizer operating means, a grand totalizer adapted to receive the amount from the cross totalizer, a grand totalizer operating means, means connecting the cross and grand totalizers operating means for simultaneous and intermittent advancing movement, an operative connection between the first said operating means and the operating means for the cross and grand totalizers for moving the latter in one direction, means for automatically disconnecting the first said operating means and the cross and grand totalizers operating means, means for returning the latter when released, and common means for simultaneously operating all of said operating means.

10. In a calculating machine, the combination of a series of totalizers, means for operating said totalizers, said operating means being common to all of said totalizers, means for moving said operating means successively to the totalizers of said series, a cross totalizer, a cross totalizer operating means, a grand totalizer adapted to receive the amount from the cross totalizer, a grand totalizer operating means, means connecting the cross and grand totalizers operating means for simultaneous intermittent advancing movement, an operative connection between the first said operating means and the operating means for the cross and grand totalizers for moving the latter in one direction, means for automatically disconnecting the first said operating means and the cross and grand totalizers operating means, means for returning the latter when released, common means for simultaneously operating all of said operating means, and means for reversing the direction of operation of said operating means at will.

11. In a calculating machine, the combination of a series of totalizers, means for operating said totalizers, means for successively advancing said operating means to the totalizers from one end to the other of the series, a cross totalizer, a cross totalizer operating means, a grand totalizer adapted to receive the amount from the cross totalizer, a grand totalizer operating means, means connecting the cross and grand totalizers operating means for simultaneous intermittent advancing movement, an operative connection between the first said operating means and the operating means for the cross and grand totalizers for moving the latter in one direction, means for automatically disconnecting the first said operating means and the cross and grand totalizers operating means, means for returning the latter when released, means for returning the first said totalizer operating means to the first totalizer of said series independently of the other totalizers operating means, and common means for operating all of said totalizers operating means.

12. In a calculating machine, the combination of a series of totalizers, means for operating said totalizers, said operating means being common to all of said totalizers, means for moving said operating means successively to the totalizers of the series, means for rendering any one or more of said totalizers inactive to permit the said operating means to pass without operating the totalizers, a cross totalizer, a product totalizer operating means, means whereby the operating means of the totalizers of said series and said cross totalizer operating means may be simultaneously advanced, a grand totalizer, a grand totalizer operating means, means connecting said cross and grand totalizers operating means for simultaneous advancement, common means for operating all of said operating means, and means whereby said grand totalizer may be rendered active or inactive with respect to the said cross totalizer at will.

13. In a calculating machine, the combination of a series of totalizers, operating means for said totalizers common to all of said series, a cross totalizer, a cross totalizer operating means, a grand totalizer, a grand totalizer operating means, a connecting member between the cross and grand totalizers operating means, whereby the last said totalizers operating means will be simultaneously advanced, means for advancing the first said totalizer operating means, means operatively related to the first said totalizer operating means and coöperating with the said member to intermittently advance the connected totalizers operating means, means for shifting said member to release the connected totalizers operating means from the first said totalizer operating means when the latter has moved a distance equal to the length of one totalizer, and means for returning the connected totalizers operating means when released.

14. In a calculating machine, the combination of a series of totalizers, operating means for said totalizers common to all of said series, a cross totalizer, a cross totalizer operating means, a grand totalizer, a grand totalizer operating means, a connecting member between the cross and grand totalizers operating means, whereby the last said totalizers operating means will be simultaneously advanced, means for advancing the first said totalizer operating means, means operatively related to the first said totalizer operating means and coöperating with the said member to intermittently advance the connected totalizers operating means, means arranged within the path of movement of and adapted to be engaged by said member for shifting the member to disconnect the connected totalizers operating means from the first said operating means, when the first said operating means has moved a distance equal to the length of one totalizer and elastic means for returning the connected totalizers operating means when released.

15. In a calculating machine, the combination of a series of totalizers, operating means for said totalizers common to all of said series, a cross totalizer, a cross totalizer operating means, a grand totalizer, a grand totalizer operating means, a connecting member between the cross and grand totalizers operating means whereby the last said totalizers operating means will be simultaneously advanced, said member being provided with a plurality of spaced projections, means for advancing the first said totalizers operating means, the supporting frame of the first said totalizer operating means being provided with a projection adapted to successively engage the projections on said member to intermittently advance the member and the said connected totalizers operating means, a projection arranged within the path of movement of and adapted to be engaged by said member for shifting the member to disengage the said projections to release the first said operating means from the connected totalizers operating means, means for returning the latter when released, and means for returning the member to position the next projection thereon to be engaged by the projection on the said frame as the latter is advanced.

16. In a calculating machine, the combination of a series of totalizers, operating means for the totalizers, means for successively advancing one to the other whereby said operating means will be common to all of the totalizers, a cross totalizer, a cross totalizer operating means, and means for automatically positioning the totalizers to be operated by their respective operating means and for moving the totalizers out of operative position to permit the totalizers and their respective operating means to be advanced one with respect to the other.

17. In a calculating machine, the combination of a series of totalizers, operating means for the totalizers, means for successively advancing one to the other whereby said operating means will be common to all of the totalizers, a cross totalizer, a cross totalizer operating means, means for setting any one or more of said totalizers so as to render the same inactive with respect to their respective operating means, and means for automatically moving the remaining totalizers into operative position when the said operating means is adjacent thereto and for moving the totalizer out of operative position to permit the totalizer and the said operating means to be advanced, one with respect to the other.

18. In a calculating machine, the combination of a series of totalizers, operating means for the totalizers, means for successively advancing one to the other whereby said operating means will be common to all of the totalizers, a cross totalizer, a cross totalizer operating means, means whereby any one of said series of totalizers and said cross totalizer may be simultaneously operated, means for automatically moving the totalizers into operative position to be actuated by the respective operating means when the latter is adjacent the totalizer and for moving the totalizer out of operative position to permit one to be advanced with respect to the other, a grand totalizer, a grand totalizer operating means, means for causing said grand totalizer to be operated simultaneously with the said cross totalizer or independently with respect thereto at will.

19. In a calculating machine, the combination of a series of totalizers, operating means for said totalizers, means for successively advancing one with respect to the other whereby the said operating means will be common to all of the totalizers, a cross totalizer, a cross totalizer operating means, means for setting any one or more of said totalizers so as to render the same inactive with respect to their respective operating means, means for automatically moving the remaining totalizers into position to be engaged and operated by the said operating means when the latter is adjacent the totalizers and for moving the totalizers out of engagement with the operating means to permit the totalizers and operating means to be advanced with respect to each other, and means for reversing the direction of operation of the totalizers at will.

20. In a calculating machine, the combination of a series of totalizers, operating means for said totalizers, means for successively advancing one with respect to the other whereby the said operating means will be common to all of the totalizers, a cross totalizer, a cross totalizer operating means, means for setting any one or more of said totalizers so as to render the same inactive with respect to their respective operating means, means for automatically moving the remaining totalizers into position to be engaged and operated by the said operating means when the latter is adjacent the totalizers and for moving the totalizers out of engagement with the operating means to permit the totalizers and operating means to be advanced with respect to each other, and means for simultaneously operating all of said operating means for actuating their respective totalizers.

21. In a calculating machine, the combination of a series of totalizers, operating means for said totalizers, means for advancing one with respect to the other whereby the operating means will be common to all of said totalizers, a cross totalizer, a cross totalizer operating means, means for actuating said totalizers operating means, keys for controlling the said actuating means, and means operatively related to the last said means for moving the totalizers and the respective operating means into engagement and for moving the totalizer and operating means out of engagement to permit the totalizer and operating means to be advanced one with respect to the other, and means for causing such advancing movement.

22. In a calculating machine, the combination of a series of totalizers, operating means for said totalizers, means for advancing one with respect to the other whereby the operating means will be common to all of said totalizers, a cross totalizer, a cross totalizer operating means, means whereby any one of said series of totalizers may be operated simultaneously with the cross totalizer, actuating means for the totalizers operating means, keys for controlling said acuating means, means operatively related to the said actuating means for moving the totalizers into operative connection with their respective operating means and out of operative connection therewith to permit one to be advanced with respect to the other, a grand totalizer, means whereby said grand totalizer may be operated simultaneously with and independently with respect to the said cross totalizer and independently with respect to the totalizers of said series.

23. In a calculating machine, the combination of a series of totalizers, operating means, for said totalizers, means for advancing one with respect to the other whereby the operating means will be common to all of said totalizers, a cross totalizer, a cross totalizer operating means, means whereby any one of said series of totalizers may be operated simultaneously with the cross totalizer, actuating means for the totalizers operating means, keys for controlling said actuating means, means operatively related to the said actuating means for moving the totalizers into operative connection with their respective operating means and out of operative connection therewith to permit one to be advanced with respect to the other, a grand totalizer, a grand totalizer operating means operatively related to said actuating means, means whereby said grand totalizer may be operated simultaneously with the said cross totalizer and in opposite direction, and also independently with respect to the cross totalizer, and means for reversing the direction of operation of the totalizers at will.

24. In a calculating machine, the combination of a series of totalizers, operating means for the totalizers, means for advancing one with respect to the other whereby said operating means will be common to all of said totalizers, a cross totalizer, a cross totalizer operating means, means for simultaneously actuating both of said operating means, a rock shaft, means operatively related to the shaft for moving the totalizers and their respective operating means into and out of engagement, and means for rocking said shaft.

25. In a calculating machine, the combination of a series of totalizers, operating means for the totalizers, means for advancing one with respect to the other whereby said operating means will be common to all of said totalizers, a cross totalizer, a cross totalizer operating means, means for simultaneously actuating both of said operating means, means whereby any one of said totalizers may be simultaneously operated with the cross totalizer, a rock shaft, means operatively related to the shaft for moving the totalizers and their respective operating means into and out of engagement, and means for rocking said shaft.

26. In a calculating machine, the combination of a series of totalizers, operating means for the totalizers, means for advancing one with respect to the other whereby said operating means will be common to all of said totalizers, a cross totalizer, a cross totalizer operating means, means for simultaneously actuating both of said operating means, a rock shaft, means operatively related to the shaft for moving the totalizers and their respective operating means into and out of engagement, means for rocking said shaft, and means for rendering any one or more of said totalizers inactive with relation to the respective operating means.

27. In a calculating machine, the combination of a series of totalizers, operating means therefor, means for advancing one with respect to the other whereby said operating means will be common to all of said totalizers, a cross totalizer, a cross totalizer operating means, a grand totalizer, a grand totalizer operating means, means for simultaneously actuating all of said operating means, a rock shaft, means operatively related to the shaft for moving the totalizers into and out of operative connection with their respective operating means, means separate from said shaft for rendering any one or more of said totalizers inactive with relation to their respective operating means and also with respect to each other at will, and means for rocking said shaft.

28. In a calculating machine, the combination of a series of totalizers, operating means therefor, means for advancing one with respect to the other whereby said operating means will be common to all of said totalizers, a cross totalizer, a cross totalizer operating means, a grand totalizer, a grand totalizer operating means, means for simultaneously actuating all of said operating means, a rock shaft, means operatively related to the shaft for moving the totalizers into and out of operative connection with their respective operating means, means separate from said shaft for rendering any one or more of said totalizers inactive with relation to their respective operating means and also with respect to each other at will, means operatively related to said actuating means for rocking the shaft and keys for controlling said actuating means.

29. In a calculating machine, the combination of a series of totalizers, operating means therefor, one of said totalizer and operating means being movable with respect to the other whereby said operating means will be common to all of said totalizers, a cross totalizer, a cross totalizer operating means, a shaft connected to drive all of said operating means, means whereby any one of said totalizers may be operated in unison with the cross totalizer, means for shifting said totalizers and the respective operating means into operative relation with each other, and for shifting them out of operative relation to permit said operating means and totalizers to pass each other, a power shaft, and means whereby said power shaft will impart a variable movement to the first said shaft.

30. In a calculating machine, the combination of a series of totalizers, operating means therefor, one of said totalizer and operating means being movable with respect to the other whereby said operating means will be common to all of said totalizers, a cross totalizer, a cross totalizer operating means, a shaft connected to drive all of said operating means, means whereby any one of said totalizers may be operated in unison with the cross totalizer, means for shifting said totalizers and the respective operating means into operative relation with each other and for shifting them out of operative relation to permit said operating means and totalizers to pass each other, a power shaft, means whereby said power shaft will impart a variable movement to the first said shaft, and means for locking the first said shaft against overthrow.

31. In a calculating machine, the combination of a series of totalizers, operating means therefor, one of said totalizer and operating means being movable with respect to the other whereby said operating means will be common to all of said totalizers, a cross totalizer, a cross totalizer operating means, a shaft connected to drive all of said operating means, means whereby any one of said totalizers may be operated in unison with the cross totalizer, means for shifting said totalizers and the respective operating means into operative relation with each other and for shifting them out of operative relation to permit said operating means and totalizers to pass each other, a power shaft, means whereby said power shaft will impart a variable movement to the first said shaft, and positive means controlled by the last said means for locking the first said shaft against overthrow movement.

32. In a calculating machine, the combination of a series of totalizers, operating means therefor, one of said totalizer and operating means being movable with respect to the other whereby said operating means will be common to all of said totalizers, a cross totalizer, a cross totalizer operating means, a shaft connected to drive all of said operating means, means whereby any one of said totalizers may be operated in unison with the cross totalizer, means for shifting said totalizers and the respective operating means into operative relation with each other and for shifting them out of operative relation to permit said operating means and totalizers to pass each other, a power shaft, means whereby said power shaft will impart a variable movement to the first said shaft, and keys for controlling the last said means at will.

33. In a calculating machine, the combination of a series of totalizers, operating means therefor, one of said totalizer and operating means being movable with respect to the other whereby said operating means will be common to all of said totalizers, a cross totalizer, a cross totalizer operating means, a shaft connected to drive all of said operating means, means whereby any one of said totalizers may be operated in unison with the cross totalizer, means for shifting said totalizers and the respective operating means into operative relation with each other and for shifting them out of operative relation to permit said operating means and totalizers to pass each other, a power shaft, means operatively related to the power shaft for operating the last said means, and means also operatively related to the power shaft for imparting a variable movement to the first said shaft.

34. In a calculating machine, the combination of a series of totalizers, operating means therefor, one of said totalizer and operating means being movable with respect to the other whereby said operating means will be common to all of said totalizers, a cross totalizer, a cross totalizer operating means, a shaft connected to drive all of said operating means, means whereby any one of said totalizers may be operated in unison with the cross totalizer, means for shifting said totalizers and the respective operating means into operative relation with each other and for shifting them out of operative relation to permit said operating means and totalizers to pass each other, a power shaft, means operatively related to the power shaft for actuating the said shifting means, actuating means also operatively related to the power shaft for imparting a variable movement to the first said shaft, and keys for controlling both of said actuating means.

35. In a calculating machine, the combination of a series of totalizers, operating means therefor, one of said totalizers and operating means being movable with respect to the other whereby said operating means will be common to all of said totalizers, a cross totalizer, a cross totalizer operating means, a shaft connected to drive all of said operating means, means whereby any one of said totalizers may be operated in unison with the cross totalizer, means for shifting said totalizers and the respective operating means into operative relation with each other and for shifting them out of operative relation to permit said operating means and totalizers to pass each other, a power shaft, means operatively related to the power shaft for actuating the said shifting means, actuating means also operatively related to the power shaft for imparting a variable movement to the first said shaft, and keys for simultaneously controlling both of said actuating means.

36. In a calculating machine, the combination of a series of totalizers, operating means therefor, said totalizers and operating means being movable with relation to each other whereby said operating means will be common to all of said totalizers, a cross totalizer, a cross totalizer operating means, a shaft for operating both of said operating means, means whereby any one of said totalizers may be actuated simultaneously with the cross totalizer, a continuously operating power shaft, means operatively related to the power shaft for imparting a variable movement to the first said shaft, a normally inactive clutch between said power shaft and the last said means, and a key for controlling the clutch for operatively connecting the power shaft with the last said means to impart motion thereto.

37. In a calculating machine, the combination of a series of totalizers, operating means therefor, said totalizers and operating means being movable with relation to each other whereby said operating means will be common to all of said totalizers, a cross totalizer, a cross totalizer operating means, a shaft for operating both of said operating means, means whereby any one of said totalizers may be actuated simultaneously with the cross totalizer, a continuously operating power shaft, means operatively related to the power shaft for imparting a variable movement to the first said shaft, a normally inactive clutch between said power shaft and the last said means, a key for controlling the clutch for operatively connecting the power shaft with the last said means to impart motion thereto, and means also operatively related to the power shaft for shifting the totalizers and the respective totalizer operating means into operative connection when the operating means and totalizers are adjacent each other and for moving them out of operative connection to permit one to be advanced with respect to the other.

38. In a calculating machine, the combination of a series of totalizers, operating means therefor, said totalizers and operating means being movable with relation to each other whereby said operating means will be common to all of said totalizers, a cross totalizer, a cross totalizer operating means, means for actuating said totalizer operating means, means for shifting the totalizers and the respective operating means into and out of operative connection, actuating means for said shifting means, a continuously operating power shaft, a normally inactive clutch between said power shaft and the two said actuating means, and a key for controlling the clutch to connect the power shaft with both of said actuating means.

39. In a calculating machine, the combination of a series of totalizers, operating means therefor, said totalizers and operating means being movable with relation to each other whereby said operating means will be common to all of said totalizers, a cross totalizer, a cross totalizer operating means, means for actuating said totalizer operating means, means for shifting the totalizers and the respective operating means into and out of operative connection, actuating means for said shifting means, a continuously operating power shaft, a normally inactive clutch between said power shaft and the two said actuating means, a key for controlling the clutch to connect the power shaft with both of said actuating means, and means for automatically releasing the clutch.

40. In a calculating machine, the combination of a series of totalizers, operating means therefor, said totalizers and operating means being movable with relation to each other whereby said operating means will be common to all of said totalizers, a cross totalizer, a cross totalizer operating means, means for actuating said totalizer operating means, means for shifting the totalizers and the respective operating means into and out of operative connection, actuating means for said shifting means, a continuously operating power shaft, a normally inactive clutch between said power shaft and the two said actuating means, a key for controlling the clutch to connect the power shaft with both of said actuating means, and means for reversing the direction of operation of the totalizers at will.

41. In a calculating machine, the combination of a series of totalizers, operating means therefor, said totalizers and operating means being movable with relation to each other whereby said operating means will be common to all of said totalizers, a cross totalizer, a cross totalizer operating means, means for shifting the totalizers and the respective operating means into and out of operative connection, actuating means for said shifting means, a continuously operating power shaft, a series of mutilated gears operatively related to the power shaft for imparting a variable movement to the totalizers actuating means, a normally inactive clutch member for each of the gears, a key for controlling each of the clutch members whereby any one of said gears may be locked to the power shaft, and means operatively related to each of said gears for imparting motion to the other said actuating means.

42. In a computing machine, the combination with a series of totalizers, each comprising a series of computing wheels, of a totalizer operating mechanism comprising a master driving gear and a series of mutilated tens-carrying gears coöperative therewith, means for mounting said gears so as to be capable of being moved in a lateral direction relatively to the computing wheels of said totalizers, said mutilated gears being free for rotation about said mounting means, means for imparting a variable driving movement to said master gear, means for effecting a relative movement between each totalizer and said operating mechanism, when in coöperative relation therewith laterally, so as to bring selected ones of said gears and computing wheels into meshing relation during a rotation of said master gear, means for effecting a relative movement of opposite sense between said totalizer and said operating mechanism to separate said wheels from said gears after said master gear has been rotated, and means, effective after such separation has been effected, for alining any of said mutilated gears which may have been displaced in effecting a carry during the rotation of said master gear.

43. In a computing machine, the combination with a series of totalizers, each comprising a series of computing wheels, of a totalizer operating mechanism comprising a master driving gear and a series of mutilated tens-carrying gears coöperative therewith, means for mounting said gears so as to be capable of being moved in a lateral direction relatively to the computing wheels of said totalizers, said mutilated gears being free for rotation about said mounting means, means for imparting a variable driving movement to said master gear, means for effecting a relative movement between each totalizer and said operating mechanism, when in coöperative relation therewith laterally, so as to bring selected ones of said gears and computing wheels into meshing relation during a rotation of said master gear, means for effecting a relative movement of opposite sense between said totalizer and said operating mechanism to separate said wheels from said gears after said master gear has been rotated, means, effective after such separation has been effected, for alining and for holding in alined position any of said mutilated gears which may have been displaced in effecting a carry during the rotation of said master gear, and means for causing said alining means to release said gears when selected wheels of said totalizer and selected ones of said gears are again brought into meshing relation.

44. In a computing machine, the combination with a series of totalizers, each comprising a series of computing wheels, of a totalizer operating mechanism comprising a master driving gear and a series of mutilated tens-carrying gears coöperative therewith, means for mounting said gears so as to be capable of being moved in a lateral direction relatively to the computing wheels of said totalizers, said mutilated gears being free for rotation about said mounting means, means for imparting a variable driving movement to said master gear, means for reversing the direction of rotation of said driving means at will, means for effecting a relative movement between each totalizer and said operating mechanism, when in coöperative relation therewith laterally, so as to bring selected ones of said gears and computing wheels into meshing relation during a rotation of said master gear, means for effecting a relative movement of opposite sense between said totalizer and said operating mechanism to separate said wheels from said gears after said master gear has been rotated, and means, effective after such separation has been effected, for alining any of said mutilated gears which may have been displaced in effecting a carry during the rotation of said master gear.

45. In a computing machine, the combination with a series of totalizers, each comprising a series of computing wheels representative of different denominational orders, of a totalizer operating mechanism comprising a master driving gear and a series of mutilated tens-carrying gears coöperative therewith, means for mounting said gears so as to be capable of being moved in a lateral direction relatively to the computing wheels of said totalizers, said mutilated gears being free for rotation about said mounting means, means for imparting a variable driving movement to said master gear, means for effecting a relative movement between each totalizer and said operating mechanism, when in coöperative relation therewith laterally, so as to bring selected ones of said gears and computing wheels into meshing relation during a rotation of said master gear, means for effecting a relative movement of opposite sense between said totalizer and said operating mechanism to separate said wheels from said gears after said master gear has been rotated, means, effective after such separation has been effected, for alining any of said mutilated gears which may have been displaced in effecting a carry during the rotation of said master gear, and means, also effective after the separation of said wheels and gears has been effected, for effecting a denomination-selecting, advancing movement to said totalizer operating mechanism.

46. In a computing machine, the combination with a series of totalizers, each comprising a series of computing wheels, of a totalizer operating mechanism comprising a master driving gear and a series of mutilated tens-carrying gears coöperative therewith, said mutilated gears being each provided with a flat face, means for mounting said gears so as to be capable of being moved in a lateral direction relatively to the computing wheels of said totalizers, said mutilated gears being free for rotation about said mounting means, means for imparting a variable driving movement to said master gear, means for effecting a relative movement between each totalizer and said operating mechanism, when in coöperative relation therewith laterally, so as to bring selected ones of said gears and computing wheels into meshing relation during a rotation of said master gear, means for effecting a relative movement of opposite sense between said totalizer and said operating mechanism to separate said wheels from said gears after said master gear has been rotated, a member common to all of said mutilated gears, means, effective after such separation has been effected, to cause said member to engage the flat faces thereof so as to aline said gears and hold them alined when out of mesh with said computing wheels, and means for moving said member out of engagement with said mutilated gears when the next selected computing wheels and gears of said operating mechanism are brought into meshing relation.

47. In a computing machine, the combination with a series of totalizers, each comprising a series of computing wheels, of a totalizer operating mechanism comprising a master driving gear and a series of mutilated tens-carrying gears coöperative therewith, said mutilated gears being each provided with a flat face, means for mounting said gears so as to be capable of being moved in a lateral direction relatively to the computing wheels of said totalizers, said mutilated gears being free for rotation about said mounting means, means for imparting a variable driving movement to said master gear, means for effecting a relative movement between each totalizer and said operating mechanism, when in coöperative relation therewith laterally, so as to bring selected ones of said gears and computing wheels into meshing relation during a rotation of said master gear, means for effecting a relative movement of opposite sense between said totalizer and said operating mechanism to separate said wheels from said gears after said master gear has been rotated, a member common to all of said mutilated gears, means, effective after such separation has been effected, to cause said member to engage the flat faces thereof so as to aline said gears and hold them alined when out of mesh with the computing wheels, means for moving said member out of engagement with said mutilated gears when the next selected computing wheels and gears of said operating mechanism are brought into meshing relation, said means for operating said alining member comprising a shaft having a driving connection therewith and on which said member is free to slide, so as to move with other parts of said totalizer operating mechanism, and means for rocking said shaft.

48. In a calculating machine, the combination of a plurality of totalizers, a support for the totalizers, operating means for the totalizers, said totalizers and operating means being relatively movable one with respect to the other whereby said operating means will be common to all of said totalizers, means for imparting motion to the movable one, said totalizers being mounted on the support for pivotal movement with respect thereto, and means for always moving the totalizers about their pivots and away from the operating means to permit the latter to advance, and for moving the totalizer toward the operating means to be actuated thereby after the advancing movement of said operating means.

49. In a calculating machine, the combination of a plurality of totalizers, a support for the totalizers, operating means for the totalizers, said totalizers and operating means being relatively movable one with respect to the other whereby said operating means will be common to all of said totalizers, means for imparting motion to the movable one, said totalizers being mounted on the support for pivotal movement with respect thereto, means for always moving the totalizers about their pivots and away from the operating means to permit the latter to advance and for moving the totalizer toward the operating means to be actuated thereby after the advancing movement of said operating means, and means for effecting a setting of any one or more of said totalizers such as to render the same incapable of being affected by said operating means.

50. In a calculating machine, the combination of a plurality of totalizers, a support for the totalizers, a carriage, operating means for the totalizers mounted upon the carriage, said totalizers and carriage being movable one with respect to the other whereby the said operating mechanism will be common to all of said totalizers, said operating means comprising operating gears, said totalizers comprising number wheels and associated operating gears and being mounted upon the support for pivotal movement toward and away from the carriage, means for moving the totalizers about their pivot toward the carriage to move the respective gears in mesh and away from the carriage to move the gears out of mesh to permit the carriage to advance, and means for locking the gears on the carriage against operation when the totalizer gears are out of engagement therewith.

51. In a calculating machine, the combination of a plurality of totalizers, a support for the totalizers, a carriage, operating means for the totalizers mounted upon the carriage, said totalizers and carriage being movable one with respect to the other whereby the said operating mechanism will be common to all of said totalizers, said operating means comprising a complete operating gear and a plurality of mutilated gears associated therewith, said totalizers comprising number wheels and associated operating gears individual thereto, and being movable about their pivots toward the carriage to cause the gears to mesh and away from the carriage to move the gears out of mesh to permit the carriage to advance, and means for alining the mutilated gears and locking them when the gears are out of mesh.

52. In a calculating machine, the combination of a plurality of totalizers, a support upon which the totalizers are mounted for pivotal movement, said totalizers comprising number wheels and associated operating gears, a carriage, totalizer operating gears mounted upon and movable with the carriage, said carriage being movable with respect to the totalizers whereby the operating gears will be common to all of the totalizers, means for advancing the carriage, means for operating the gears, a rock shaft, operative connections between the rock shaft and the totalizers for moving the totalizers about their pivots into and out of operative positions with respect to the operating gears on the carriage, and means for rocking the shaft.

53. In a calculating machine, the combination of a plurality of totalizers, a support upon which the totalizers are mounted for pivotal movement, said totalizers comprising number wheels and associated operating gears, a carriage, totalizer operating gears mounted upon and movable with the carriage, said carriage being movable with respect to the totalizers whereby the operating gears will be common to all of the totalizers, means for advancing the carriage, means for operating the gears, a rock shaft, operative connections between the rock shaft and the respective totalizers for successively moving the totalizers about their pivots into and out of operative positions with respect to the operating gears on the carriage when the carriage is adjacent thereto, and means for rocking the shaft.

54. In a calculating machine, the combination of a plurality of totalizers, a support upon which the totalizers are mounted for pivotal movement, said totalizers comprising number wheels and associated operating gears, a carriage, totalizer operating gears mounted upon and movable with the carriage, said carriage being movable with respect to the totalizers whereby the operating gears will be common to all of the totalizers, means for advancing the carriage, means for operating the gears, a rock shaft, operating connections between the rock shaft and the totalizers for moving the totalizers about their pivots into and out of operative positions with respect to the operating gears on the carriage, means for rocking the shaft, means for moving any one or more of said totalizers out of position to be affected by said rock shaft, and means for also rendering said operating connections inactive.

55. In a calculating machine, the combination of a plurality of totalizers having number wheels and gears individual to the number wheels for operating the same, a support upon which the totalizers are mounted for pivotal movement, a carriage, said carriage and totalizers being movable one with respect to the other whereby the carriage will be common to all of the totalizers, means for advancing the movable one, operating gears on the carriage adapted to mesh with the gears of the respective totalizers, a cam operatively connected to each of the totalizer frames for moving the totalizers about their pivots, means for rocking the cam, a member on the carriage adapted to coöperate with the last said means for rocking the respective cams when the carriage is adjacent thereto, and means for imparting movement to said member.

56. In a calculating machine, the combination of a plurality of totalizers, having number wheels and gears individual to the number wheels for operating the same, a support upon which the totalizers are mounted for pivotal movement, a carriage, said carriage and totalizers being movable one with respect to the other whereby the carriage will be common to all of the totalizers, means for advancing the movable one, operating gears on the carriage adapted to mesh with the gears of the respective totalizers, a cam operatively connected to each of the totalizer frames for moving the totalizers about their pivots, means for rocking the cam, a member on the carriage adapted to coöperate with the last said means for rocking the respective cams when the carriage is adjacent thereto, means for imparting movement to said member, and means for effecting a setting of said cam rocking means such as to render the same ineffective.

57. In a calculating machine, the combination of a plurality of totalizers having number wheels and gears individual to the number wheels for operating the same, a support upon which the totalizers are mounted for pivotal movement, a cam operatively connected to each of the totalizer frames for moving the totalizers about their pivots, a gear operatively connected to the cam, a second gear meshing with the first gear, operating means for the totalizers, said totalizers and operating means being movable one with respect to the other whereby said operating means will be common to all of said totalizers, and means for advancing the movable one, actuating means adapted to engage the said second gear of the respective totalizers when the operating means is adjacent thereto for operating the gears and cam to move the totalizer operating means into and out of mesh with the said operating gears, and means for imparting motion to said actuating means.

58. In a calculating machine, the combination of a pluralty of totalizers having number wheels and gears individual to the number wheels for operating the same, a support upon which the totalizers are mounted for pivotal movement, a cam operatively connected to each of the totalizer frames for moving the totalizers about their pivots, a gear operatively connected to the cam, a second gear meshing with the first gear, operating means for the totalizers, said totalizers and operating means being movable one with respect to the other whereby said operating means will be common to all of said totalizers, and means for advancing the movable one, actuating means adapted to engage the said second gear of the respective totalizers when the operating means is adjacent thereto for operating the gears and cam to move the totalizer operating means into and out of mesh with the said operating gears, means for imparting motion to said actuating means, and means whereby the gears for moving the totalizers about their pivots may be thrown out of mesh.

59. In a calculating machine, the combination of a plurality of totalizers having number wheels and gears individual to the number wheels for operating the same, a support upon which the totalizers are mounted for pivotal movement, a cam operatively connected to each of the totalizer frames for moving the totalizers about their pivots, a gear operatively connected to the cam, a second gear meshing with the first gear, operating means for the totalizers, said totalizers and operating means being movable one with respect to the other whereby said operating means will be common to all of said totalizers, means for advancing the movable one, actuating means adapted to engage the said second gear of the respective totalizers when the operating means is adjacent thereto for operating the gears and cam to move the totalizer operating means into and out of mesh with the said operating gears, and means for imparting motion to said actuating means, one of said gears being movable longitudinally with respect to the other to move the gears out of mesh, and the other of said gears being rotatable, when thus caused to be out of mesh to an ineffective position relative to said actuating means.

60. In a calculating machine, the combination of a plurality of pivotally mounted totalizers, operating means for the totalizers, said operating means and totalizers being movable one with respect to the other whereby the operating means will be common to all of the totalizers, means for advancing the movable one, means for automatically shifting the respective totalizers about their pivots into and out of connection with the operating means as the latter is adjacent the totalizer and means for rendering any one or more of the totalizers inactive with respect to the said shifting means.

61. In a calculating machine, the combination of a plurality of pivotally mounted totalizers, operating means for the totalizers, said operating means and totalizers being movable one with respect to the other whereby the operating means will be common to all of the totalizers, means for advancing the movable one, means for automatically shifting the respective totalizers about their pivots at the computation of each digit into and out of connection with the operating means as the latter is adjacent the totalizer, and means under the control of the operator and individual to each of the totalizers for shifting any one or more of the totalizers out of operative position with respect to the first said shifting means.

62. In a calculating machine, the combination of a plurality of pivotally mounted totalizers, operating means for the totalizers, said operating means and totalizers being movable one with respect to the other whereby the operating means will be common to all of the totalizers, means for advancing the movable one, means for shifting the respective totalizers about their pivots into and out of connection with the operating means as the latter is adjacent the totalizers, printing mechanism, keys for controlling the printing mechanism, and operative connections between the printing mechanism and the totalizer operating means.

63. In a calculating machine, the combination of a plurality of pivotally mounted totalizers, operating means for the totalizers, including a set of carry-over devices, said operating means and totalizers being movable one with respect to the other whereby the operating means will be common to all of the totalizers, means for advancing the movable one, means for shifting the respective totalizers about their pivots into and out of connection with the operating means as the latter is adjacent the totalizers, printing mechanism, keys for controlling the printing mechanism, operative connections between the printing mechanism and the totalizer operating means, and means for returning the carry-over devices to normal positions when the totalizers are moved out of connection therewith.

64. In a calculating machine, the combination of a series of totalizers, operating means therefor, said totalizers and operating means being movable one with respect to the other whereby the operating means will be common to all of the totalizers, a cross totalizer, a cross totalizer operating means, means whereby any one of the series of totalizers may be actuated simultaneously with the cross totalizer, a grand totalizer, means whereby the grand totalizers may be actuated simultaneously with and independently of the cross totalizer, means for actuating all of said totalizer operating means, a typewriter including a platen, and printing mechanism, operative connections between the printing mechanism and the said actuating means for imparting a variable movement to the totalizer operating means, and means for spacing the platen longitudinally and circumferentially in either direction and at will.

65. In a calculating machine, the combination of a series of totalizers, operating means therefor, said totalizers and operating means being movable one with respect to the other whereby the operating means will be common to all of the totalizers, a cross totalizer, a cross totalizer operating means, means whereby any one of the series of totalizers may be actuated simultaneously with the cross totalizer, a grand totalizer, means whereby the grand totalizers may be actuated simultaneously with and independently of the cross totalizer, means for actuating all of said totalizer operating means, a typewriter including a platen, and printing mechanism, operative connections between the printing mechanism and the said actuating means for imparting a variable movement to the totalizer operating means, and means for spacing the platen longitudinally and circumferentially in either direction at will and for any desired distance.

66. In a calculating machine, the combination of a series of totalizers, operating means therefor, said totalizers and operating means being movable one with respect to the other whereby the operating means will be common to all of the totalizers, a cross totalizer, a cross totalizer operating means, means whereby any one of the series of totalizers may be actuated simultaneously with the cross totalizers, a grand totalizer, means whereby the grand totalizers may be actuated simultaneously with and independently of the cross totalizer, means for actuating all of said totalizer operating means, a typewriter including a platen, and printing mechanism, operative connections between the printing mechanism and the said actuating means for imparting a variable movement to the totalizer operating means, means for spacing the platen longitudinally and circumferentially in either direction at will, and means for reversing the direction of operation of the totalizer operating means at will.

67. In a calculating machine, the combination of a power shaft, a series of totalizers, operating means for the totalizers, said totalizers and operating means being movable one with respect to the other whereby the operating means will be common to all of the totalizers, advancing means for the movable one, an actuating shaft for the totalizer operating means, operative connections between said actuating shaft and said power shaft, a normally inactive clutch between said connection and the power shaft, a key for controlling said connection, a shaft for operating the said advancing means, a normally inactive clutch between the last said shaft and the power shaft, and a key for controlling the last said clutch.

68. In a calculating machine, the combination of a power shaft, a series of totalizers, operating means for the totalizers, said totalizers and operating means being movable one with respect to the other whereby the operating means will be common to all of the totalizers, advancing means for the movable one, an actuating shaft for the totalizer operating means, operative connections between said actuating shaft and said power shaft, a normally inactive clutch between said connection and the power shaft, a key for controlling said connection, a shaft for operating the said advancing means, means for imparting a variable movement to the said advancing means, a normally inactive clutch between the last said shaft and the power shaft, and a key for controlling the last said clutch.

69. In a calculating machine, the combination of a power shaft, a series of totalizers, operating means for the totalizers, said totalizers and operating means being movable one with respect to the other whereby the operating means will be common to all of the totalizers, advancing means for the movable one, an actuating shaft for the totalizer operating means, operative connections between said actuating shaft and said power shaft, a normally inactive clutch between said connection and the power shaft, a key for controlling said connection, a shaft for operating the said advancing means, a normally inactive clutch between the last said shaft and the power shaft, a key for controlling the last said clutch, and means for imparting a variable movement to the totalizer actuating shaft.

70. In a calculating machine, the combination of a power shaft, a series of totalizers operating means for the totalizers, said totalizers and operating means being movable one with respect to the other whereby the means will be common to all of the totalizers, advancing means for the movable one, an actuating shaft for the totalizer operating means, operative connections between said actuating shaft and said power shaft, a normally inactive clutch between said connection and the power shaft, a key for controlling said connection, a shaft for operating the said advancing means, means for controlling the direction of movement of said advancing means, a normally inactive clutch between the last said shaft and the power shaft and a key for controlling the last said clutch.

71. In a calculating machine, the combination of a power shaft, a series of totalizers, operating means for the totalizers, said totalizers and operating means being movable one with respect to the other whereby the operating means will be common to all of the totalizers, advancing means for the movable one, an actuating shaft for the totalizer operating means, operative connections between said actuating shaft and said power shaft, a normally inactive clutch between said connection and the power shaft, a key for controlling said connection, a shaft for operating the said advancing means, a normally inactive clutch between the last said shaft and the power shaft, a key for controlling the last said clutch, means for imparting a variable movement to the totalizer actuating shaft, and means for reversing the direction of operation of said shaft at will.

72. In a calculating machine, the combination of a power shaft, a series of totalizers, operating means for the totalizers, said totalizers and operating means being movable one with respect to the other whereby the operating means will be common to all of the totalizers, advancing means for the movable one, an actuating shaft for the totalizer operating means, operative connections between said actuating shaft and said power shaft, a normally inactive clutch between said connection and the power shaft, a key for controlling said connection, a shaft for operating the said advancing means, a normally inactive clutch between the last said shaft and the power shaft, a key for controlling the last said clutch, and means for locking the said actuating shaft and the operating shaft against overthrow.

73. In a calculating machine, the combination of a plurality of totalizers, operating means therefor, said totalizers and operating means being movable one toward and away from the other into and out of operative connection, a sectional shaft, a loose connection between the shaft sections, means operatively connected to one of the shaft sections for moving the movable one of the totalizers and operating means, means for rocking said shaft section to move the other section in the same direction, means for holding said other section against return movement, and means operatively related to said other section for controlling the totalizers operating means.

74. In a calculating machine, the combination of a plurality of totalizers, operating means therefor, said operating means embodying a plurality of mutilated gears, means for imparting movement to said gears, said totalizers and operating means being movable one toward and away from the other into and out of operative connection, a sectional shaft, means operatively related to one of the sections for moving the movable one of the totalizers and operating means, means operatively related to the other section of the shaft for engaging and truing the said mutilated gears with respect to each other when the totalizer and operating means are disconnected, means for rocking one of the sections of the shaft, and an operative connection between the shaft sections whereby said sections will move simultaneously in one direction and independently of each other in the opposite directions.

75. In a calculating machine, the combination of a plurality of totalizers, operating means therefor, said operating means embodying a plurality of mutilated gears, means for imparting movement to said gears, said totalizers and operating means being movable one toward and away from the other into and out of operative connection, a sectional shaft, means operatively related to one of the sections for moving the movable one of the totalizers and operating means, means operatively related to the other section of the shaft for engaging and truing the said mutilated gears with respect to each other when the totalizer and operating means are disconnected, means for rocking one of the sections of the shaft, an operative connection between the shaft sections whereby said sections will move simultaneously in one direction, means for returning the shaft sections, and means for holding the other section against return movement to permit the other section to return in advance thereof.

76. In a calculating machine, the combination of a plurality of totalizers, operating means therefor, said totalizers and operating means being movable one toward and away from the other into and out of operative connection, said operating means embodying a plurality of mutilated gears, a sectional shaft, means operatively related to one of the shaft sections for moving the movable one of the totalizers and operating means, means operatively related to the other shaft section and adapted to engage and true the mutilated gears when the latter are disconnected from the totalizers, means for connecting the shaft sections for simultaneous movement in one direction and for independent movement in the opposite direction, a power shaft, a connection between the power shaft and one of the sections of the said sectional shaft, and means for controlling the last said connection.

77. In a calculating machine, the combination of a plurality of totalizers, operating means therefor, said totalizers and operating means being movable one toward and away from the other into and out of operative connection, said operating means embodying a plurality of mutilated gears, a sectional shaft, means operatively related to one of the shaft sections for moving the movable one of the totalizers and operating means, means operatively related to the other shaft section and adapted to engage and true the mutilated gears when the latter are disconnected from the totalizers, means for connecting the shaft sections for simultaneous movement in one direction and for independent movement in the opposite direction, a power shaft, operating means connected to one of the shaft sections, a normally inactive clutch connecting the last said operating means with the power shaft, and keys for controlling the said clutch.

78. In a calculating machine, the combination of a plurality of totalizers, operating means therefor, said totalizers and operating means being movable one toward and away from the other into and out of operative connection, said operating means embodying a plurality of mutilated gears, a sectional shaft, means operatively related to one of the shaft sections for moving the movable one of the totalizers and operating means, means operatively related to the other shaft section and adapted to engage and true the mutilated gears when the latter are disconnected from the totalizers, means for connecting the shaft sections for simultaneous movement in one direction and for dependent movement in the opposite direction, a power shaft, operating means connected to one of the shaft sections, a normally inactive clutch connecting the last said operating means with the power shaft, keys for rendering the clutch active, and means for locking the remaining keys against operation when one of the keys is operated.

79. In a calculating machine, the combination of a plurality of totalizers, operating means therefor, said totalizers and operating means being movable one toward and away from the other into and out of operative connection, said operating means embodying a plurality of mutilated gears, a sectional shaft, means operatively related to one of the shaft sections for moving the movable one of the totalizers and operating means, means operatively related to the other shaft section and adapted to engage and true the mutilated gears when the latter are disconnected from the totalizers, means for connecting the shaft sections for simultaneous movement in one direction and for independent movement in the opposite direction, a power shaft, operating means connected to one of the shaft sections, a normally inactive clutch connecting the last said operating means with the power shaft, keys for rendering the clutch active, means for locking the remaining keys against operation when one of the keys is operated, and means for automatically returning the operated key.

80. In a calculating machine, the combination of a plurality of totalizers, operating means therefor, said totalizers and operating means being movable one toward and away from the other into and out of operative connection, said operating means embodying a plurality of mutilated gears, a sectional shaft, means operatively related to one of the shaft sections for moving the movable one of the totalizers and operating means, means operatively related to the other shaft section and adapted to engage and true the mutilated gears when the latter are disconnected from the totalizers, means for connecting the shaft sections for simultaneous movement in one direction and for independent movement in the opposite direction, a power shaft, operating means connected to one of the shaft sections, a normally inactive clutch connecting the last said operating means with the power shaft, keys for rendering the clutch active, means for locking the remaining keys against operation when one of the keys is operated, and means operatively related to the power shaft for automatically returning the operated key.

81. In a calculating machine, the combination of a plurality of totalizers, operating means therefor, said totalizers and operating means being movable one toward and away from the other into and out of operative connection, said operating means embodying a plurality of mutilated gears, means movable into engagement with the mutilated gears for truing the gears when the latter are disconnected from the totalizers and movable out of engagement therewith when the gears are in connection with the totalizers, a sectional shaft, means operatively connected with one of the shaft sections for moving the movable one of the totalizers and operating means, means operatively connected with the other section of the shaft for moving the said truing means into and out of engagement with the mutilated gears, means connecting the shaft, a power shaft, and means operatively connecting the power shaft and one of the sections of the said sectional shaft.

82. In a calculating machine, the combination of a plurality of totalizers, operating means therefor, said totalizers and operating means being movable one toward and away from the other into and out of operative connection, said operating means embodying a plurality of mutilated gears, means movable into engagement with the mutilated gears for truing the gears when the latter are disconnected from the totalizers and movable out of engagement therewith when the gears are in connection with the totalizers, a sectional shaft, means operatively connected with one of the shaft sections for moving the movable one of the totalizers and operating means, means operatively connected with the other sections of the shaft for moving the said truing means into and out of engagement with the mutilated gears, means connecting the shaft sections, a power shaft, means operatively connecting the power shaft and one of the sections of the said sectional shaft, keys for controlling said connecting means, and printing mechanism also controlled by the keys.

83. In a calculating machine, the combination of a plurality of totalizers, operating means therefor, said totalizers and operating means being movable one toward and away from the other into and out of operative connection, said operating means embodying a plurality of mutilated gears, means movable into engagement with the mutilated gears for truing the gears when the latter are disconnected from the totalizers and movable out of engagement therewith when the gears are in connection with the totalizers, a sectional shaft, means operatively connected with one of the shaft sections for moving the movable one of the totalizers and operating means, means operatively connected with the other section of the shaft for moving the said truing means into and out of engagement with the mutilated gears, means connecting the shaft sections, a power shaft, means operatively connecting the power shaft and one of the sections of the said sectional shaft, keys for controlling said connecting means, printing mechanism also controlled by the keys, and means for reversing the direction of operation of the totalizer operating means at will.

84. In a calculating machine, the combination of a plurality of totalizers, operating means therefor, said totalizers and operating means being movable one toward and away from the other into and out of operative connection, said operating means embodying a plurality of mutilated gears, means movable into engagement with the mutilated gears for truing the gears when the latter are disconnected from the totalizers, and movable out of engagement therewith when the gears are in connection with the totalizers, a sectional shaft, means operatively connected with one of the shaft sections for moving the movable one of the totalizers and operating means, means operatively connected with the other section of the shaft for moving the said truing means into and out of engagement with the mutilated gears, means connecting the shaft sections for simultaneous movement in one direction and permitting independent movement in the opposite direction, a power shaft, means operatively connecting the power shaft and one of the sections of the shaft for moving both sections simultaneously in one direction and means also operatively related to the power shaft and the other section of the said sectional shaft to retard the return movement of said section and permit the other section to return in advance thereof.

85. In a calculating machine, the combination of a plurality of totalizers, operating means therefor, said totalizers and operating means being movable one toward and away from the other into and out of operative connection, said operating means embodying a plurality of mutilated gears, means movable into engagement with the mutilated gears for truing the gears when the latter are disconnected from the totalizers, and movable out of engagement therewith when the gears are in connection with the totalizers, a sectional shaft, means operatively connected with one of the shaft sections for moving the movable one of the totalizers and operating means, means operatively connected with the other section of the shaft for moving the said truing means into and out of engagement with the mutilated gears, means connecting the shaft sections for simultaneous movement in one direction and permitting independent movement in the opposite direction, a power shaft, means operatively connecting the power shaft and one of the sections of the shaft for moving both sections simultaneously in one direction, means also operatively related to the power shaft and the other section of the said sectional shaft to retard the return movement of said section and permit the other section to return in advance thereof, and separate means for returning the shaft sections.

86. In a calculating machine, the combination of a plurality of totalizers, operating means therefor, said totalizers and operating means being movable one toward and away from the other into and out of operative connection, said operating means embodying a plurality of mutilated gears, means movable into engagement with the mutilated gears for truing the gears when the latter are disconnected from the totalizers, and movable out of engagement therewith when the gears are in connection with the totalizers, a sectional shaft, means operatively connected with one of the shaft sections for moving the movable one of the totalizers and operating means, means operatively connected with the other section of the shaft for moving the said truing means into and out of engagement with the mutilated gears, means connecting the shaft sections for simultaneous movement in one direction and permitting independent movement in the opposite direction, a power shaft, means operatively connecting the power shaft and one of the sections of the shaft for moving both sections simultaneously in one direction, means operatively related to the power shaft and the other section of the shaft for retarding the return movement of said section, means also operatively related to the power shaft for positively returning the first said section in advance of the said other section, and means for returning the said other section.

87. In a calculating machine, the combination of a plurality of totalizers, operating means therefor, said totalizers and operating means movable one toward and away from the other into and out of operative connection, said operating means embodying a plurality of mutilated gears, means movable into and out of engagement with the mutilated gears for truing said mutilated gears when the latter are disconnected from the totalizers and movable into engagement therewith when the gears are disconnected from the totalizer, and movable out of engagement with the gears when the latter are connected with the totalizers, means for advancing said totalizers and operating means one with respect to the other whereby said operating means will be common to all of said totalizers, a sectional rock shaft, means operatively connected with one section of the shaft for moving the said movable one of the totalizers and totalizers operating means, means operatively connected with the other section of the shaft for moving the said truing means, means for causing both of the shaft sections to move simultaneously in one direction, means for returning the shaft section, and means permitting one of the shaft sections to return in advance of the other section.

88. In a calculating machine, the combination of a plurality of totalizers, operating means therefor, said totalizers and operating means movable one toward and away from the other into and out of operative connection, said operating means embodying a plurality of mutilated gears, means movable into and out of engagement with the mutilated gears for truing said mutilated gears when the latter are disconnected from the totalizers and movable into engagement therewith when the gears are disconnected from the totalizer, and movable out of engagement with the gears when the latter are connected with the totalizers, means for advancing said totalizers and operating means one with respect to the other whereby said operating means will be common to all of said totalizers, a sectional rock shaft, means operatively connected with one section of the shaft for moving the said movable one of the totalizers and totalizers operating means, means operatively connected with the other section of the shaft for moving the said truing means, there being projections on the adjacent ends of the shaft sections adapted to engage to cause the sections to move simultaneously in one direction and to permit independent movements in the opposite directions, means for returning said shaft sections, and means for retarding the return movement of one of the shaft sections to permit the other section to return in advance thereof.

89. In a calculating machine, the combination of a plurality of totalizers, operating means therefor, said totalizers and operating means movable one toward and away from the other into and out of operative connection, said operating means embodying a plurality of mutilated gears, means movable into and out of engagement with the mutilated gears for truing said mutilated gears when the latter are disconnected from the totalizers and movable into engagement therewith when the gears and disconnected from the totalizer, and movable out of engagement with the gears when the latter are connected with the totalizers, means for advancing said totalizers and operating means one with respect to the other whereby said operating means will be common to all of said totalizers, a sectional rock shaft, means operatively connected with one section of the shaft for moving the said movable one of the totalizers and totalizers operating means, a power shaft, a connection between the power shaft and one of the sections of the said sectional shaft, said connection embodying a normally inactive clutch, a key for controlling said clutch, means operatively connected with the other section of the shaft for moving the said truing means, means for causing both of the shaft sections to move simultaneously in one direction, means for returning the shaft sections, and means permitting one of the shaft sections to return in advance of the other section.

90. In a calculating machine, the combination of registering mechanism, printing mechanism, spacing mechanism for the printing mechanism, a power device, means for establishing operative connection between the power device and all of said mechanisms, keys for controlling all of said mechanisms, and a key separate from the first said keys for controlling the said spacing mechanism only.

91. In a calculating machine, the combination of registering mechanism, printing mechanism, spacing mechanism for the printing mechanism, a power device, means for establishing operative connection between the power device and all of said mechanisms, keys for controlling all of said mechanisms, a key separate from the first said keys for controlling the said spacing mechanism only, and a second series of keys separate from the first said keys for controlling the said spacing mechanism only and for imparting a variable movement to the spacing mechanism.

92. In a calculating machine, the combination of registering mechanism, printing mechanism, spacing mechanism for the printing mechanism, a power device, means for establishing operative connection between the power device and all of said mechanisms, keys for controlling all of said mechanisms, a key separate from the first said keys for controlling the said spacing mechanism only, and a plurality of series of keys separate from the first said keys for controlling the said spacing mechanism only, said second series of keys being separate from each other, one of the last said series being adapted to control the movement of said spacing mechanism in one direction and the other series being adapted to control the movement thereof in the opposite direction.

93. In a calculating machine, the combination of registering mechanism, printing mechanism, spacing mechanism for the printing mechanism, a continuously operating power device, a normally inactive connection between said power device and said mechanisms, a key for setting said connection for operation and for controlling all of said mechanisms, and means separate from said key for setting said connection for operation and for controlling said spacing mechanism only.

94. In a computing machine, in combination, printing mechanism, including mechanism for spacing the relative parts thereof, computing mechanism, including actuating mechanism and denomination-selecting spacing mechanism therefor, a motor, a normally ineffective driving connection between said motor and said spacing mechanisms, a set of keys, means controlled by each of said keys for effecting an actuation of said printing mechanism and the actuating mechanism of said computing mechanism, and for also causing said driving connection to be rendered effective, so as to effect a spacing of parts of said printing and computing mechanisms, means independent of said keys for rendering said driving connection effective, so as to effect a spacing movement of predetermined extent independently of the operation of said printing and actuating mechanisms, a second normally ineffective driving connection between said motor and said spacing mechanisms, and means, also independent of said printing and actuating mechanisms, for rendering the last-mentioned driving connection effective to effect a movement of said spacing mechanisms of any desired extent.

95. In a calculating machine, the combination of registering mechanism, printing mechanism, spacing mechanism for the printing and registering mechanism, a power device, keys for controlling said printing and registering mechanisms, an operative connection between the power device and all of said mechanisms and controlled by said keys, and means for throwing said spacing mechanism out of operation.

96. In a calculating machine, the combination of registering mechanism, printing mechanism, spacing mechanism for the printing and registering mechanism, a power device, keys for controlling said printing and registering mechanisms, a normally inactive connection between the power device and the said mechanisms, means whereby said connection may be controlled by any of said keys, means whereby the operation of any of said keys will lock the other keys against operation, and means operatively connected to the power device for restoring the operated key.

97. In a calculating machine, the combination of registering and printing mechanism, a continuously operated power shaft, operative connections between said shaft and said mechanisms, spacing mechanism for the printing mechanism and the registering mechanism, said spacing means including operating shafts for actuating the spacing means in either direction, operative connections between the power shaft and the registering and printing mechanisms and between said power shaft and the spacing means operating shafts, keys for controlling said printing, registering and spacing means, and keys separate from the first said keys for controlling the spacing means only.

98. In a calculating machine, the combination of registering and printing mechanism, a continuously operated power shaft, operative connections between said shaft and said mechanisms, spacing mechanism for the printing mechanism and the registering mechanism, said spacing means including operating shafts for actuating the spacing means in either direction, operative connections between the power shaft and the registering and printing mechanisms and between said power shaft and the spacing means operating shafts, keys for controlling said printing, registering and spacing means, keys separate from the first said keys for controlling the spacing means only, and a series of keys separate from the first said keys for the connections between each of the spacing means operating shafts and the power shaft for controlling the spacing mechanism only, each of the series of the last said keys being adapted to control the operation of the spacing means in one direction.

99. In a calculating machine, the combination of a plurality of totalizers, operating means therefor, said totalizers and operating means being movable one toward and away from the other into and out of operative connection, a sectional shaft, a loose connection between the sections, means operatively connected to one of the shaft sections for moving the movable one of the totalizers and operating means, an arm operatively connected to said section, a power shaft, a cam operatively connected to the power shaft, and adapted to engage and move the arm to rock the shaft sections together in one direction, a second cam operatively connected to the power shaft, an arm operatively connected to the other section of the sectional shaft and coöperating with the cam to retard the return movement of said shaft section to permit the first said section to return in advance thereof, and means operatively related to said other shaft section to control the totalizers operating means.

100. In a calculating machine, the combination of a plurality of totalizers, operating means therefor, said totalizers and operating means being movable one toward and away from the other into and out of operative connection, a sectional shaft, a loose connection between the sections, means operatively connected to one of the shaft sections for moving the movable one of the totalizers and operating means, an arm operatively connected to said section, a power shaft, a cam operatively connected to the power shaft and adapted to engage and move the arm to rock the shaft sections together in one direction, a second cam operatively connected to the power shaft, an arm operatively connected to the other section of the sectional shaft and coöperating with the cam to retard the return movement of said shaft section to permit the first said section to return in advance thereof, means operatively related to said other shaft section to control the totalizers operating means, a normally inactive connection between the power shaft and each of the said cams, and means for controlling said connection.

101. In a calculating machine, the combination of a plurality of totalizers, operating means therefor, said totalizers and operating means being movable one toward and away from the other into and out of operative connection, a sectional shaft, a loose connection between the sections, means operatively connected to one of the shaft sections for moving the movable one of the totalizers and operating means, an arm operatively connected to said section, a power shaft, a cam operatively connected to the power shaft and adapted to engage and move the arm to rock the shaft sections together in one direction, a second cam operatively connected to the power shaft, an arm operatively connected to the other section of the sectional shaft and coöperating with the cam to retard the return movement of said shaft section to permit the first said section to return in advance thereof, means operatively related to said other shaft section to control the totalizers operating means, a normally inactive connection between the power shaft and each of the said cams, a key for simultaneously controlling both of the connections, and a separate key for controlling one of the said connections only.

102. In a typewriting and calculating machine, the combination of a typewriter carriage, a series of totalizers, means for operating said totalizers, said operating means being movable with respect to the totalizers whereby the operating means will be common to all of said totalizers, means independent of said carriage for moving the operating means successively to the totalizers of the set, a cross totalizer, a cross totalizer operating means, means also independent of said carriage whereby the second said operating means will be intermittently advanced by the movement of the first said operating means, means for releasing the cross totalizer operating means with respect to the first said operating means when the latter has advanced the distance of one complete totalizer, to permit the operating means of the said series of totalizers to advance to another totalizer, and means for returning the cross totalizer operating means to a position to be again advanced by first said operating means.

103. In a calculating machine, the combination of a series of totalizers, means for operating said totalizers, said operating means being movable with respect to the totalizers whereby the operating means will be common to all of said totalizers, means for moving the operating means successively to the totalizers of the set, a cross totalizer, a cross totalizer operating means, means operatively related to both of said totalizers, operating means whereby the second said operating means will be intermittently advanced by the movement of the first said operating means, means for releasing the cross totalizer operating means with respect to the first said operating means when the latter has advanced the distance of one complete totalizer to permit the operating means of the said series of totalizers to advance to another totalizer, means for returning the cross totalizer operating means to a position to be again advanced by the first said operating means, and means for effecting a setting of the cross totalizer operating means such that it will not be advanced by the first said operating means.

104. In a calculating machine, the combination of a series of totalizers, means for operating said totalizers, said means being movable with respect to the totalizers whereby the operating means will be common to all of said totalizers, means for moving said operating means successively to the totalizers, a cross totalizer, a cross totalizer operating means, inter-engaging means on said totalizers operating means whereby the advancing movement of the first said operating means will advance the cross totalizer operating means, one of said inter-engaging means being movable with respect to its support whereby it may be moved out of operative position with respect to the other said means to permit the first said totalizer operating means to be advanced independently, means for moving said shiftable means to release the cross totalizer operating means when the latter has advanced the entire distance of the cross totalizer, means for returning the released operating means to be again advanced, and additional means for moving said shiftable means and holding the same out of operative position.

105. In a calculating machine, the combination of a totalizer having a series of number bearing members corresponding to different arithmetical orders, a gear wheel on each of the members, a gear meshing with each of the first said gears, a ratchet member secured to each of the second said gears, retaining members coöperating with each of the ratchet members, a gear meshing with each of the second said gears, a one-tooth carrying member on each of the last said gears, and means for operating the last said gears for shifting the respective number bearing members.

106. In a calculating machine, the combination of a totalizer having a series of number bearing members corresponding to different arithmetical orders, a gear wheel on each of the members, a gear meshing with each of said gears, a third set of gears meshing with the second set of gears, a one-tooth member on each of the gears of the last said set, and means adapted to be advanced to and to engage the gears of the last said set and to overlap and engage the respective one-tooth members for operating the said number bearing members.

107. In a calculating machine, the combination of a plurality of totalizers embodying a set of gears for imparting rotation to the digit bearing members thereof, a second set of gears for operating the first set of gears, said second set of gears being movable axially to come into operative relation to said totalizers successively, means for moving the gears of one set in a direction transverse to their axes after the operative relation between the totalizers and the second set of gears changes from one totalizer to another, and means for rotating gears in the second set while disengaged from the gears in the first set.

108. In a calculating machine, the combination of a plurality of totalizers each embodying a set of gears for imparting rotation to the digit bearing members thereof, a second set of gears for operating said gears of all of said totalizers successively and including carry-over gears, means for causing one of said sets of gears to move bodily whereby operative relation between the totalizers and the second said set of gears is changed from one of the totalizers to another one, means for first unmeshing and then bringing the second said set of gears and said totalizer gears into mesh in a direction transverse to their axes, and means for turning the carry-over gears when unmeshed.

109. In a calculating machine, the combination of a plurality of totalizers, each embodying a set of gears for imparting rotation to the digit bearing members thereof, a second set of gears for operating said gears of all of said totalizers successively, said second set including carry-over gears, means for causing one of said sets of gears to move bodily whereby the operative relation between the totalizers and the second said set of gears is changed from one of the totalizers to another one, means for bringing the gears of the totalizers and of the second said set of gears into mesh in a direction transverse to their axes after said change has been effected, and means for turning the carry-over gears of the second said set back to normal positions after disengagement with one set of said totalizer gears and before engagement with another set thereof is effected.

110. In a calculating machine, the combination of a plurality of totalizers each embodying a set of gears for imparting rotation to the digit bearing members thereof, a second set of gears for imparting rotation to the first said gears, the second set including carry-over gears and being movable bodily and adapted to be positioned for operating the gears of the totalizers successively, means for throwing the totalizer gears into and out of mesh with the gears of said second set in a direction transverse to their axes, and means for automatically turning the carry-over gears when unmeshed.

111. In a calculating machine, the combination of a plurality of totalizers each embodying a set of gears for imparting rotation to the digit bearing members thereof, a second set of gears for rotating said first gears, the second set including carry-over gears and being movable bodily into operative relation to said totalizers, means for thus moving the said second set of gears, means operatively connected with the first said means for throwing the gears of the totalizers and of the second said set of gears out of mesh in a direction transverse to their axes, and means for automatically turning the carry-over gears when unmeshed.

112. In a calculating machine, the combination of a plurality of totalizers, each embodying a set of gears for imparting rotation to the digit bearing members thereof, a second set of gears for rotating said gears of the totalizers, means for imparting bodily motion to one set of said gears whereby operative relation may be established between any one of said totalizers and the second said set of gears, and means operatively connected with the first said means for causing one set of said gears to move transversely of their axes whereby disengaged and intermeshed relations between the totalizer gears and the gears of the second said set are established.

113. In a calculating machine, the combination of a plurality of totalizers each embodying a set of gears for imparting rotation to the digit bearing members thereof, a second set of gears for rotating said first gears, means for moving the second set of gears bodily in an axial direction to position the same for operating any of said totalizers, means operatively connected with the first said means for throwing the gears of the totalizers out of mesh with said second set of gears in a direction transverse to their axes when said second set of gears leaves the gears of one totalizer, and means for moving the totalizer gears in the opposite transverse direction.

114. In a calculating machine, the combination of a plurality of totalizers each embodying a set of gears for imparting rotation to the digit bearing members thereof, a second set of gears for rotating said first gears, the second set including carry-over gears, means for moving the second set of gears bodily in an axial direction to position the same for operating any of said totalizers, means operatively connected with the first said means for throwing the gears of the totalizers out of mesh with said second set of gears in a direction transverse to their axes at every computation, means for actuating the carry-over gears when unmeshed, and means for effecting a setting of said totalizer to be inactive, with said totalizer gears out of mesh with the first said set of gears.

115. The combination with numeral typekeys, a typewriter carriage controlled thereby, and a plurality of totalizers also controlled by said keys, of a main traveling actuator independent of said typewriter carriage, and a supplementary traveling actuator also independent of said carriage, said traveling actuators being arranged to actuate said totalizers, one of said traveling actuators being traversed from the other of said traveling actuators, one of said traveling actuators having a continuous step-by-step movement and the other of said traveling actuators having a vibratory movement.

116. The combination with numeral typekeys, a typewriter carriage controlled thereby, and a plurality of totalizers, of a plurality of key-controlled actuating mechanisms independent of said typewriter carriage for said totalizers, one of said actuating mechanisms being arranged to coöperate with a series of said totalizers, and another of said actuating mechanisms being arranged to coöperate solely with one of said totalizers, said actuating mechanisms being interconnectible independently of said typewriter carriage, for concomitant movement.

117. The combination with numeral typekeys a typewriter carriage controlled thereby, and a plurality of totalizers, of a plurality of key-controlled actuating mechanisms independent of said typewriter carriage for said totalizers, one of said actuating mechanisms being arranged to coöperate with a series of said totalizers, and another of said actuating mechanisms being arranged to coöperate solely with one of said totalizers, and means independent of said carriage for controlling the connection between said actuating mechanisms.

118. A computing mechanism including, in combination, a plurality of totalizers, a plurality of actuating mechanisms for said totalizers, automatic means for intermittently connecting said actuating mechanisms to work together, and means shiftable manually for controlling at will the connection of said actuating mechanisms.

119. The combination with numeral typekeys, and a typewriter carriage controlled thereby, of computing mechanism including a plurality of totalizers, a plurality of actuating mechanisms for said totalizers, means shiftable manually for connecting said actuating mechanisms to work together, and automatic means independent of said carriage, for intermittently connecting and disconnecting said actuating mechanisms.

120. The combination with a totalizer, of an actuating mechanism for said totalizer, valuating means for determining the extent of operation of said actuating mechanism, and connections between said valuating mechanism and said totalizer and effective at the computation of each digit for shifting said totalizer into and out of coöperation with said actuating mechanism.

121. The combination with a totalizer, of an actuating mechanism for said totalizer, valuating means for determining the extent of operation of said actuating mechanism, connections between said valuating mechanism and said totalizer and effective at the computation of each digit, for shifting said totalizer into coöperation with said actuating mechanism, and spacing mechanism for said actuating mechanism brought in play at the actuation of said valuating mechanism.

122. In a combined typewriting and calculating machine, the combination with typewriting mechanism including a rotatable platen, of computing mechanism including a traveling element, a common source of power, and controlling means to enable the concomitant rotary movement of said platen and traveling movement of said traveling element by connecting them both in driven relation with said common source of power.

123. In a combined typewriting and calculating machine, the combination with a typewriting mechanism including a traveling carriage and a platen rotatably mounted on said carriage, of a computing mechanism including a traveling element, a common source of power, and controlling means for enabling a concomitant traveling movement of said carriage and rotary movement of said platen with a traveling movement of said traveling element.

124. In a combined typewriting and calculating machine, the combination with a typewriting mechanism including a rotatable platen, of a computing mechanism including a traveling element, and controlling mechanism selectively enabling a movement of said traveling element with or without a concomitant rotation of said platen.

125. In a combined typewriting and calculating machine, the combination with a typewriting mechanism, of a computing mechanism, a common source of power, and controlling means for selectively enabling either an actuation of parts of said typewriting mechanism from said source of power or an actuation of parts of said computing mechanism from said source of power.

126. In a combined typewriting and calculating machine, the combination with typewriting mechanism, of computing mechanism, a shaft for said typewriting mechanism, a shaft for said computing mechanism, a common drive shaft, and selecting mechanism for connecting said common drive shaft with said first-mentioned shafts to enable the actuation of said typewriting mechanism and said computing mechanism from said common drive shaft.

127. In a combined typewriting and calculating machine, the combination with typewriting mechanism, of computing mechanism, a common drive shaft, a shaft for said typewriting mechanism, means for enabling the drive of said second-mentioned shaft, a shaft for said computing mechanism, and means for enabling the drive of said third-mentioned shaft from said second-mentioned shaft.

128. In a combined typewriting and calculating machine, the combination with typewriting mechanism including a carriage and a platen rotatably mounted on said carriage, of computing mechanism including a vibratory element, mechanism to enable step-by-step synchronized movements of said carriage and said vibratory element, and mechanism to enable a line-spacing movement of said platen with a return movement of said traveling element, whereby a vertical column of numbers can be concomitantly written on a work-sheet on said platen and computed through the intermediary of said vibratory element.

129. In a calculating machine, the combination with a set of item totalizers, each totalizer having a plurality of wheels with a plurality of sets of digits progressing in opposite directions, so that a rotation of said wheels in a single direction will increase the magnitude of the number showing, or decrease the same, according to which set of digits is used, of a cross totalizer having two sets of numbers increasing in opposite directions, a grand totalizer having two sets of numbers increasing in opposite directions, and means whereby any one of the set of said totalizers and said cross totalizer may be simultaneously operated, said means also acting to enable the amounts registered on said cross totalizer to be transferred to said grand totalizer and accumulated thereon.

130. The combination with a series of item totalizers arranged to exhibit accumulated numbers in any one of a plurality of colors, of a cross totalizer arranged to exhibit numbers in any one of a plurality of colors, a grand totalizer arranged to exhibit numbers in any one of a plurality of colors, and means for simultaneously driving a plurality of said totalizers in the same direction while exhibiting numbers in different colors, so as to perform simultaneous correct computations on all totalizers so driven.

131. In a machine of the class described, the combination with a register embodying a number-bearing member, of operating mechanism therefor including a normally rotating driving shaft and a normally ineffective driving connection between said shaft and said number-bearing member, said driving connection comprising a normally open clutch, means normally tending to close said clutch, means normally restraining said clutch-closing means, means for displacing said restraining means, so as to free said clutch-closing means, and thus permit the same to close said clutch and render the driving connection effective, and means for restoring said displaced restraining means so as to again restrain said clutch-closing means and render said connection ineffective.

132. In a machine of the class described, the combination with a register embodying a number-bearing member, of operating mechanism therefor including a normally rotating driving shaft and a normally ineffective driving connection between said shaft and said number-bearing member, said driving connection comprising a normally open clutch, means normally tending to close said clutch, means normally restraining said clutch-closing means, means for displacing said restraining means, so as to free said clutch-closing means, and thus permit the same to close said clutch and render the driving connection effective, and means operated by said driving shaft for restoring said displaced restraining means after a predetermined extent of rotation of said clutch, so as to again restrain said clutch-closing means and again render said connection ineffective.

133. In a machine of the class described, the combination with a register embodying a number-bearing member, of operating mechanism therefor including a normally rotating driving shaft and a normally ineffective driving connection between said shaft and said number-bearing member, said driving connection comprising a normally open clutch, means normally tending to close said clutch, means normally restraining said clutch-closing means, means for displacing said restraining means, so as to free said clutch-closing means, and thus permit the same to close said clutch and render the driving connection effective, means for restoring said displaced restraining means so as to again restrain said clutch-closing means and render said connection ineffective, a detent to engage one of the elements of said driving connection, and means, operated from a driven member of said clutch at the completion of the movement of said number-bearing member thereby, for driving said detent to its effective position so as to prevent overthrow, said detent being released from said driving means before the end of the rotation of said clutch, so as to be free to release said detent-engaged element upon the next drive by said clutch.

134. In a machine of the class described, the combination of a register embodying a number-bearing member, operating mechanism therefor, a connection between the member and operating mechanism embodying a clutch tending normally to close, means for normally restraining the clutch from closing, means for releasing said restraining means to render the clutch active, and means for automatically restoring the restraining means to render the clutch inactive.

135. The combination with a series of totalizers, of a master actuator common to all of the totalizers of said series, to coöperate therewith in succession, a plurality of auxiliary totalizers, a master actuator individual to each of said auxiliary totalizers, a shaft on which all of said master actuators are mounted, so as to be capable of driving them in unison, and step-by-step advancing means for successively advancing the master actuator for the series continuously along the range of said series of totalizers step by step and group after group of step-by-step movements, and for advancing in unison therewith said master actuators for the auxiliary totalizers repeatedly for the same group of step-by-step movements, so as to remain always in the range of their respective totalizers.

136. In a combined typewriting and computing machine, the combination with a typewriting mechanism including a traveling carriage and a computing mechanism including a plurality of computing units embodying one or more traveling elements, and predeterminedly set mechanism for controlling, independent of the travel of said carriage, the activity of the several computing units.

137. The combination with a totalizer including a series of computing wheels, of a master wheel for said computing wheels, said master wheel and said computing wheels being normally out of range, and means for putting said master wheel and said computing wheels into range as each of a plurality of digits of a number is to be run into said totalizer and for moving them out of range after each of said digits has been entered.

138. The combination with a totalizer having computing wheels, of a master actuator for said totalizer, means for bringing about registration between said master actuator and each of the wheels of said totalizer, and means, effective just before each of a plurality of digits of a number is to be run into said totalizer, for bringing said wheels and said master actuator within reach of each other when in register, and for moving them out of range after said digit has been entered.

139. In a computing machine, the combination with a gang of computing wheels, of a master wheel engaging them *seriatim* to turn them, numeral keys, a source of power, a shaft arranged to be driven by said source of power, a second shaft geared to said master wheel adjacent said power shaft, a gear wheel for each numeral key fast on said second shaft, a set of mutilated gears loose on said power shaft, one opposite each of said gear wheels and normally having its interrupted portion adjacent its gear wheel so said gear wheel may revolve freely and having teeth corresponding in value to its numeral key, a normally ineffective clutch for each of said interrupted gears, and means controlled by said keys for rendering the respective clutches effective.

140. In a computing machine, the combination with a gang of computing wheels, of a master wheel engaging them *seriatim* to turn them, numeral keys, a source of power, a shaft arranged to be driven by said source of power, a second shaft geared to said master wheel adjacent said power shaft, a gear wheel for each numeral key fast on said second shaft, a normally open clutch on said power shaft for each of said gear wheels, a member in each clutch fast on said power shaft, a member loose in each clutch, a mutilated gear fast on the loose member of each clutch, a member movable in each clutch to close the same, and a connection from each numeral key to its clutch to enable said movable member to hold the clutch closed for one revolution at each operation of its numeral key, the teeth in each mutilated gear corresponding in value to its numeral key.

141. In a computing machine, the combination with numeral keys and a shaft turned by power, of a mutilated gear for each key, each gear comprising teeth corresponding in value to its key, a clutch on each of said gears embracing said power shaft, a second shaft adjacent said power shaft, gears fast on said second shaft each alined with a mutilated gear, a master wheel geared to said second shaft, means for controlling each clutch from its numeral key to enable said power shaft to carry numbers represented by the keys struck into said master wheel, a gang of computing wheels, and means for causing said master wheel to engage said computing wheels *seriatim*.

142. In a combined typewriting and computing machine, the combination of a numeral key, a constantly rotating drive shaft, a normally ineffective clutch, means to enable the key to trip the clutch and thus render the same effective, a mutilated gear attached to a member of the clutch, a master member driven by the mutilated gear, and a set of computing wheels operable by the master member.

143. The combination with numeral keys, of a constantly rotating power-driven shaft, a set of mutilated gears loosely mounted thereon, computing mechanism, means controlled by said keys for coupling said shaft through said gears to said computing mechanism, and means for automatically releasing said computing mechanism at the completion of a revolution of said shaft.

144. In a combined typewriting and calculating machine, the combination with numeral type-printing keys and a carriage controlled thereby and movable to different writing zones, of a set of column-totalizing mechanisms, a cross-totalizing mechanism, means to enable said keys to control succeeding column-totalizing mechanisms in succeeding zones, and also to control said cross-totalizing mechanism in each of said zones concomitantly with the apposite column-totalizing mechanism, a grand totalizing mechanism, means including variably settable reversing mechanism for said totalizing mechanisms, and also under the control of said keys when writing in still another zone, to enable the cross-total both to be removed from said cross totalizing mechanism and also to be accumulated upon said grand totalizing mechanism, and means settable independently of the setting of said reversing mechanism for silencing the cross-totalizer at the operation of the keys to print the grand total and simultaneously control the subtraction of the same from the grand totalizer.

145. In a combined typewriting and calculating machine, the combination with numeral type-printing keys and a carriage controlled thereby, and movable to different writing zones, of a set of column-totalizing mechanisms, a cross-totalizing mechanism, means to enable said keys to control succeeding column-totalizing mechanisms in succeeding zones, and also to control said cross-totalizing mechanism in each of said zones concomitantly with the apposite column-totalizing mechanism, a grand totalizing mechanism, means, including variable settable reversing mechanism for said totalizing mechanisms, and also under the control of said keys when writing in still another zone, to enable the cross-total both to be removed from said cross totalizing mechanism and also to be accumulated upon said grand totalizing mechanism, and means, settable independently of the setting of said reversing mechanism, for rendering any of said column-totalizing mechanisms inactive, so that each of the cross and grand totalizing mechanisms may be operated reversely independently of the remaining totalizing mechanisms.

146. In a computing machine, in combination, a totalizer comprising computing wheels representative of different denominational orders, a master wheel and a set of pivotally mounted toothed tens-carrying members to operate said computing wheels, means for effecting relative step-by-step denomination - selecting movements between said computing wheels and said master wheel and tens - carrying members, means for effecting driving connections between said master wheel and one of said computing wheels, and between certain of said tens-carrying members and others of said computing wheels, as determined by each step-by-step denomination-selecting movement, so that a digit of a number may be run into said totalizer, means for effecting a disconnection of said driving connections after each digit has been entered, and means, effective after such disconnection has been effected, for returning to their normal angular positions any of said tens-carrying members which may have been displaced in effecting a carry.

147. The combination with a typewriting mechanism having a traveling carriage with a movement determining the length of a written line, of a plurality of totalizers, actuating means for said totalizers including variably settable reversing mechanism, and manual selecting means, individual to each totalizer, and settable independently of the setting of said reversing mechanism, for rendering the same effective at will at any point in the written line.

148. The combination with a typewriting mechanism having a traveling carriage with a movement determining the length of a written line, of a plurality of totalizers, actuating means for said totalizers including variably settable reversing mechanism, and means settable independently of the position and travel of said carriage and independently of the setting of said reversing mechanism, for determining at will the effective and ineffective periods of said individual totalizers.

149. The combination with a typewriting mechanism having a traveling carriage with a movement determining the length of a written line, of a plurality of totalizers, means independent of the position and travel of said carriage for determining at will the effective and ineffective periods of said individual totalizers, and means distinct from said last-mentioned means for determining the character of computation of said totalizers.

150. In a computing machine, in combination, a totalizer comprising computing wheels representative of different denominational orders, a master wheel and a set of pivotally mounted toothed tens-carrying members to operate said computing wheels, means for imparting, to said master wheel and tens-carrying members, a lateral, step-by-step, denomination-selecting movement relative to said computing wheels, means for rocking said totalizer in one direction, after each step of denomination-selecting movement, to bring the selected computing wheels into driving connection with said master wheel and selected tens-carrying members, as determined by such denomination-selecting movement, so that a digit of a number may be run into said totalizer, means for effecting a disconnection of said driving connections after each digit has been entered, by a rocking of said totalizer in the opposite direction, and means, effective after such disconnection has been effected, for returning to their normal angular positions any of said tens-carrying members which may have been displaced in effecting a carry.

151. The combination with a typewriting mechanism including a carriage, of a plurality of totalizers, members individual to the separate totalizers for determining the effective periods of said totalizers, and means independent of said members for determining the character of computation carried on by said totalizers.

152. The combination with a typewriting mechanism including a carriage, of a plurality of totalizers, members individual to the separate totalizers for determining the effective periods of said totalizers, means independent of said members for determining the character of computation carried on by said totalizers, and a key for silencing all of said totalizers.

153. The combination with a computing mechanism, of a series of keys controlling the action of said computing mechanism, and locking means for holding a depressed key in its depressed position, at the same time locking all other keys from being depressed until the computing action of said computing mechanism initiated by the depressed key has been completed.

154. In a computing machine, the combination with numeral keys, of a rock arm arranged to be operated by a numeral key, a power shaft, a normally open clutch on said power shaft, a device tending to cause said clutch to close, a member normally holding said clutch open, a connection from said rock arm to move said member to ineffective position, and a mutilated gear rotated by said clutch when closed, the number of teeth on said gear corresponding in value to the numeral key controlling it.

155. In a computing machine, the combination with numeral keys and a shaft turned by power, of a mutilated gear for each key, each gear comprising teeth corresponding in value to its key, a clutch controlled by each numeral key for causing said shaft to turn the gear for that key, and computing wheels into which numbers represented by the keys struck are carried.

156. In a computing machine, the combination with numeral keys and a shaft turned by power, of a mutilated gear for each key, each gear comprising teeth corresponding in value to its key, a clutch on each of said gears embracing said power shaft, means for controlling each clutch by its numeral key to cause it to seize said shaft, and computing wheels into which numbers represented by the keys struck are carried.

157. In a combined typewriting and computing machine, the combination with numeral keys and a traveling carriage, of a gang of computing wheels, a master wheel caused by said traveling carriage to successively engage said computing wheels, a power driven shaft, a series of mutilated gears loose on said power shaft, a clutch for each gear, a shaft adjacent said power shaft comprising gears arranged in line with said mutilated gears, gears driving said master wheel from said adjacent shaft, a rock arm for each numeral key arranged to be operated by its key to enable its clutch to lock its mutilated gear to said power shaft to drive said master wheel.

158. In a combined typewriting and computing machine, the combination with a numeral key, of a rock arm arranged to be operated by said numeral key, a power driven shaft, a clutch on said power driven shaft normally released therefrom, means operated by said rock arm at the initial portion of the stroke of said key for enabling said clutch to seize, a mutilated gear fast on said clutch comprising teeth corresponding in value to the key struck, and type caused to strike against a platen at the end of said stroke.

159. The combination of a stepped or assorted set of gears, a master wheel or member, a set of keys, means selectively operated by the keys for operatively connecting said master wheel to any of said gears, a source of power operating through said gears to drive said master wheel, means effective upon the downstrokes of the keys for disconnecting the latter from said connecting means, and means to restore the key connection upon the return of the key to normal position.

160. The combination of a master wheel, a power shaft, a set of mutilated gears loose on said shaft, a set of normally open independent clutches, one for each gear, means normally tending to close the clutches, keys, and separate trains of connections extending from said clutches to said keys to enable any key to control the closing of its clutch, so as to connect the associated gear to the power shaft, each train including a dog for restraining each clutch, said dog movable by the connected key to release said restraining means.

161. The combination with a series of numeral keys, of a series of valuating devices normally inactive but having a driving capacity corresponding to their accordant keys, each numeral key normally having dominance over its corresponding valuating device so as to be capable of bringing the same into play at the actuation of the corresponding key, and connections between each numeral key and its valuating device acting to bring the same in play on the striking of the key and causing the key to lose control over its valuating device during further motion of the key, while automatically reassuming control over same after such actuated key has returned to its normal position.

162. The combination with a series of numeral keys, of a series of valuating devices, one for each numeral key, corresponding in driving capacity to the value of the corresponding numeral key, and individual connections between each numeral key and its valuating device rendering each valuating device subservient to its numeral key, so that the numeral key may bring the valuating device into play, each connection breaking automatically during the down-stroke of its numeral key after bringing the corresponding valuating device into play, and re-completing itself on the up-stroke of the numeral key to be in condition for a subsequent actuation of the same numeral key.

163. In a combined typewriting and computing machine, the combination with a series of numeral keys and computing mechanism comprising computing wheels and a master wheel, of a holding device normally restraining said master wheel from rotating, a series of indexing units, one for each key, each indexing unit being effective, when operated, to release said master wheel from the restraining influence of said holding device and to impart to said master wheel a rotation of predetermined extent, means to restore the effective relation between said holding device and said master wheel at the completion of such rotation, a motor to drive said indexing units and to operate said holding device, and a series of key-controlled connecting elements, one for each key, by means of which each key may control the driving connection from said motor to a part of said machine including its corresponding indexing unit, to effect a predetermined cycle of releasing, driving and holding operations of said master wheel.

164. In a combined typewriting and computing machine, the combination with computing mechanism including a series of computing wheels and a master wheel therefor, of a series of numeral keys, a series of indexing devices, one for each numeral key, to operate said master wheel to an extent dependent upon the numeral key operated, a holding device for the computing mechanism operated upon each rotation of an indexing device, a motor to drive said indexing devices and said common holding device, and a series of key-controlled couplers, one for each key, by means of which each key may control the driving connection from the motor to its corresponding indexing device and to the common holding device.

165. In a combined typewriting and computing machine, the combination with computing mechanism including a series of computing wheels and a master wheel therefor, of a series of numeral keys, a series of indexing devices, one for each numeral key, to operate said master wheel to an extent dependent upon the numeral key operated, a locking device for the computing mechanism operated upon each rotation of an indexing device, a motor to drive said indexing devices and said common locking device, and a series of key-controlled couplers, one for each key, by means of which each key may control the driving connection from the motor to its corresponding indexing device and to the common locking device.

166. In a computing machine, the combination with a power-driven master wheel, of key-released indexing devices for said wheel, a motor furnishing said power, and a power-driven lock also driven by said motor through said devices for controlling the relation of said master wheel to the rest of said machine.

167. In a computing machine, the combination with a series of numeral keys, of a series of computing wheels, a master wheel, a series of valuating units, one for each key to impart to said master wheel at each computing operation a rotation determined in degree by the particular key operated, means for producing relative lateral movement between said master wheel and the computing wheels of said series, whereby said master wheel may engage and operate each, holding means to restrain such relative lateral movement during rotation of said master wheel, holding means to restrain rotation of said master wheel during such relative lateral movement, and a power shaft and connections therefrom to drive said valuating units and for operating said holding means, the effectiveness of said connections for such purpose being subject to the control of said keys.

168. In a computing machine, the combination with a series of numeral keys, of a series of computing wheels, a master wheel, a series of valuating units, one for each key to impart to said master wheel at each computing operation a rotation determined in degree by the particular key operated, means for producing relative lateral movement between said master wheel and the computing wheels of said series, whereby said master wheel may engage and operate each, holding means to restrain such relative lateral movement during rotation of said master wheel, and a power shaft and connections therefrom to drive said valuating units and for operating said holding means, the effectiveness of said connections for such purpose being subject to the control of said keys.

169. The combination with typewriting mechanism including keys and printing types, of a power-driven shaft, indexing devices driven thereby, one for each numeral key, an escapement for each numeral key connected to be under the control of its key to determine when said shaft shall be effective on said indexing devices, a traveling carriage, and a power-driven lock operated by said shaft for preventing the traveling of said carriage.

170. In a computing machine, the combination with a driving shaft and a series of indexing devices journaled thereon, of a clutch member forming part of said shaft, a second clutch member forming part of said indexing devices, a spring normally tending to cause said clutch members to seize, an escapement dog normally holding the indexing device clutch member released against the tension of its spring, and means for rocking said escapement dog to permit said clutch members to seize.

171. In a power-driven computing machine, the combination with computing mechanism and a drive shaft, of normally ineffective driving connections from said shaft to different parts of said computing mechanism, a series of controllers, one for each driving connection, for selectively rendering said connections effective, and means effective during the operation of each controller to prevent the operation of another controller prior to the return of said first operated controller to its normal position.

172. In a computing machine, the combination with computing mechanism comprising a series of computing wheels and a master wheel, of advancing means for producing relative movement between said master wheel and said computing wheels, so that said master wheel may engage and operate said computing wheels in succession, a power shaft, means including a normally inactive clutch for driving said advancing means from said power shaft, means including a normally inactive clutch for driving said master wheel from said power shaft, a key, and means for rendering both said clutches active at each operation of said key, so that whenever said key is operated it will effect both a rotation of a computing wheel by said master wheel and also a relative shifting movement between said master wheel and said series of computing wheels.

173. In a computing machine, the combination with computing mechanism comprising a series of computing wheels, and a master wheel, of advancing means for producing relative movement between said master wheel and said computing wheels, so that said master wheel may engage and operate said computing wheels in succession, a power shaft, means including a normally inactive clutch for driving said advancing means from said power shaft, means including a series of indexing devices, a series of normally inactive clutches, one for each indexing device, and a series of keys, one for each indexing device and its clutch, for establishing driving connections from said power shaft to said master wheel, and means for rendering said clutch for said advancing means active whenever a clutch for said master-wheel driving means is rendered active, so that on each operation of a key a numeral wheel will be rotated by said master wheel to an extent dependent upon the corresponding indexing device, and a shifting movement will also be effected between said master wheel and said series of computing wheels.

In testimony whereof I have signed my name to this specification, in the presence of two subscribing witnesses, on this 17th day of June A. D. 1909.

SAMUEL E. CARLIN.

Witnesses:
J. H. JOCHUM, Jr.,
CHARLES H. SEEM.

Copies of this patent may be obtained for five cents each, by addressing the "Commissioner of Patents, Washington, D. C."